(12) United States Patent  
Kariat et al.

(10) Patent No.: US 8,543,952 B2  
(45) Date of Patent: *Sep. 24, 2013

(54) METHOD AND APPARATUS FOR THERMAL ANALYSIS OF THROUGH-SILICON VIA (TSV)

(75) Inventors: Vinod Kariat, Sunnyvale, CA (US); Eddy Pramono, Santa Clara, CA (US); Yong Zhan, Milpitas, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/290,047

(22) Filed: Nov. 4, 2011

(65) Prior Publication Data

US 2012/0210285 A1    Aug. 16, 2012

Related U.S. Application Data

(63) Continuation of application No. 12/416,793, filed on Apr. 1, 2009, now Pat. No. 8,103,996, which is a continuation-in-part of application No. 12/144,651, filed on Jun. 24, 2008, now Pat. No. 8,104,007.

(51) Int. Cl.  
*G06F 17/50* (2006.01)

(52) U.S. Cl.  
USPC .......................................... 716/110

(58) Field of Classification Search  
USPC ................................. 716/100, 110  
See application file for complete search history.

(56) References Cited

U.S. PATENT DOCUMENTS

| | | |
|---|---|---|
| 6,842,714 B1 | 1/2005 | Acar et al. |
| 6,895,354 B2 | 5/2005 | Matsuyama et al. |
| 7,366,997 B1 | 4/2008 | Rahmat et al. |
| 7,379,780 B2 | 5/2008 | Kumano et al. |
| 7,548,792 B2 | 6/2009 | Kumano et al. |
| 7,626,144 B2 | 12/2009 | Merzliakov |
| 8,103,996 B2 * | 1/2012 | Kariat et al. ................. 716/100 |
| 8,104,006 B2 | 1/2012 | Kariat et al. |
| 8,104,007 B2 | 1/2012 | Kariat et al. |
| 8,201,113 B2 | 6/2012 | Pramono et al. |
| 8,237,288 B1 * | 8/2012 | Farooq et al. ................. 257/776 |
| 2004/0073397 A1 | 4/2004 | Matsuyama et al. |
| 2005/0044515 A1 | 2/2005 | Acar et al. |
| 2005/0102117 A1 | 5/2005 | Habitz |
| 2005/0167514 A1 | 8/2005 | Kaushal et al. |
| 2006/0039114 A1 | 2/2006 | Hamann et al. |
| 2006/0103011 A1 * | 5/2006 | Andry et al. ................. 257/707 |
| 2007/0168151 A1 | 7/2007 | Kernahan et al. |
| 2007/0206654 A1 | 9/2007 | Merzliakov |

(Continued)

OTHER PUBLICATIONS

Portions of prosecution history of U.S. Appl. No. 12/024,002, filed Nov. 3, 2011, Kariat, Vinod, et al.

(Continued)

*Primary Examiner* — Suchin Parihar  
(74) *Attorney, Agent, or Firm* — Adeli & Tollen LLP

(57) ABSTRACT

Some embodiments of the invention provide a method for performing thermal analysis of an integrated circuit ("IC") design layout. The IC design layout includes several wiring layers in some embodiments. The IC design layout includes a substrate that has at least one through-silicon via ("TSV"). The method divides the IC design layout into a set of elements. The method identifies a temperature distribution for the IC design layout by using the set of elements. In some embodiments, at least one element includes a metal component and a non-metal component. The non-metal component is silicon in some embodiments, and a dielectric in other embodiments.

20 Claims, 44 Drawing Sheets

(56) References Cited

U.S. PATENT DOCUMENTS

| | | |
|---|---|---|
| 2007/0244676 A1 | 10/2007 | Shang et al. |
| 2008/0026493 A1 | 1/2008 | Shakouri et al. |
| 2008/0072182 A1 | 3/2008 | He et al. |
| 2008/0168406 A1 | 7/2008 | Rahmat et al. |
| 2008/0183322 A1 | 7/2008 | Kumano et al. |
| 2008/0244278 A1 | 10/2008 | Monferrer et al. |
| 2009/0024347 A1 | 1/2009 | Chandra et al. |
| 2009/0024969 A1 | 1/2009 | Chandra |
| 2009/0111215 A1 | 4/2009 | Caron et al. |
| 2011/0209113 A1 | 8/2011 | Rahmat et al. |
| 2012/0053913 A1 | 3/2012 | Xie et al. |
| 2012/0102449 A1 | 4/2012 | Kariat et al. |
| 2012/0181696 A1* | 7/2012 | Sun ............... 257/758 |
| 2012/0223436 A1* | 9/2012 | Sekar et al. ......... 257/773 |
| 2012/0297357 A1 | 11/2012 | Pramono et al. |
| 2012/0304137 A1 | 11/2012 | Pramono et al. |

OTHER PUBLICATIONS

Portions of prosecution history of U.S. Appl. No. 12/144,651, filed Sep. 22, 2011, Kariat, Vinod, et al.

Portions of prosecution history of U.S. Appl. No. 12/180,490, filed May 7, 2012, Pramono, Eddy, et al.

Portions of prosecution history of U.S. Appl. No. 12/416,793, filed Nov. 7, 2011, Kariat, Vinod, et al.

Portions of prosecution history of U.S. Appl. No. 13/269,550, filed Nov. 8, 2012, Kariat, Vindod, et al.

Portions of prosecution history of U.S. Appl. No. 13/477,005, filed Jan. 9, 2013, Pramono, Eddy, et al.

Zienkiewicz, O.C., "The Finite Element Method" $3^{rd}$ ed., 1977, pp. 423-449, McGraw-Hill Book Company (UK) Limited, Berkshire, England.

Goplen, Brent, et al., "Thermal Via Placement in 3D ICs," Proceedings of the 2005 International Symposium on Physical Design (ISPD'05), Apr. 3-6, 2005, pp. 167-174, ACM, San Francisco, CA, USA.

Updated portions of prosecution history of U.S. Appl. No. 13/269,550, Apr. 3, 2013, Kariat, Vinod, et al.

Portions of prosecution history of U.S. Appl. No. 13/477,006, filed Apr. 15, 2013, Pramono, Eddy, et al.

* cited by examiner

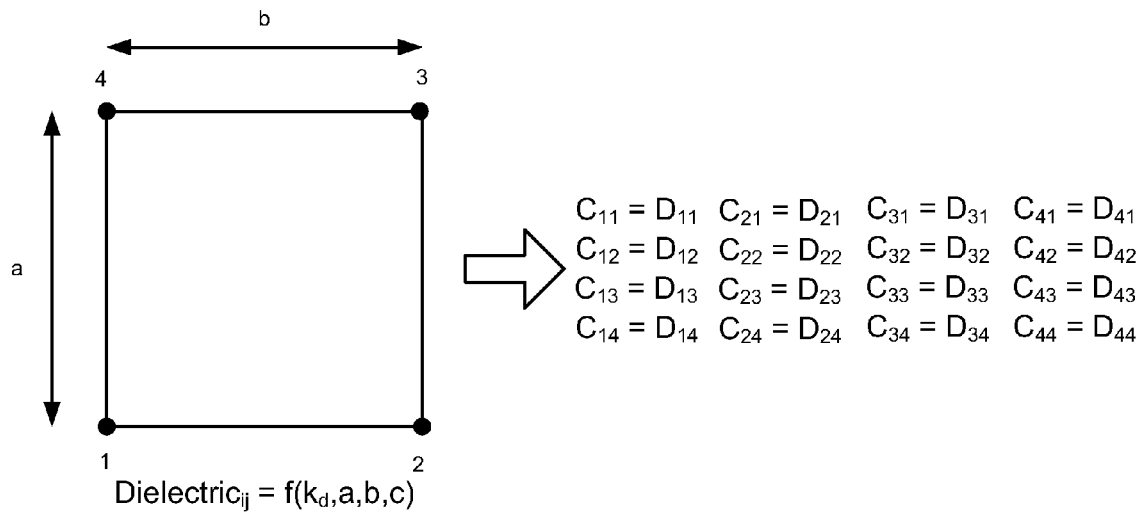
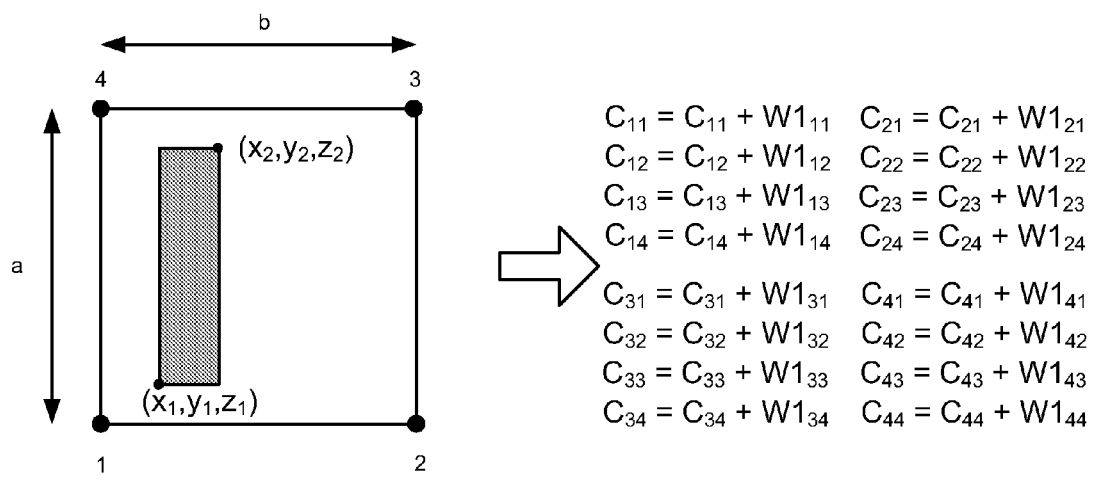
Figure 22

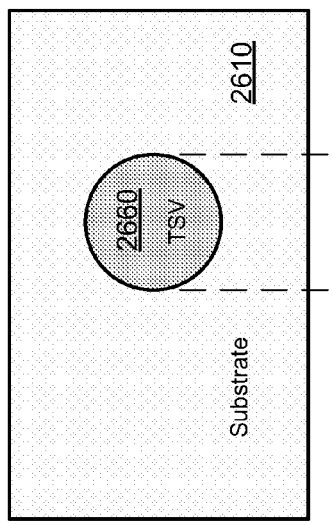
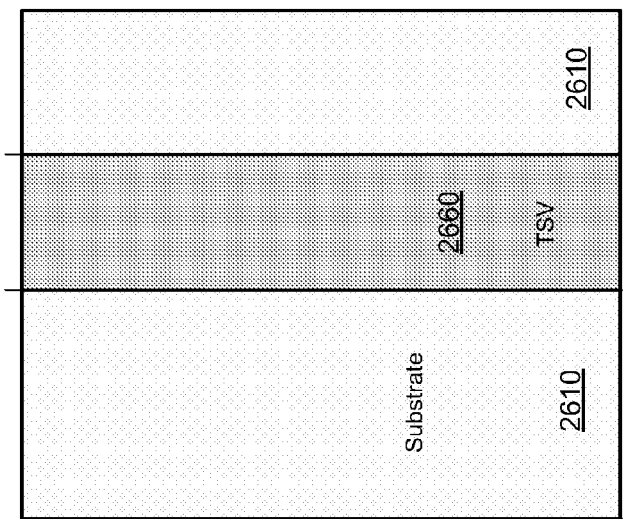
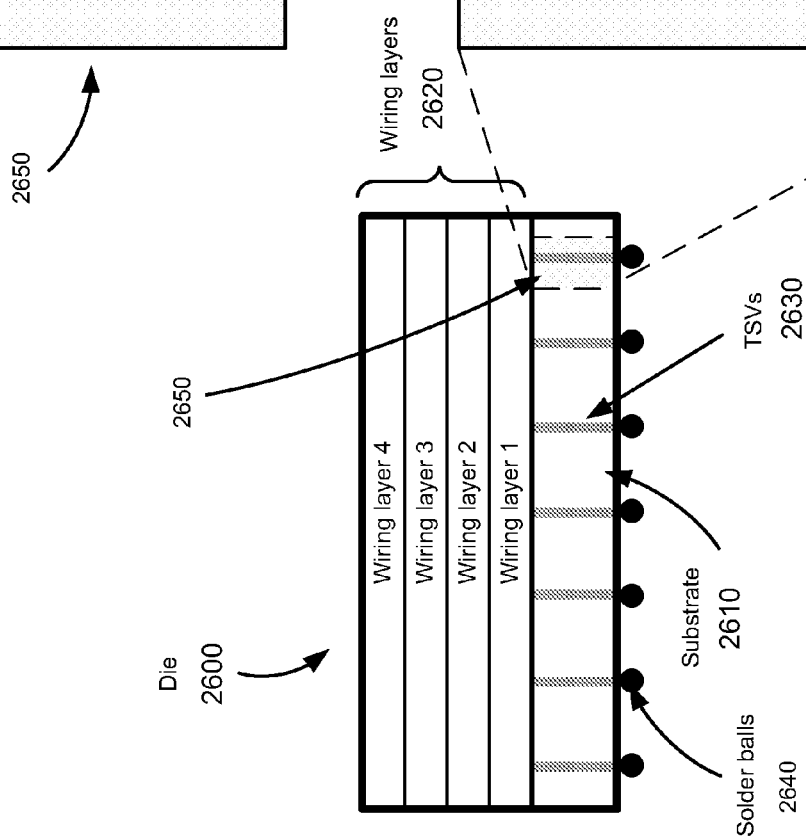

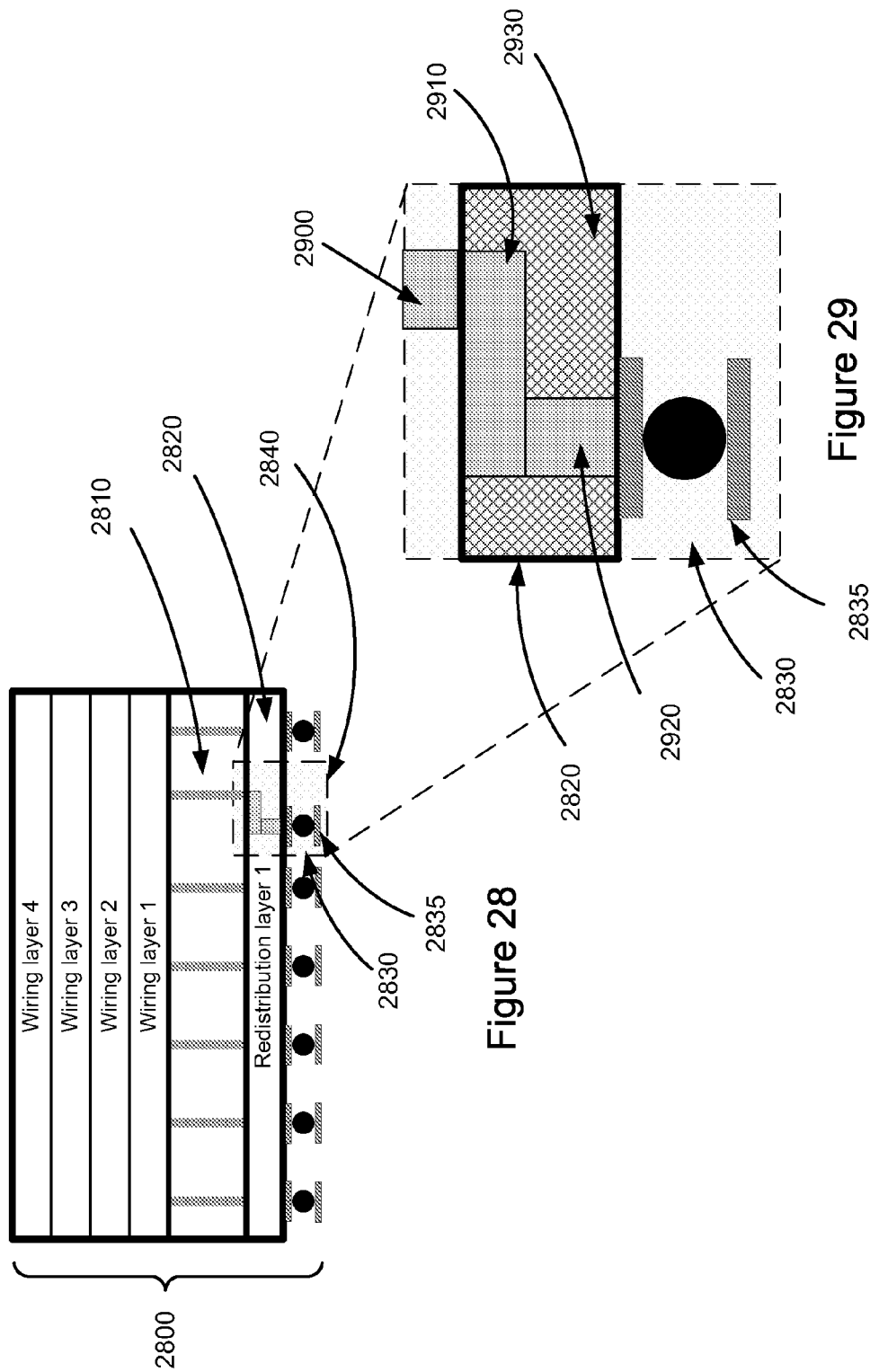

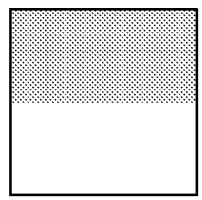
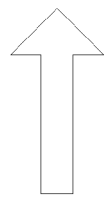
Top view (d)
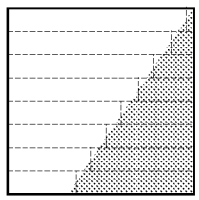 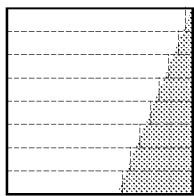
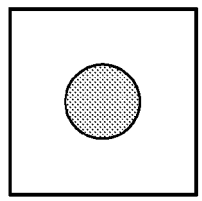 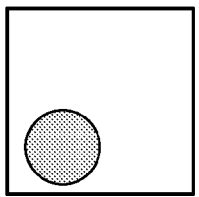 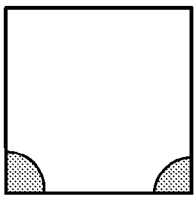
Top view (a)   Top view (b)   Top view (c)
Figure 37C

4200

US 8,543,952 B2

METHOD AND APPARATUS FOR THERMAL ANALYSIS OF THROUGH-SILICON VIA (TSV)

CLAIM OF BENEFIT TO PRIOR APPLICATIONS

This application is a continuation application of U.S. patent application 12/416,793, filed Apr. 1, 2009, now U.S. Pat. No. 8,103,996, now published as U.S. Publication 2009/0319965. U.S. patent application Ser. No. 12/416,793 is a continuation in part of U.S. patent application Ser. No. 12/144,651, filed Jun. 24, 2008, entitled "Method and Apparatus for Thermal Analysis", now U.S. Pat. No. 8,104,007, now published as U.S. Publication 2009/0319964. U.S. patent application Ser. No. 12/144,651 and U.S. Publications 2009/0319964 and 2009/0319965 are incorporated herein by reference.

FIELD OF THE INVENTION

The present invention relates to thermal analysis of an IC design where the substrate includes through-silicon vias.

BACKGROUND OF THE INVENTION

An integrated circuit ("IC") is a device (e.g., semiconductor device) that includes many electronic components, such as transistors, resistors, diodes, etc. These electronic components can be connected together to form multiple circuit components such as gates, cells, memory units, arithmetic units, controllers, decoders, etc. An IC includes multiple layers of wiring that interconnect its electronic and circuit components.

Design engineers design ICs by transforming logical or circuit descriptions of the ICs components into geometric descriptions, called layouts. IC layouts typically include (1) circuit modules (i.e., geometric representations of electronic or circuit IC components) with pins, and (2) interconnect lines (i.e., geometric representations of wiring) that connect the pins of the circuit modules. A collection of pins that need to be connected is typically called a net.

To create layouts, design engineers often use electronic design automation ("EDA") applications. These applications provide sets of computer-based tools for creating, editing, and analyzing IC design layouts. Examples of such tools include (1) standard cell libraries that provide numerous cells that can be instantiated as circuit modules in a design, (2) placement tools that define the location of the various circuit modules in a layout, (3) routing tools that define the wiring between the circuit modules, and (4) verification tools that verify that the designed layout will meet design operation requirements.

Thermal analysis tools are one type of verification tools that are used currently. Prior thermal analysis tools dealt mostly with the thermal properties of the chip packages and often ignored thermal properties on the chip. These prior tools were mainly concerned about the total power dissipation of the chip, and about whether a specific package was sufficient to cool a given chip. In these tools, the chip often was treated as a lumped heat source, while the model for the package was very detailed, including details regarding airflow around the package.

In recent years, on-chip thermal analysis has become more important as the number of active devices and the total amount of on-chip power has increased due to larger chip sizes and/or smaller device sizes. This analysis has also become more important with the increase of the power density on the chips due to scaling. The increase in low power chips for mobile devices has also increased the demand for on-chip analysis. In low power chips, leakage current is a big contributor to power consumption. Often the techniques that are used in low power consuming chips (e.g., turning off areas of the IC) create voltage gradients, which cause leakage current and inaccurate power dissipation analysis.

As illustrated in FIG. 1, leakage current is greatly affected by on-chip temperature variations. In fact, a circular dependency exists between the on-chip temperature, leakage current, and power dissipation. As illustrated in FIG. 2, the leakage current 210 affects the power dissipation 215. As the leakage current 210 rises, the power dissipation 215 also rises along with it. The power dissipation 215 increases the temperature 205, which in turn increases the leakage current. This circular set of dependencies creates the potential for a runaway feedback loop in which the temperature of the IC continually increases with the leakage current.

FIG. 3 illustrates one current approach for performing on-chip thermal analysis for an IC design. Under this approach, a power analysis tool 305 and a thermal analysis tool 315 interact multiple times and repeatedly perform power and thermal analyses until their results begin to converge. Specifically, the power analysis tool 305 initially performs a first power analysis on a particular IC design that is defined by numerous parameters stored in a design database 310. To perform its initial analysis, the power analysis tool 305 assumes some ambient temperature for all circuit modules in the design. The power analysis tool 305 then passes to the thermal analysis tool 315 its initial results, which includes the power dissipated by each circuit module in the design.

The thermal analysis tool 315 then performs a first pass of its thermal analysis by converting the power dissipated by each circuit module into a heat source. This thermal analysis produces an intermediate temperature map 320 for the chip. This thermal map models the temperature distribution through the entire chip. In addition, an average temperature for each instance is available. The temperature for each circuit module is now passed back to power analysis tool 305. The power analysis tool 305 will now recompute the power dissipation of each circuit module based on the new temperatures; in particular, it will compute the leakage power of each circuit module. The new power numbers will now be passed on to the thermal analysis tool 315, which will now recompute a new temperature. After a certain number of iterations, the temperature and leakage will converge, and the iterations will stop at that point. The result of these iterative operations is a final thermal map 325 and a final power report 330.

The main disadvantage of the approach illustrated in FIG. 3 is that the iterations between power analysis and thermal analysis are slow and costly. In addition to the additional run time requirement, the system is also quite complex because of the loose iterations between different components in the system. Accordingly, there is a need for a process that more efficiently performs thermal analysis of an IC design. Moreover, there is a need for a process that performs thermal analysis of an IC design, where the wiring of the IC design layout is more efficiently taken into account. In addition, conventional thermal analysis processes do not take into account through-silicon vias of a substrate of an IC design. Accordingly, there is a need for a process that can perform thermal analysis on an IC design, where the substrate includes through-silicon vias.

SUMMARY OF THE INVENTION

Some embodiments of the invention provide a method for performing thermal analysis of an integrated circuit ("IC")

design layout. The IC design layout includes several wiring layers in some embodiments. The IC design layout includes a substrate that has at least one through-silicon via ("TSV"). The description hereafter focuses on the modeling of substrate consisting of silicon and TSVs, with the understanding that the thermal analysis is performed over the entire IC design. However, one of ordinary skill in the art will easily see that a similar approach can be used to model the interconnect layers containing dielectrics and metal wires. The details of the latter are given in Section IV of the present application. The method divides the IC design layout into a set of elements. The method identifies a temperature distribution for the IC design layout by using the set of elements. In some embodiments, at least one element includes a metal component and a non-metal component. The non-metal component is silicon in some embodiments, and is a dielectric in other embodiments.

In some embodiments, some of these elements correspond to a particular portion of a substrate of the IC design layout. Each element includes several nodes. Each conductivity group of values is defined by entry values. Each entry value describes how heat flow at a particular node of the element is affected by a temperature change at another particular node of the element.

Different embodiments compute the set of conductivity groups of values differently. Some embodiments compute an effective thermal conductivity value that approximates a thermal conductivity value of a particular element of the IC design layout. In such instances, the effective thermal conductivity values are used to compute the set of conductivity groups of values. Some embodiments compute the effective thermal conductivity value by using an element model that is a representation of a composition of a particular element of the IC design layout to compute the effective thermal conductivity of the particular element. In some embodiments, the effective thermal conductivity value of the particular element is based on (i) a thermal conductivity value for a silicon component of the particular element, and (ii) a thermal conductivity value and the geometric shape for a metal component of the particular element, such as the TSVs. However, the effective thermal conductivity value may be based on different attributes of the particular element.

Other embodiments compute the set of conductivity groups of values by using at least one parameterized function to directly compute entry values for the set of conductivity groups of values. In such instances, the set of conductivity groups of values is based on (i) a first set of entry values based on a silicon component of the IC design layout and (ii) a second set of entry values based on at least one TSV in the IC design layout.

In some embodiments, the method computes the set of conductivity groups of values by computing for each particular element, a first set of entry values based on a silicon component of the IC design layout. The method also identifies a TSV in the IC design layout and computes for each particular element that includes the TSV, a set of entry values based on the TSV. The method adds for each particular element that includes the TSV, the set of entry values to the first set of entry values to define a particular set of entry values that defines a particular conductivity group of values.

In addition, some embodiments identify the temperature distribution for the IC design layout based on the set of conductivity groups of values by solving a heat flow equation based on a set of power equations and the set of conductivity groups of values to identify the temperature distribution for the IC design layout. In some embodiments, the set of power equations express the temperature dependence of the power dissipation for several circuit modules. In some embodiments, the power dissipation equations express a non-linear relationship between power dissipation and temperature.

Different embodiments define the power dissipation equations differently. In some embodiments, the power dissipation equation for a circuit module has two components, one that is temperature dependent and one that is not. For instance, in some of these embodiments, the temperature-dependent component of the power dissipation includes the leakage power consumption of the circuit module, while the temperature-independent component includes the switching power of the circuit module.

In some of these embodiments, the leakage power of a circuit module is expressed in terms of a non-linear equation with respect to temperature. Some of these embodiments compute coefficients for the non-linear equation of a circuit module from the leakage power dissipation of the circuit module at two different temperatures. Other embodiments receive such coefficients from a third party (e.g., the manufacturer for the IC design, the developer of a library that contains the macro for the circuit module, etc.).

BRIEF DESCRIPTION OF THE DRAWINGS

The novel features of the invention are set forth in the appended claims. However, for purpose of explanation, several embodiments of the invention are set forth in the following figures.

FIG. 22 illustrates the concept of computing a conductivity group of values.

FIG. 26A illustrates an IC that includes a substrate that includes through-silicon vias ("TSV") and a set of solder balls in some embodiments.

FIG. 26B illustrates an enlarged portion of the substrate of FIG. 26A.

FIG. 26C illustrates a cross section view of a portion of the substrate of FIG. 26A.

FIG. 28 illustrates an IC and a redistribution layer in some embodiments.

FIG. 29 illustrates an enlarged portion of a redistribution layer that includes a metal component and a dielectric component.

FIG. 37C illustrates examples of computing equivalent thermal conductivity values for different elements.

DETAILED DESCRIPTION OF THE INVENTION

Figure 1:
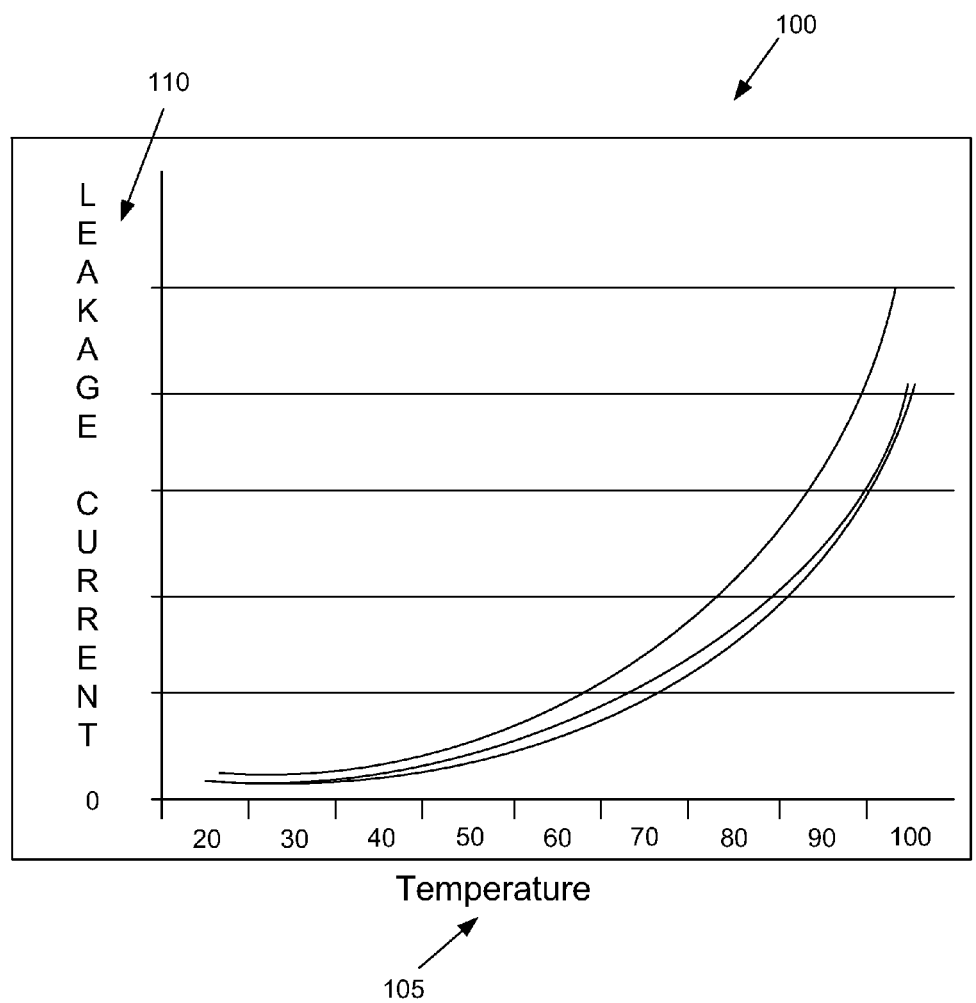
FIG. 1 illustrates that leakage current is greatly affected by on-chip temperature variations.
Figure 2:
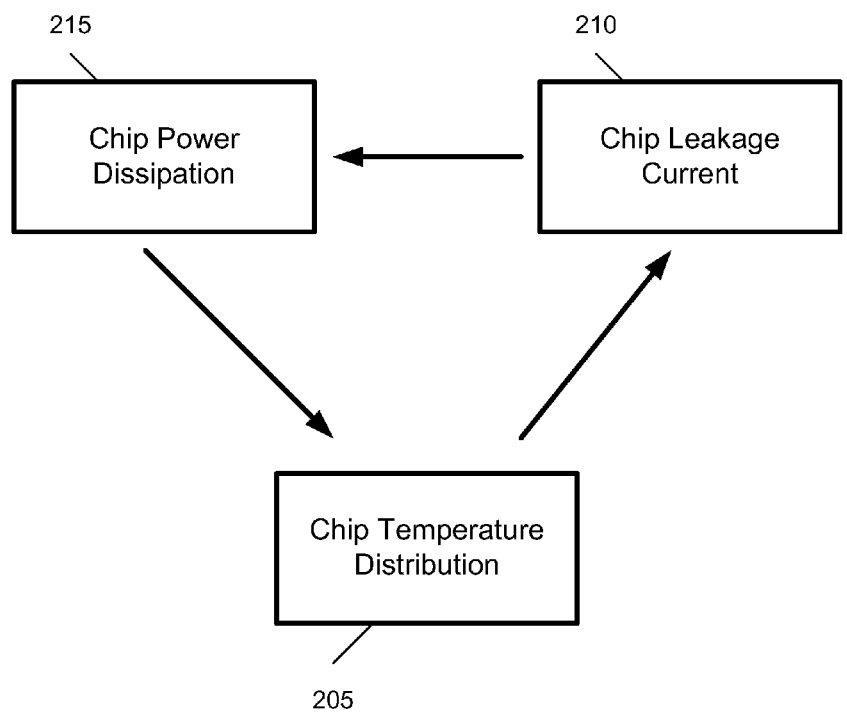
FIG. 2 illustrates that the leakage current affects the power dissipation.
Figure 3:
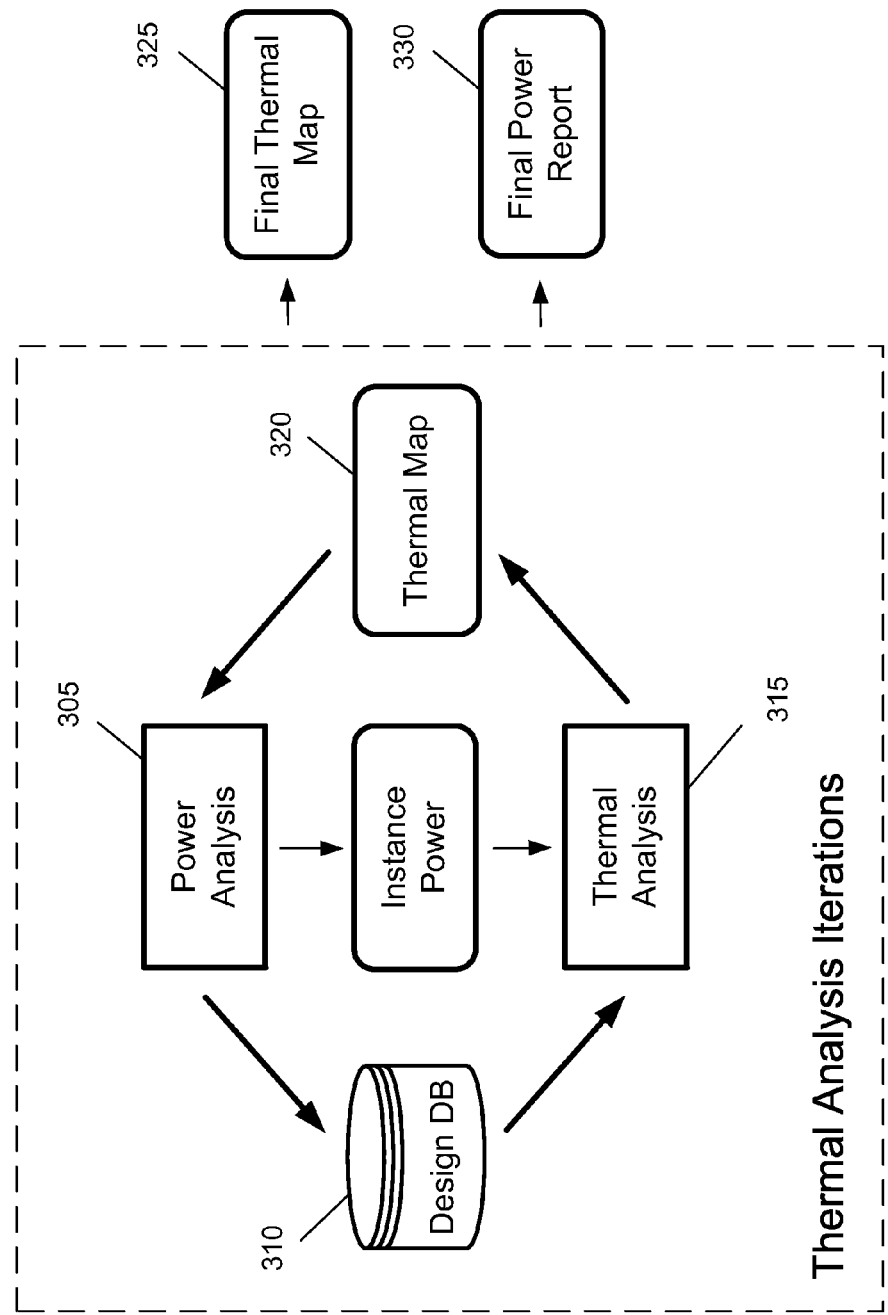
FIG. 3 illustrates one current approach for performing on-chip thermal analysis for an IC design.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

I. Overview

Some embodiments of the invention provide a method for performing thermal analysis of an integrated circuit ("IC") design layout. The IC design layout includes several wiring layers in some embodiments. The IC design layout includes a substrate that has at least one through-silicon via ("TSV"). The method divides the IC design layout into a set of elements. The method identifies a temperature distribution for the IC design layout by using the set of elements. In some embodiments, at least one element includes a metal component and a non-metal component. The non-metal component is silicon in some embodiments, and is a dielectric in other embodiments.

In some embodiments, some of these elements correspond to a particular portion of a substrate of the IC design layout. Each element includes several nodes. Each conductivity group of values is defined by entry values. Each entry value describes how heat flow at a particular node of the element is affected by a temperature change at another particular node of the element.

Different embodiments compute the set of conductivity groups of values differently. Some embodiments compute an effective thermal conductivity value that approximates a thermal conductivity value of a particular element of the IC design layout. In such instances, the effective thermal conductivity values are used to compute the set of conductivity groups of values. Some embodiments compute the effective thermal conductivity value by using an element model that is a representation of a composition of a particular element of the IC design layout to compute the effective thermal conductivity of the particular element. In some embodiments, the effective thermal conductivity value of the particular element is based on (i) a thermal conductivity value for a silicon component of the particular element, and (ii) a thermal conductivity value and the geometric shape for a metal component of the particular element, such as the TSVs. However, the effective thermal conductivity value may be based on different attributes of the particular element.

Other embodiments compute the set of conductivity groups of values by using at least one parameterized function to directly compute entry values for the set of conductivity groups of values. In such instances, the set of conductivity groups of values is based on (i) a first set of entry values based on a silicon component of the IC design layout and (ii) a second set of entry values based on at least one TSV in the IC design layout. In some embodiments, the method computes the set of conductivity groups of values by computing for each particular element, a first set of entry values based on a silicon component of the IC design layout. The method also identifies a TSV in the IC design layout and computes for each particular element that includes the TSV, a set of entry values based on the TSV. The method adds for each particular element that includes the TSV, the set of entry values to the first set of entry values to define a particular set of entry values that defines a particular conductivity group of values.

In addition, some embodiments identify the temperature distribution for the IC design layout based on the set of conductivity groups of values by solving a heat flow equation based on a set of power equations and the set of conductivity groups of values to identify the temperature distribution for the IC design layout. In some embodiments, the set of power equations express the temperature dependence of the power dissipation for several circuit modules. In some embodiments, the power dissipation equations express a non-linear relationship between power dissipation and temperature.

Different embodiments define the power dissipation equations differently. In some embodiments, the power dissipation equation for a circuit module has two components, one that is temperature dependent and one that is not. For instance, in some of these embodiments, the temperature-dependent component of the power dissipation includes the leakage power consumption of the circuit module, while the temperature-independent component includes the switching power of the circuit module.

In some of these embodiments, the leakage power of a circuit module is expressed in terms of a non-linear equation with respect to temperature. Some of these embodiments compute coefficients for the non-linear equation of a circuit module from the leakage power dissipation of the circuit module at two different temperatures. Other embodiments receive such coefficients from a third party (e.g., the manufacturer for the IC design, the developer of a library that contains the macro for the circuit module, etc.).

Some examples of performing thermal analysis are described in U.S. patent application Ser. No. 12/024,002, filed Jan. 31, 2008, now issued as U.S. Pat. No. 8,104,006, entitled "Method and Apparatus for Thermal Analysis" and U.S. patent application Ser. No. 12/144,651, filed Jun. 24, 2008, now issued as U.S. Pat. No. 8,104,007, entitled "Method and Apparatus for Thermal Analysis". U.S. patent application Ser. Nos. 12/024,002 and 12/144,651 are hereinafter incorporated by reference. Several more detailed embodiments will now be described.

II. Overall Flow

Figure 4:
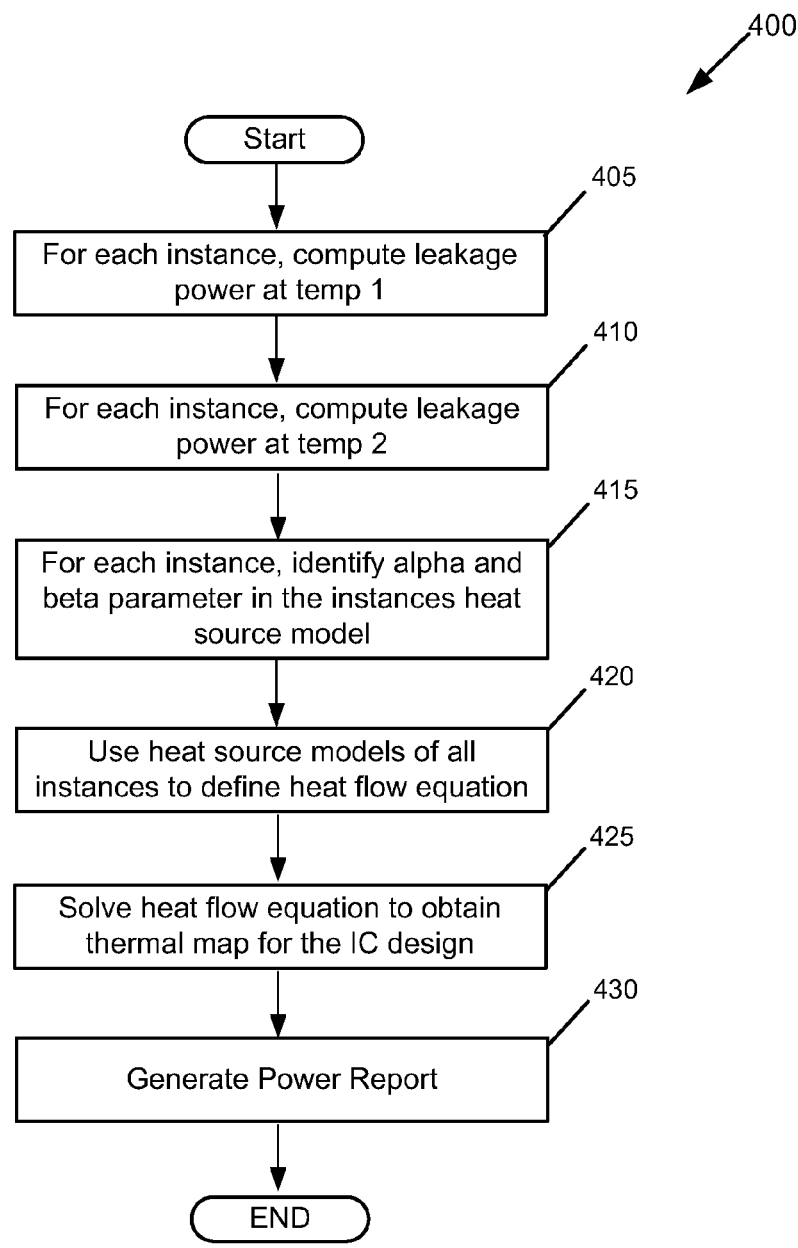
FIG. 4 conceptually illustrates a process that represents the overall flow of some embodiments of the invention.

FIG. 4 conceptually illustrates a process 400 that represents the overall flow of some embodiments of the invention. This process generates a thermal map and a power analysis report for the IC design without iterating multiple times between the power and thermal analysis. In some embodiments, this process is performed by one EDA tool (e.g., a thermal analysis tool), while in other embodiments, several different tools (e.g., two different tools) perform this process.

The process 400 starts when it receives a design layout on which it has to perform thermal analysis. As shown in FIG. 4, the process 400 initially computes (at 405 and 410) the leakage power of each circuit module in the IC design at two different temperatures, $T_1$ and $T_2$. In some embodiments, the two temperatures $T_1$ and $T_2$ bound the temperature domain of interest. In other embodiments, the two temperatures are two temperatures that fall within the temperature domain of interest.

In some embodiments, many or all of the circuit modules in the IC design are cells (i.e., small circuits) that come from one or more libraries that were used to design the layout that the process 400 receives. In these embodiments, the process computes the leakage power for each cell at the two different temperatures. In other words, the process does not need to compute the two leakage power values for each instance of a particular cell that is used in the design. Instead, it only needs to compute these values for each particular cell. In this manner, the operations of the process at 405 and 410 can be viewed in some embodiments as generating two different cell leakage-power libraries, where each library is characterized at a different temperature.

If a transistor level description of the cell library is available, this description can be used to compute the power at two temperatures by using circuit simulation. Many circuit simulation programs exist that can perform such computation. Spice simulation programs are one example of such programs.

For each transistor, spice simulation programs often have a spice model and a temperature parameter that describes how the transistor will behave at a particular temperature. By using such models, spice simulation programs can compute leakage power at two different temperatures. For instance, to compute the leakage power at a particular temperature for a particular CMOS inverter with its input state at a logic 0, a spice program would (1) set the input of the inverter to zero volts for a transient period (e.g., a few milliseconds), (2) use the temperature parameters of the CMOS inverter's transistors to compute the average current flow through the inverter at the particular parameter, and (3) multiply the average current flow by the voltage supplied to the inverter, which would typically be $V_{dd}$.

After computing the instance leakage power dissipation of each particular circuit module (e.g., each cell), the process then computes (at 415) the parameters of a non-linear equation that represents the leakage power dissipation of the particular circuit module. Some embodiments use the following exponential equation to represent the leakage power dissipation of a circuit module.

$$LP = \alpha e^\beta T \tag{1}$$

In the above equation, LP represents the leakage power, T represents the temperature, and $\alpha$ and $\beta$ are constants. Taking the natural logarithm of both sides of this equation yields the result that the logarithm of leakage power is a linear function of temperature, as illustrated by the following equation:

$$\ln(LP) = \ln(\alpha) + \beta T \tag{2}$$

Therefore, for each circuit module (e.g., each cell), the $\alpha$ and $\beta$ coefficients for that module's heat source model can be derived from the leakage power for the module at two temperatures. Specifically, for a particular circuit module (e.g., cell), a first leakage power $LP_1$ at a first temperature $T_1$ and a second leakage power $LP_2$ at a second temperature $T_2$ provides the following two equations:

$$\ln(LP_1) = \ln(\alpha) + \beta T_1, \text{ and} \tag{3}$$

$$\ln(LP_2) = \ln(\alpha) + \beta T_2, \tag{4}$$

which can be solved to provide the two coefficients $\alpha$ and $\beta$ for the particular circuit module.

Once the two coefficients $\alpha$ and $\beta$ are computed for each circuit module, the process specifies (at 420) a heat flow equation to express the on-chip temperature in terms of the chip's power consumption. This power consumption includes the leakage power consumption of the circuit modules. In some embodiments, the heat flow equation expresses the temperature-dependent, leakage power consumption of each circuit module by using Equation (1) with the coefficients $\alpha$ and $\beta$, which were computed at 415. Section III describes the heat flow equation of some embodiments of the invention.

After defining the heat flow equation (at 420), the process solves (at 425) the heat flow equation to obtain a two-dimensional thermal map for the IC design. In some embodiments, the process solves this equation iteratively until it determines that its solutions have started to converge to be within an acceptable threshold. Section VI describes this iterative solving process.

Figure 5:
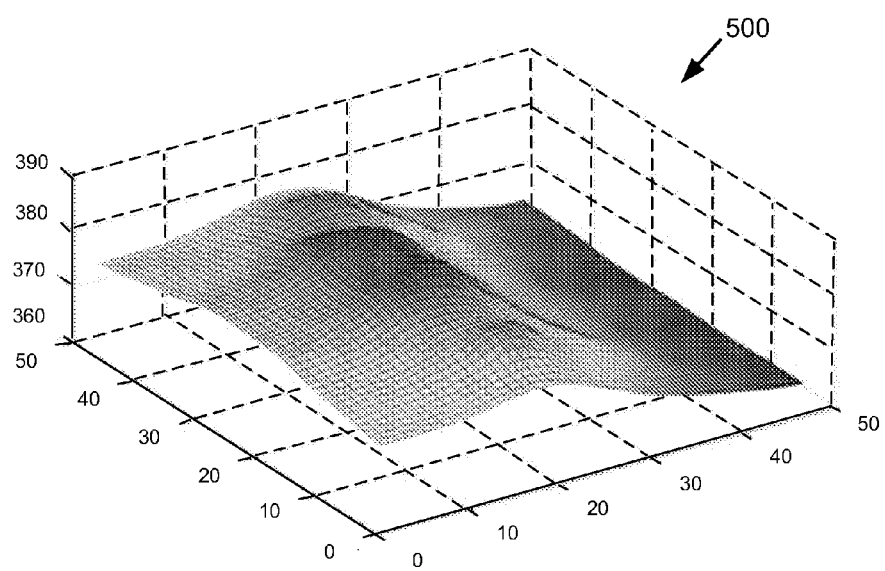
FIG. 5 illustrates a two-dimensional temperature map for one of the layers of an IC.

The solution that is obtained (at 425) for the heat flow equation is a three-dimensional thermal map of the IC. FIG. 5 illustrates a two-dimensional temperature map 500 for one of the layers of the IC. This map plots temperature (along the z-axis) in Kelvin as a function of spatial x and y coordinates on a particular layer of the IC. In some embodiments, this map is color coded to show the different temperatures in different colors, in order to allow visual identification of hot spots on the chip. This map will not only show the temperature at various locations on the IC, but also temperature gradients as well.

After obtaining this map, the process 400 can generate (at 430) a power consumption report for the IC design. This power consumption report provides the overall power consumption of the IC design as well as the power consumption of each circuit module in the IC design. After 430, the process ends.

III. Heat Flow Equation

The heat flow equation in some embodiments is expressed as $$C*T=P(T) \tag{5}$$

In this equation, C is a conductivity group of values (e.g., conductivity matrix) that expresses the estimated conductivity of different nodes in the design, T is a temperature vector that expresses the estimated temperature of different nodes in the design, and P(T) is a vector that is related to the estimated power consumption of different nodes in the design. The concept of nodes is further described below.

Different embodiments express the conductivity group of values C and power-related vector P(T) of Equation (5) differently. Below is one finite-element formulation for the problem. Other embodiments might formulate C and P(T) differently for the heat flow Equation (5). Yet other embodiments might use different heat flow equations than Equation (5).

Figure 6:
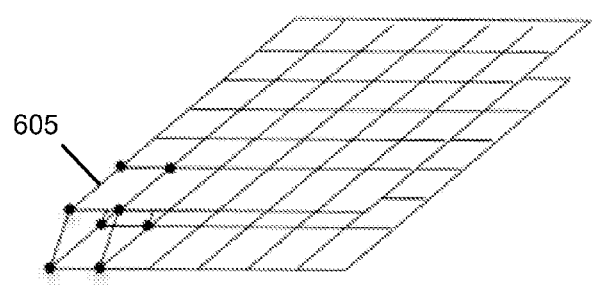
FIG. 6 illustrates a design layout that has been divided in several bricks.

To derive a more manageable finite-element formulation of the heat flow equation, some embodiments divide the IC design into several elements 605 of FIG. 6. In some embodiments, each of these elements corresponds to a particular portion of a particular layer of an IC design layout. However, different embodiments may associate an element to an IC design layout differently. As shown in FIG. 6, each element (e.g., brick) has eight vertices. These vertices are the nodes for which some embodiments express the conductivity group of values C, compute the power-related vector P(T), and calculate the temperature vector T.

These embodiments then express the finite element formulation of the heat flow Equation (5) by specifying the conductivity group of values C as:

$$C_{ij} = \int_\Omega \nabla^T N_i k \nabla N_j d\Omega + \int_{\Gamma_q} N_i h N_j d\Gamma_q \tag{6}$$

and the power-related vector P(T) as:

$$P_i(T) = \int_\Omega N_i g(x,y,z,T) d\Omega + \int_{\Gamma_q} N_i f d\Gamma_q. \tag{7}$$

Figure 7:
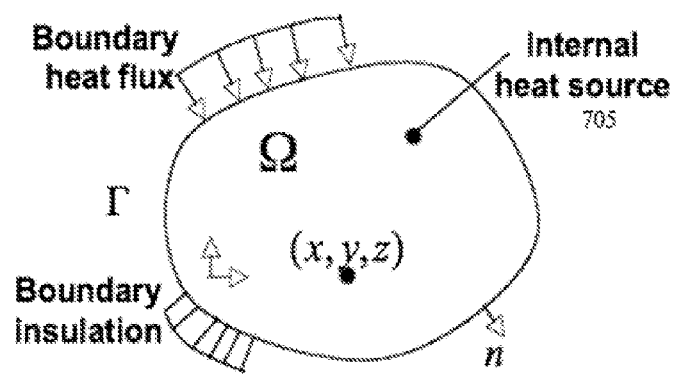
FIG. 7 illustrates a conceptual diagram of a heat source within a domain.

In these equations,

Ω is the multi-layer IC design volume where the temperature distribution is to be computed, $\Gamma_q$ is the boundary where the boundary condition is applied, as illustrated in FIG. 7, i and j are nodes in the volume, $N_i$ is the shape function associated with node i, x, y, and z are point coordinates in the region, T is temperature, g(x,y,z,T) is the steady state power density of a heat source 705 as the point heat source illustrated in FIG. 7, k(x,y,z,T) is the thermal conductivity, h is the heat transfer coefficient on the boundary through a specified package model to the ambient environment, and $f$ is $h*T_a$, where $T_a$ is the ambient temperature.

The steady-state power density term g(x,y,z,T) can be written as:

$$g(x,y,z,T)=g_i(x,y,z,T)+g_s(x,y,z,T)+g_l(x,y,z,T) \tag{8}$$

where $g_i(x,y,z,T)$ is the steady-state internal power density, $g_s(x,y,z,T)$ is the steady-state switching power density, and $g_l(x,y,z,T)$ is the steady-state leakage power density. Of these three power consumption components, $g_i$, $g_s$, and $g_l$, some embodiments only treat the leakage power consumption $g_l$ as temperature dependent. Other embodiments might also treat the switching power consumption and/or internal power consumption as temperature dependent.

The derivation of the temperature-dependent leakage power for a circuit module was described above. To compute the leakage power of a circuit module, the circuit module needs to have an associated temperature. The temperature of the circuit module is interpolated from the temperature of its neighboring nodes (e.g., as a weighted average based on the distance from the nodes of the element that wholly includes the circuit module, or from the nodes of the two or more elements that includes the circuit module).

The finite element equations (6)-(8) that were shown above are derived by discretizing the steady state heat flow equation:

$$\nabla \cdot [k(x,y,z,T)\nabla T(x,y,z)]=-g(x,y,z,T)$$

under the boundary condition $$k(x, y, z, T)\frac{\partial T(x, y, z)}{\partial n_i} + hT(x, y, z) = f(x, y, z),$$

where this steady state heat flow equation is a specific case of the more general heat flow equation $$\rho(x, y, z, T)C_p(x, y, z, T)\frac{\partial T(x, y, z, t)}{\partial t} = \nabla \bullet [k(x, y, z, T)\nabla T(x, y, z, t)] + g(x, y, z, T, t).$$

In these equations, again, x, y, and z are point coordinates in the region, t is time, T(x,y,z,t) is instantaneous temperature at any point, g(x,y,z,T,t) is the power density of a heat source 705 at a point, k(x,y,z,T) is the thermal conductivity, p(x,y,z,T) is the material density, $C_p$(x,y,z,T) is the specific heat, h is the heat transfer coefficient on the boundary, and n is the outward direction of the boundary surface.

In some embodiments, the above equations and formulations are implemented by taking into account the wiring of the IC design layout. In other words, in some embodiments, these equations look at the dielectric component and the wiring component of the IC design layout. Section IV below further describes different implementations of the above equations and computations to take into account wiring in the IC design layout.

IV. Taking into Account Wiring in an IC Design Layout

In some embodiments, the wiring of an IC design layout effectively changes the thermal conductivity of the IC design layout. Thus, the thermal analysis of the IC design layout must take into account wiring component of the IC design layout. Different embodiments may account for the wiring component differently. Some embodiments may use a crude approximation of the wiring component of the IC design layout. Additionally, some embodiments may use a very detailed analysis of the wiring component of the IC design layout. In addition, some embodiments may use a balanced approach between using the crude approximation and the detailed analysis of the wiring component in the IC design layout. Some of these different implementations are further described below.

As mentioned above, some embodiments of the invention use the heat flow equations (6) and (7) to compute groups of values that account for the dielectric component and wiring component of the IC design layout. These groups of values are based on how the design layout is divided, in some embodiments. Different embodiments divide the IC design layout differently. Some embodiments divide the IC design layout such that a particular element comprises a particular portion of a particular layer of the IC design layout (e.g., half of a portion of a particular layer). In some embodiments, the IC design layout is divided into several uniform size elements. Each element can include a dielectric component, a wiring component, or different combinations of dielectric and wiring components. For example, an element can include more than one wire in some instances. Once the IC design layout is divided into several elements, the groups of values for the above heat flow equations can be computed, in some embodiments. Different embodiments may compute these groups of values differently.

In some embodiments of the invention, a conductivity group of values that accounts for wiring is computed based on a set of equivalent thermal conductivity values ($k_{equivalent}$), which is further described below. In some embodiments, the conductivity group of values is an element group of values (e.g., element matrix) for a particular element (e.g., element 605) of the IC design layout. In some embodiments, the element group of values is first computed for the dielectric component of the IC design layout and then the element group of values is updated/adjusted to account for the wiring component of the IC design layout. However, before describing a process for computing an element group of values, a process for computing an equivalent thermal conductivity value will first be described below.

A. Computing an Equivalent Thermal Conductivity Value (k)

As indicated above, the element group of values for an IC design layout is derived by using Equation (6). This particular equation is based on a particular thermal conductivity value. In some embodiments, this particular thermal conductivity value is the thermal conductivity value of a dielectric for the IC design layout. In other embodiments, a different thermal conductivity value may be used for performing a thermal analysis of the IC design layout.

For example, some embodiments of the invention use a set of equivalent thermal conductivity values in Equation (6). In some embodiments, an equivalent thermal conductivity value is used to account for the effect of wiring in heat transfer in the IC design layout. This equivalent thermal conductivity value is based on the notion that a particular non-homogeneous element (e.g., element with more than one different component, each component having different thermal conductivity values) has an equivalent homogeneous element with an equivalent thermal conductivity value. In some embodiments, the equivalent thermal conductivity value is an effective thermal conductivity value.

Figure 8:
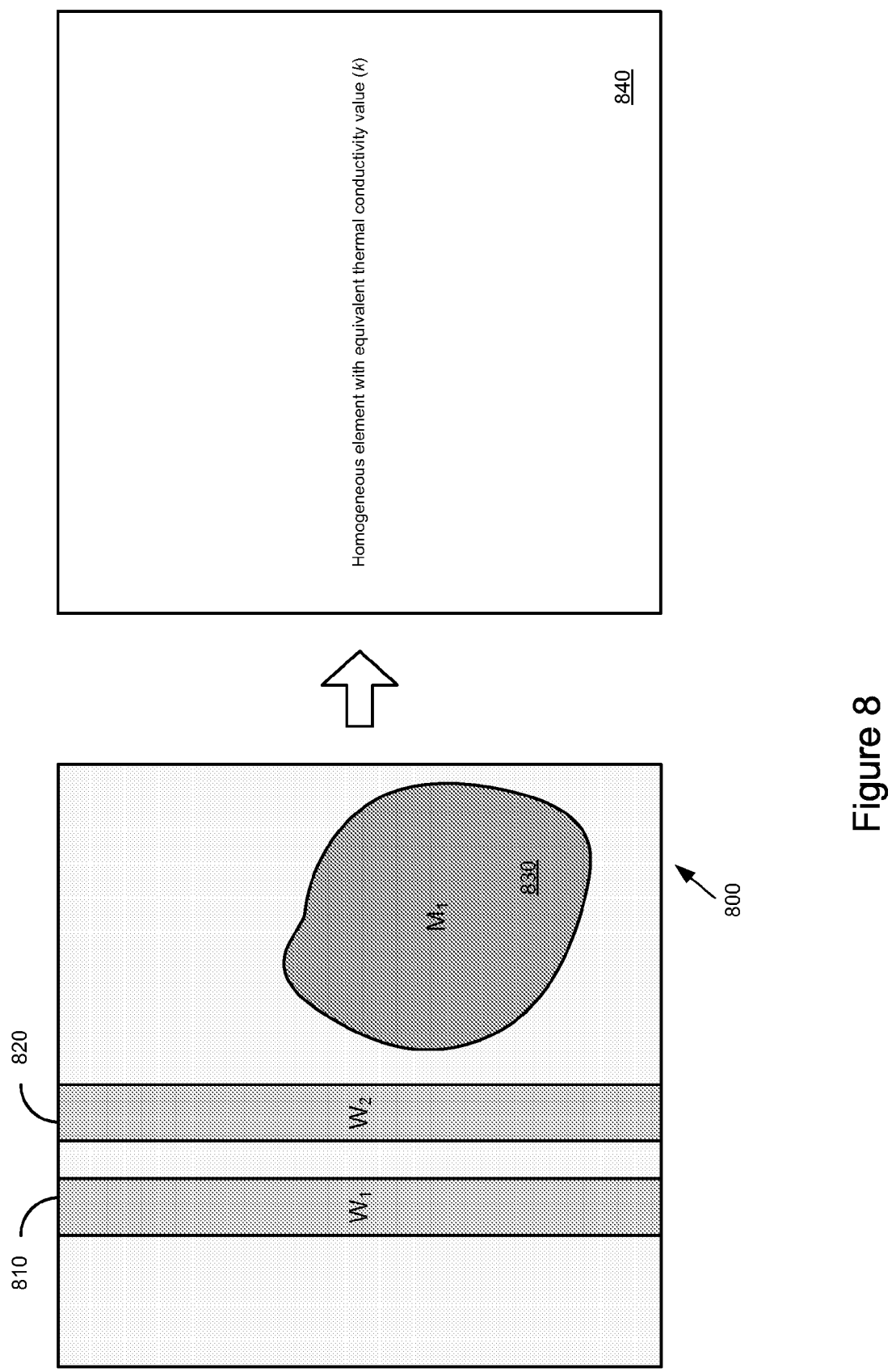
FIG. 8 illustrates the concept of an equivalent homogeneous element.

FIG. 8 conceptually illustrates this notion of an equivalent element. As shown in this figure, non-homogeneous element 800 includes two wires 810-820 and a residual area 830. The wires 810-820 and residual area 830 are made up of a particular material that is different than the dielectric of the non-homogeneous element 800. This particular material has a thermal conductivity value that is different than a thermal conductivity value of the dielectric. In some embodiments, the non-homogeneous element 800 may have a thermal conductivity value that is somewhere in between the thermal conductivity value of the particular material and thermal conductivity of the dielectric. This non-homogeneous element 800 can be represented by a homogeneous element 840 that includes a material with an equivalent thermal conductivity value. A process for computing an equivalent thermal conductivity value is described below in Section ii.

i. Element Model

In some embodiments, the computation of an equivalent thermal conductivity value may be difficult because the non-homogeneous element is complicated. Accordingly, in some embodiments, a particular element model may be used to represent the non-homogenous element. This particular element model may be an approximation of the non-homogeneous element, in some embodiments. In other words, in some embodiments, the particular element model may be a simplification of the non-homogeneous element.

Figure 9:
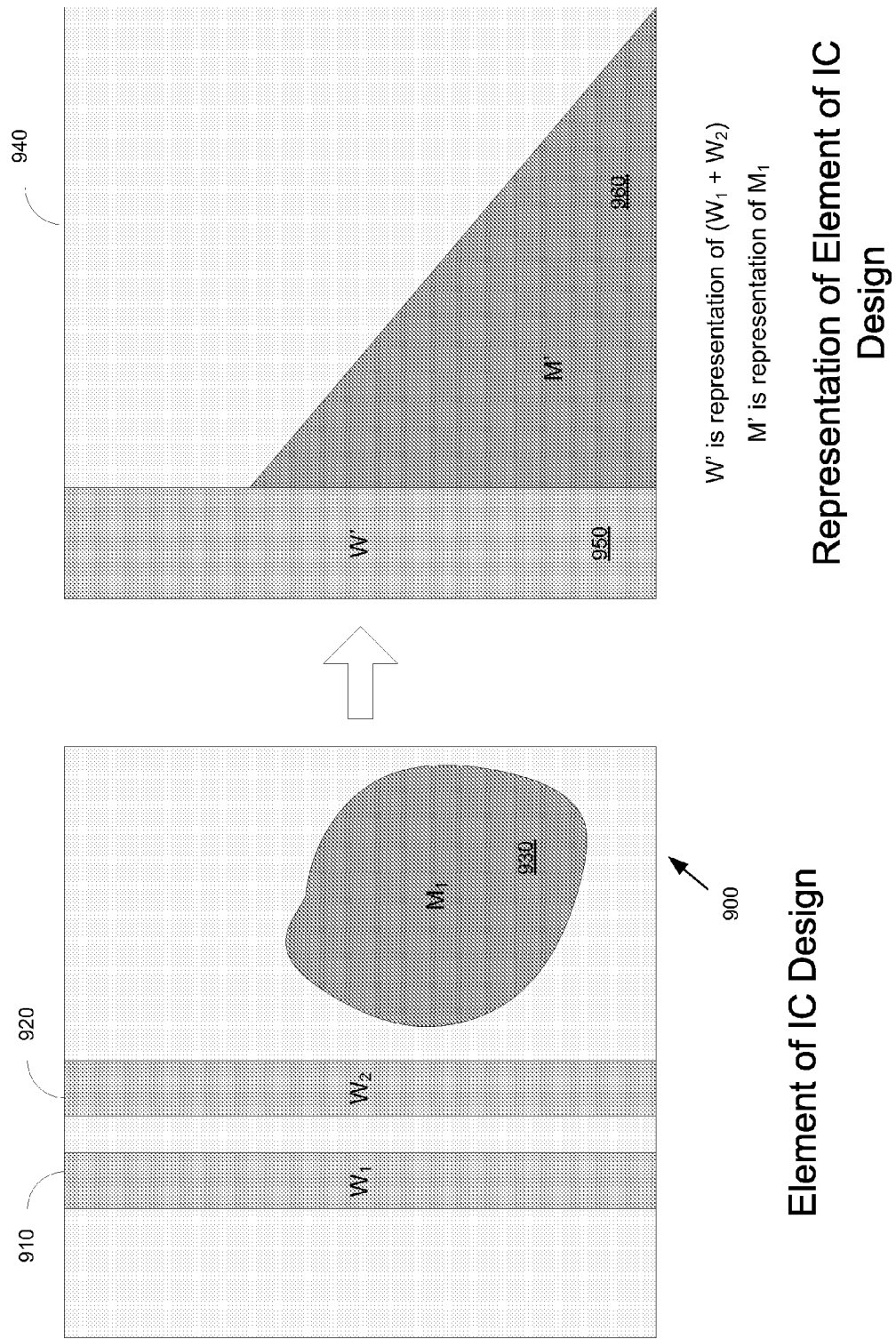
FIG. 9 illustrates an example of a particular element of the IC design layout that can be represented by an element model.

FIG. 9 illustrates an example of a particular element of an IC design layout that can be represented by an element model. As shown in this figure, the element 900 includes two vertical wires 910-920 and a residual area 930. In some embodiments, the residual area 930 is a conceptual illustration of non-dielectric components that are not full length wires. Partial length wires, vias, portion of a circuit module are examples of non-dielectric components, in some embodiments.

As further shown in FIG. 9, the element 900 can be represented by an element model 940. In this figure, the wires 910-920 are represented as wire 950 and residual area 930 is represented by residual area 960. The shape of the residual area 960 is triangular. However, different embodiments may use different shapes to represent the residual area 960.

Figure 10:
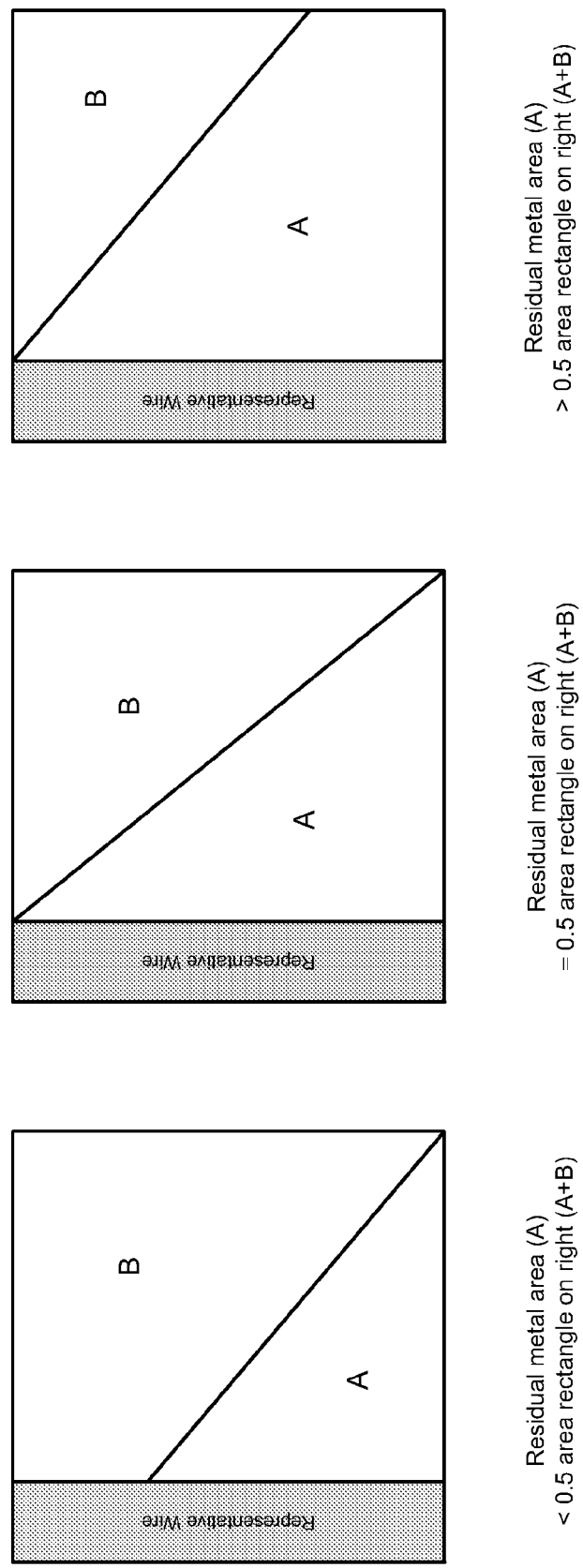
FIG. 10 illustrates several types of element model that can be used in some embodiments.

In addition, different embodiments may use different element models. FIG. 10 illustrates three different element models based on how large the residual area is relative to an area that includes the residual area (A) and the dielectric area (B). Once an element model is specified, an equivalent thermal conductivity value may be computed in some embodiments. Section ii below describes a process for computing an equivalent thermal conductivity value.

ii. Process for Computing Equivalent Thermal Conductivity Value

Figure 11:
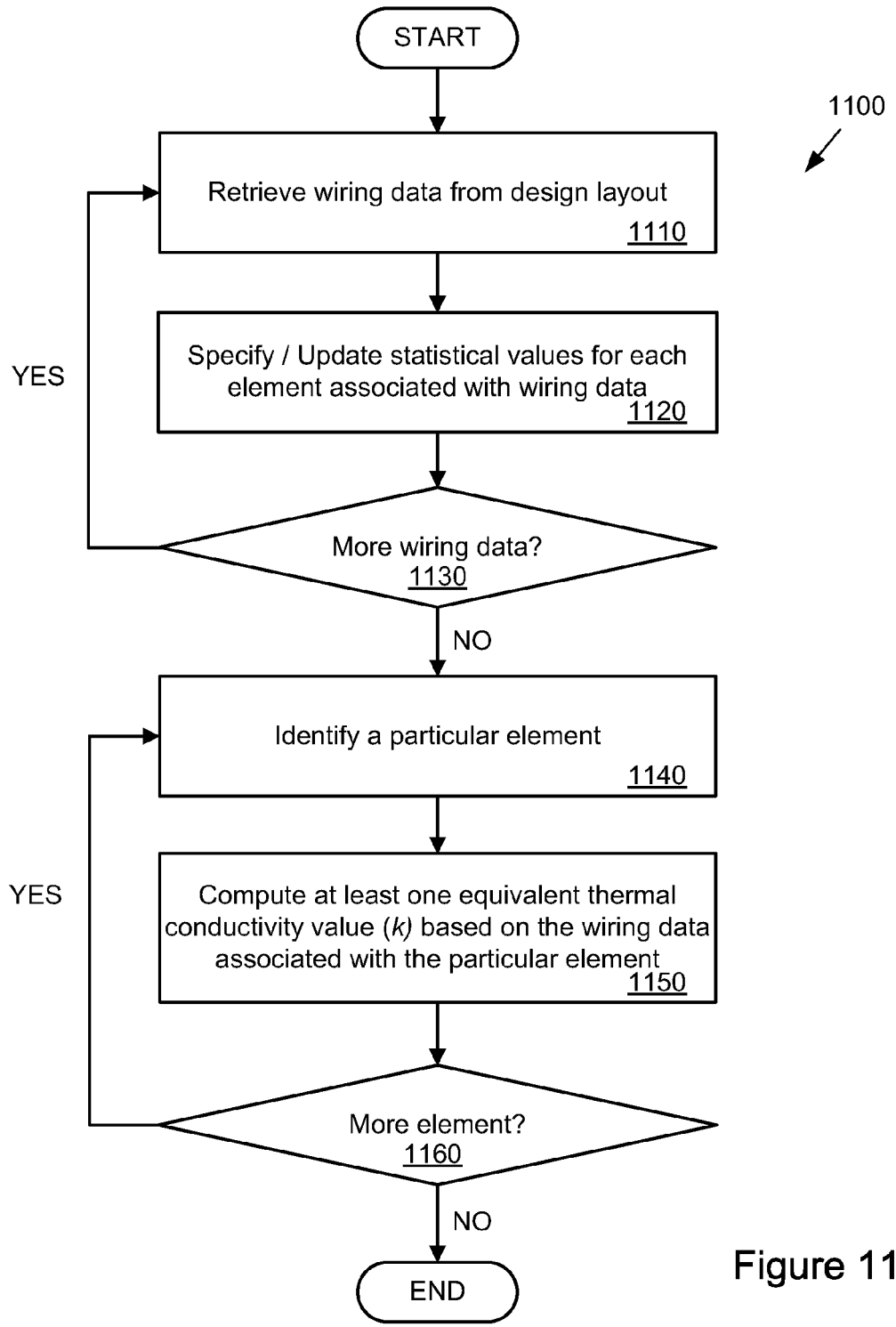
FIG. 11 illustrates a process for computing an equivalent thermal conductivity value.

FIG. 11 illustrates a process 1100 for computing an equivalent thermal conductivity value (k). In some embodiments, the process 1100 is performed after an IC design layout has been divided in sets of elements. As indicated above, each element may be of uniform size and may include a dielectric component, a wiring component, or a combination of dielectric and wiring components.

As shown in FIG. 11, the process 1100 retrieves (at 1110) wiring data from the IC design layout. In some embodiments, this includes retrieving a set of wiring segments that are associated with a first net of the IC design layout. The process 1100 then computes (at 1120) for each element, statistical values associated with the wiring data that is retrieved. In some embodiments, the statistical value includes the total width of full length wires in each element. In some embodiments, the total width is computed for a set of different directions (e.g., x, y). In addition, some embodiments also compute the total residual area of the element. In some embodiments, the total residual area may include partial length wires (e.g., wires that do not go through the entire element) and/or vias.

The process 1100 then determines (at 1130) whether there is more wiring data (e.g., whether there is one more net). If so, the process 1100 proceeds to 1110 to retrieve another set of wiring data (e.g., another set of wiring segments associated with another net) and then updates (at 1120) the statistical values for each element based on the other set of wiring data. In some embodiments, updating the statistical values includes adding the values of the width of the full length wires and the residual area to a previous total width and total residual area.

If the process 1100 determines (at 1130) there are no more wiring data to retrieve, the process 1100 then proceeds to identify (at 1140) a particular element from the set of elements. The process 1100 computes (at 1150) at least one equivalent thermal conductivity value for the particular element the wiring data that is associated with the particular element. The process for computing the equivalent thermal conductivity value will be further described below in detail.

After computing (at 1150) the equivalent thermal conductivity value, the process 1100 then determines (at 1160) whether there is another element. If so, the process 1100 proceeds to 1140 to identify another element and then computes (at 1150) an equivalent thermal conductivity value for this identified element. The process 1100 ends when there are no more elements to be identified.

Figure 12:
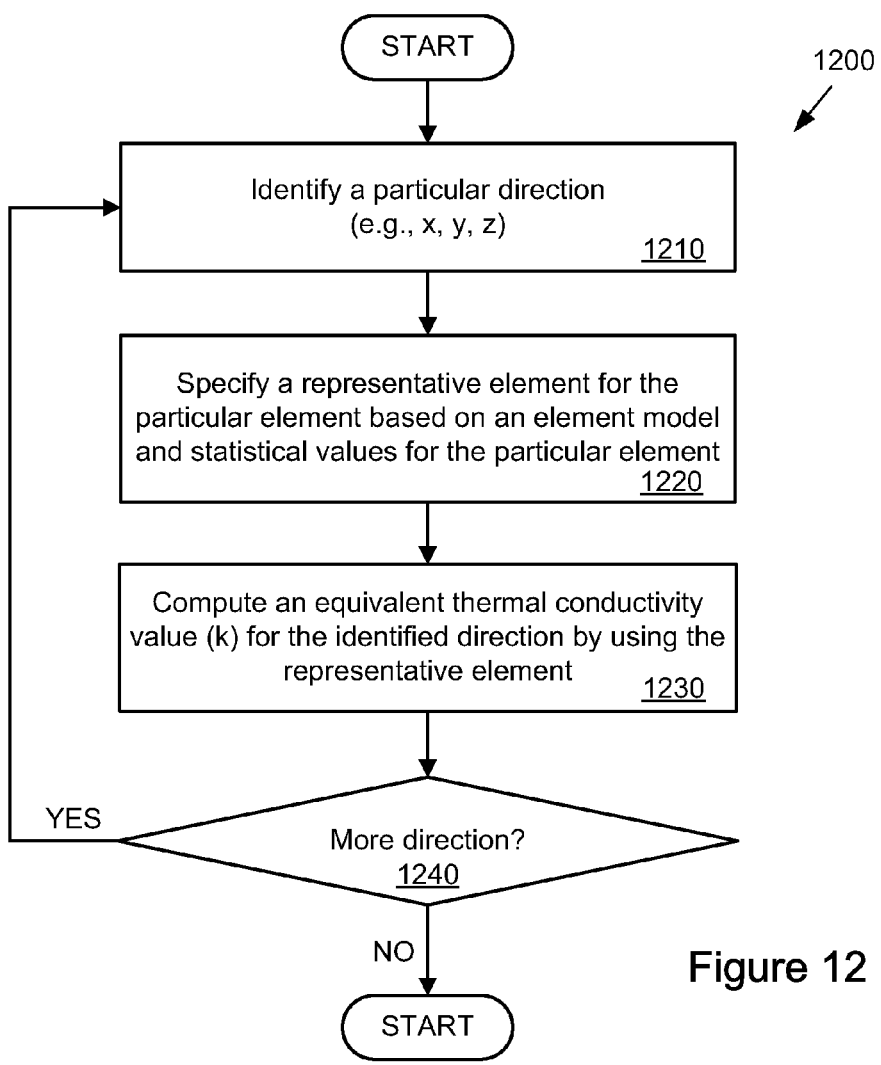
FIG. 12 illustrates a process for computing several equivalent thermal conductivity values along different directions.

FIG. 12 illustrates a process 1200 that some embodiments use to compute the equivalent thermal conductivity value during step 1150 of process 1100. As shown in this figure, the process 1200 identifies (at 1210) a particular direction for an element. The process 1200 then specifies (at 1220) a representative element for the particular element based on an element model and statistical values computed for the particular element. The process 1200 computes (at 1230) an equivalent thermal conductivity value based on the representative element.

Next, the process 1200 determines (at 1240) whether there is another direction for the element. If so, the process 1200 proceeds back to 1210 to identify another direction. If not, the process 1200 ends.

Figure 13:
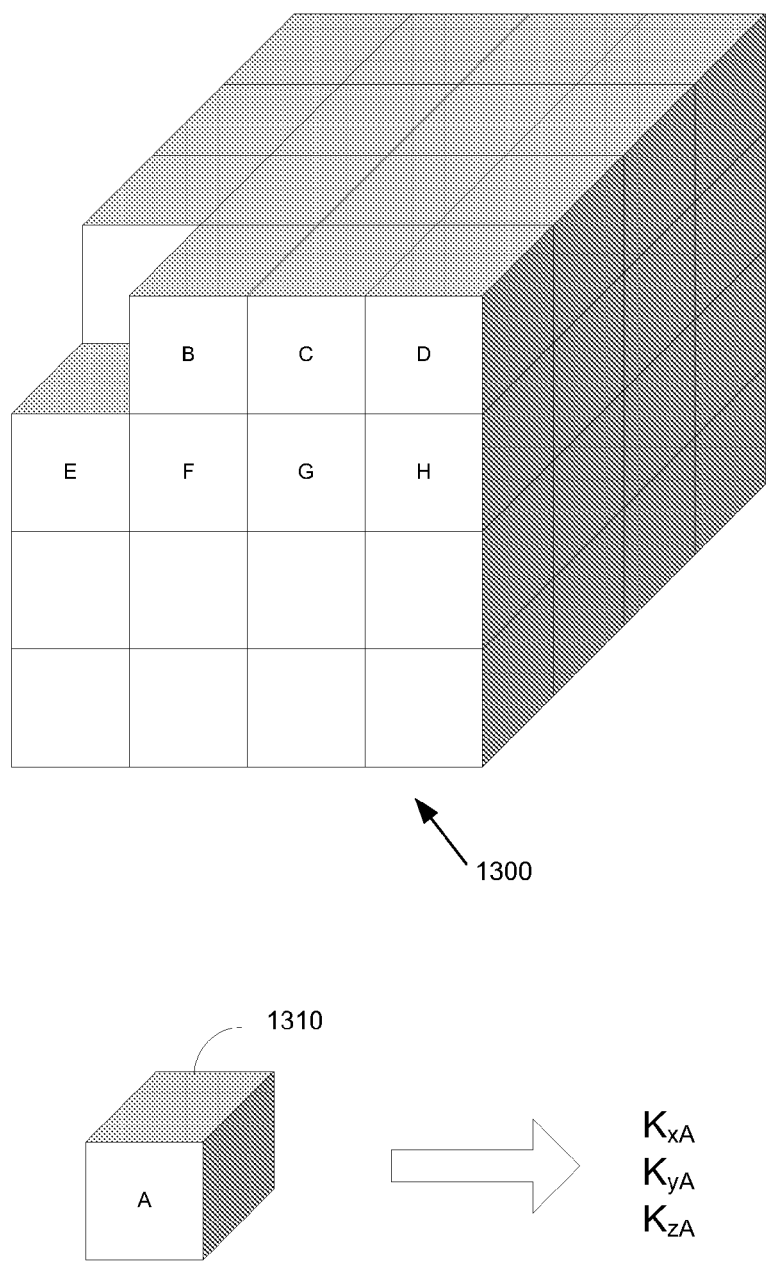
FIG. 13 illustrates a conceptual representation of thermal conductivity values that are computed for a particular element.

FIG. 13 illustrates a conceptual illustration of thermal conductivity values that are computed for a particular element 1310 from a set of elements 1300. As shown in this figure, for the element 1310, three equivalent thermal conductivity values are computed, one in the x-direction, one in the y-direction and one in the z-direction.

In some embodiments, once the equivalent thermal conductivity values have been computed for each element, these equivalent thermal conductivity values may be used in Equation (6) above to compute the element group of values.

Figure 14:
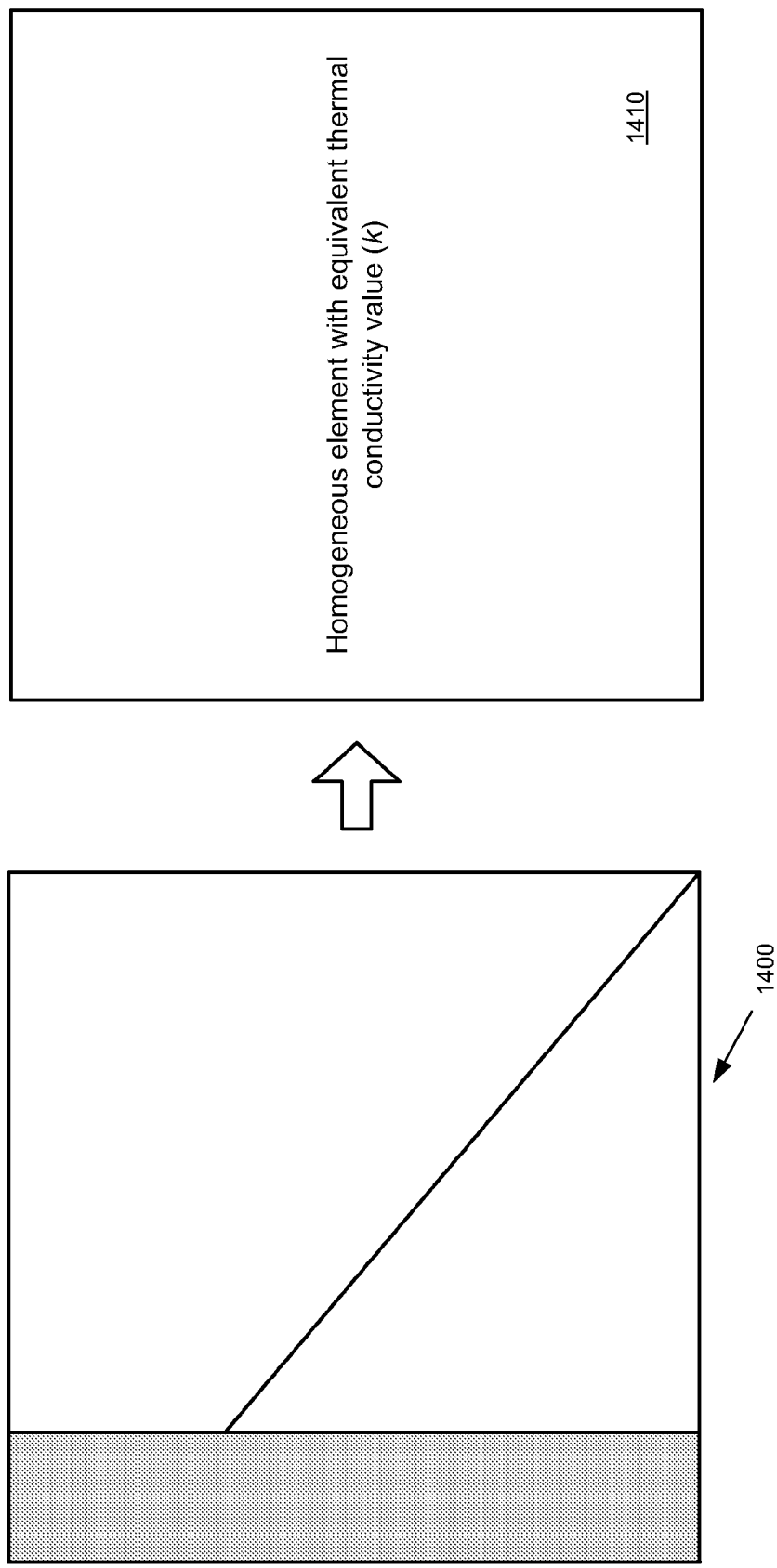
FIG. 14 illustrates the concept of an equivalent homogeneous element.

FIG. 14 conceptually illustrates the notion of an equivalent homogeneous element that is representative of a particular element includes wiring and/or residual metal area. As shown in FIG. 14, after an element model 1400 is identified for a particular element, some embodiments of the invention specify a particular homogeneous element 1410 with a particular equivalent thermal conductivity value.

An equivalent thermal conductivity value for an element can be computed by understanding the properties of a material as it relates to thermal conductivity. For example, the thermal conductance of a material is based on the thermal conductivity of the material. The reciprocal of a conductance of the material is the thermal resistance of the material. In some embodiments, the thermal resistance of the material is analogous to a resistance of a resistor in a circuit.

Figure 15:
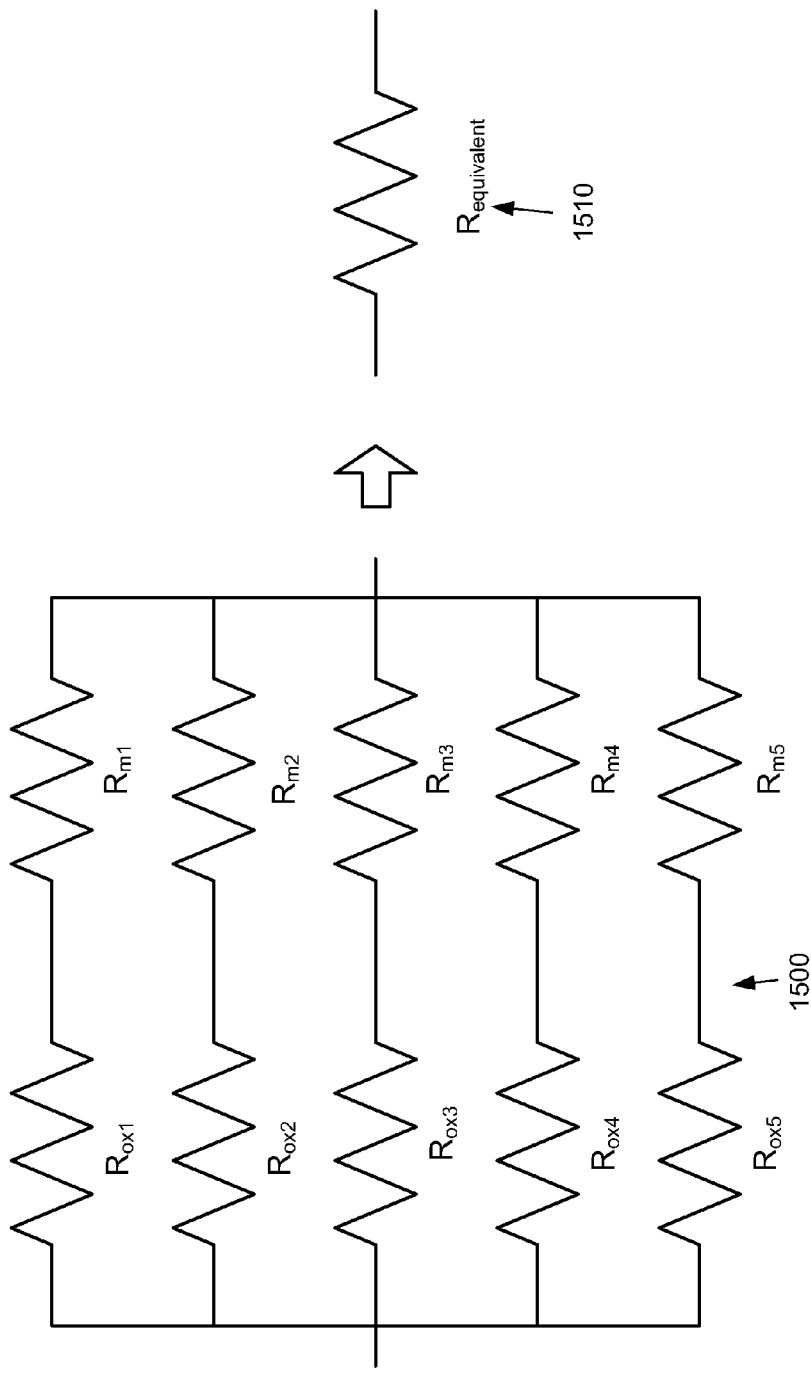
FIG. 15 illustrates the concept of computing an equivalent resistor for a particular circuit.

In view of this, an equivalent thermal resistance of the material, and thus ultimately an equivalent thermal conductivity value of the material can be computed under the same principles as computing an equivalent electrical resistance in a circuit. FIG. 15 conceptually illustrates how to compute an equivalent electrical resistor based on a set of resistors that are connected in series and in parallel in a particular electrical circuit. As shown in this figure, the circuit 1500 includes five paths in parallel to each other. Each of these paths includes two resistors in series. As further shown in FIG. 15, the equivalent resistor of the equivalent circuit 1510 can be computed by using Equation 1520.

Figure 16:
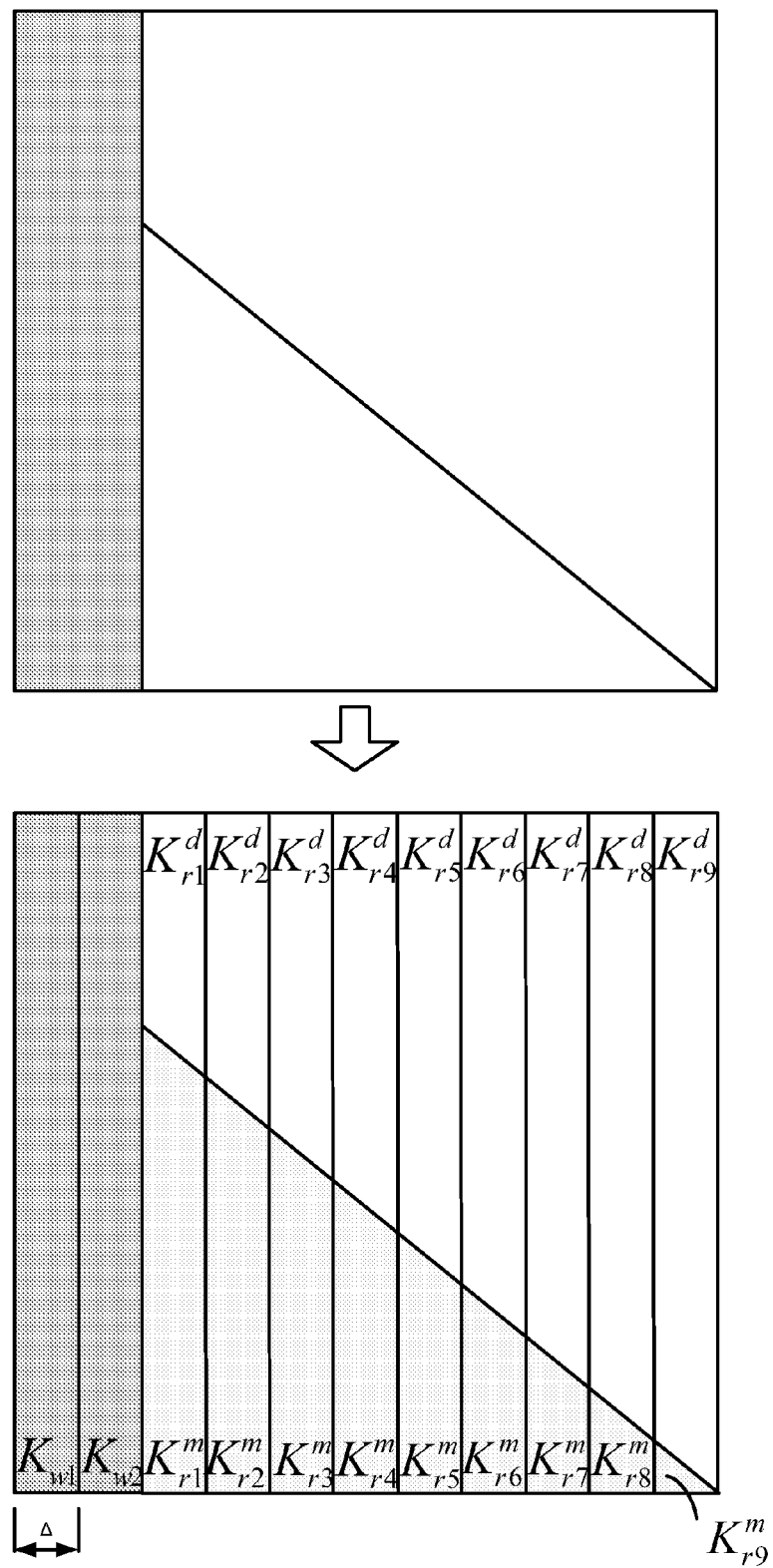
FIG. 16 illustrates the division of an element model into delta sections.
Figure 17:
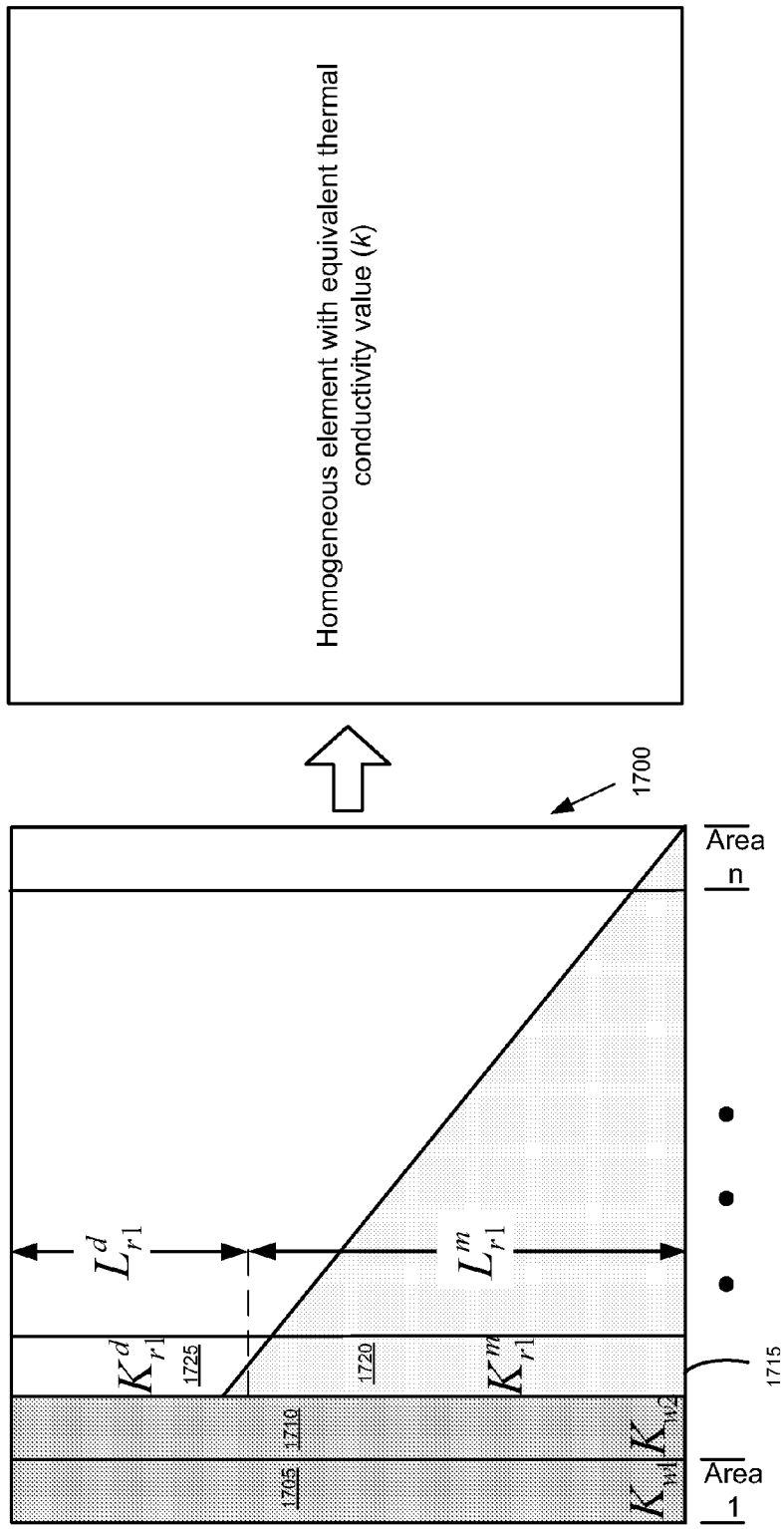
FIG. 17 illustrates the concept of computing an equivalent thermal conductivity value based on thermal conductivity values of the delta sections.

Some embodiments apply this principle to compute an equivalent thermal conductivity value for a particular element. FIG. 16 illustrates a particular element model that is divided into a set of areas. Each of these areas has a width of delta. Each area has a corresponding thermal conductivity value (e.g., $K_i$). The thermal conductivity of a particular area is based on the composition of the area. FIG. 17 illustrates an element 1700 that is divided into n areas, including areas 1705, 1710 and 1715. As shown in this figure, areas 1705 and 1710 have wiring. Therefore, the thermal conductivity value of each of these two areas is the thermal conductivity value of the wiring material (i.e., $K_w$). As further shown in FIG. 17, area 1715 includes metal component 1720 and dielectric component 1725 that each have their own respective thermal conductivity values K and $K_{r1}^m$ and $K_{r1}^d$, respectively. In some embodiments, the corresponding thermal conductivity value of an area that includes a metal component and a dielectric component can be computed by using the following equation, since the metal component and the dielectric can be considered as connected in series:

$$\frac{L_{r1}^d + L_{r1}^m}{K_{r1}} = \frac{L_{r1}^m}{K_{r1}^m} + \frac{L_{r1}^d}{K_{r1}^d} \tag{9}$$

where $K_{r1}$ is the thermal conductivity of the area that includes metal and dielectric components, $K_{r1}^m$ is the thermal conductivity of the metal component, $K_{r1}^d$ is the thermal conductivity of the dielectric component, $L_{r1}^m$ is the length of the metal component in the area, $L_{r1}^d$ is the length of the dielectric component in the area.

Rearranging the above equation yields the following equation, which can be used to compute the corresponding thermal conductivity of a particular first area that includes metal and dielectric components:

$$K_{r1} = \frac{(L_{r1}^d + L_{r1}^m) \times K_{r1}^m \times K_{r1}^d}{(L_{r1}^m \times K_{r1}^d) + (L_{r1}^d \times K_{r1}^m)} \tag{10}$$

Figure 18:
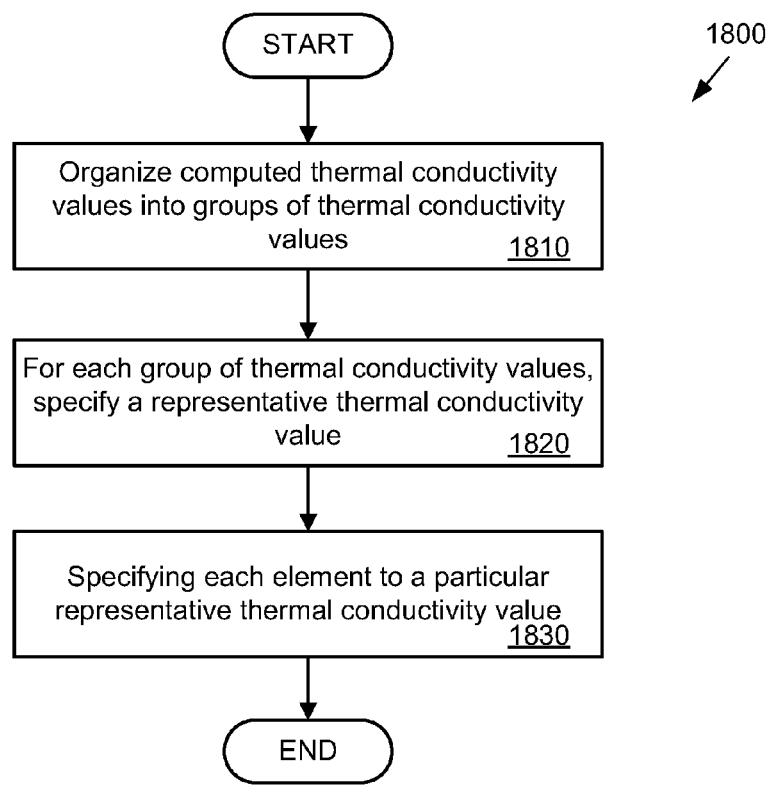
FIG. 18 illustrates a process for binning thermal conductivity values.

To compute the equivalent thermal conductivity value of a particular element, some embodiments use an average value of the thermal conductivity value of all areas of the particular element. The average value can be computed by using the equation below.

$$K_{Equivalent} = \frac{1}{n}\sum K_i \tag{11}$$

where $K_i$ is the thermal conductivity value of a particular area i. However, different embodiments may compute an equivalent thermal conductivity value differently.

iii. Reducing the Number of Different Equivalent Thermal Conductivity Values In some embodiments, computing an equivalent thermal conductivity value for each element produces many different equivalent thermal conductivity values. Some embodiments of the invention may reduce the number of different equivalent thermal conductivity values that may be assigned to the elements. FIG. 18 illustrates how the number of different thermal conductivity values may be reduced in some embodiments. As shown in FIG. 18, the process 1800 organizes (at 1810) the thermal conductivity values into groups of thermal conductivity values. Different embodiments may groups these thermal conductivity values differently. For example, all thermal conductivity values that are within a threshold value of a first value may be grouped together in a first group and all thermal conductivity values that are within the threshold value of a second value may be grouped in a second group.

Once the thermal conductivity values have been grouped, the process 1800 specifies (at 1820) a representative thermal conductivity value for each group of thermal conductivity values. In some embodiments, the representative thermal conductivity value is an average thermal conductivity values in each particular group. However, different embodiments may specify representative values differently. For example, some embodiments may specify a median thermal conductivity values for each group.

Once the representative thermal conductivity values are specified (1820), the process 1800 specifies (at 1830) a particular representative thermal conductivity value for each element. Thus, in some embodiments, all elements that are associated with a particular group may be specified the same equivalent thermal conductivity value.

Figure 19:
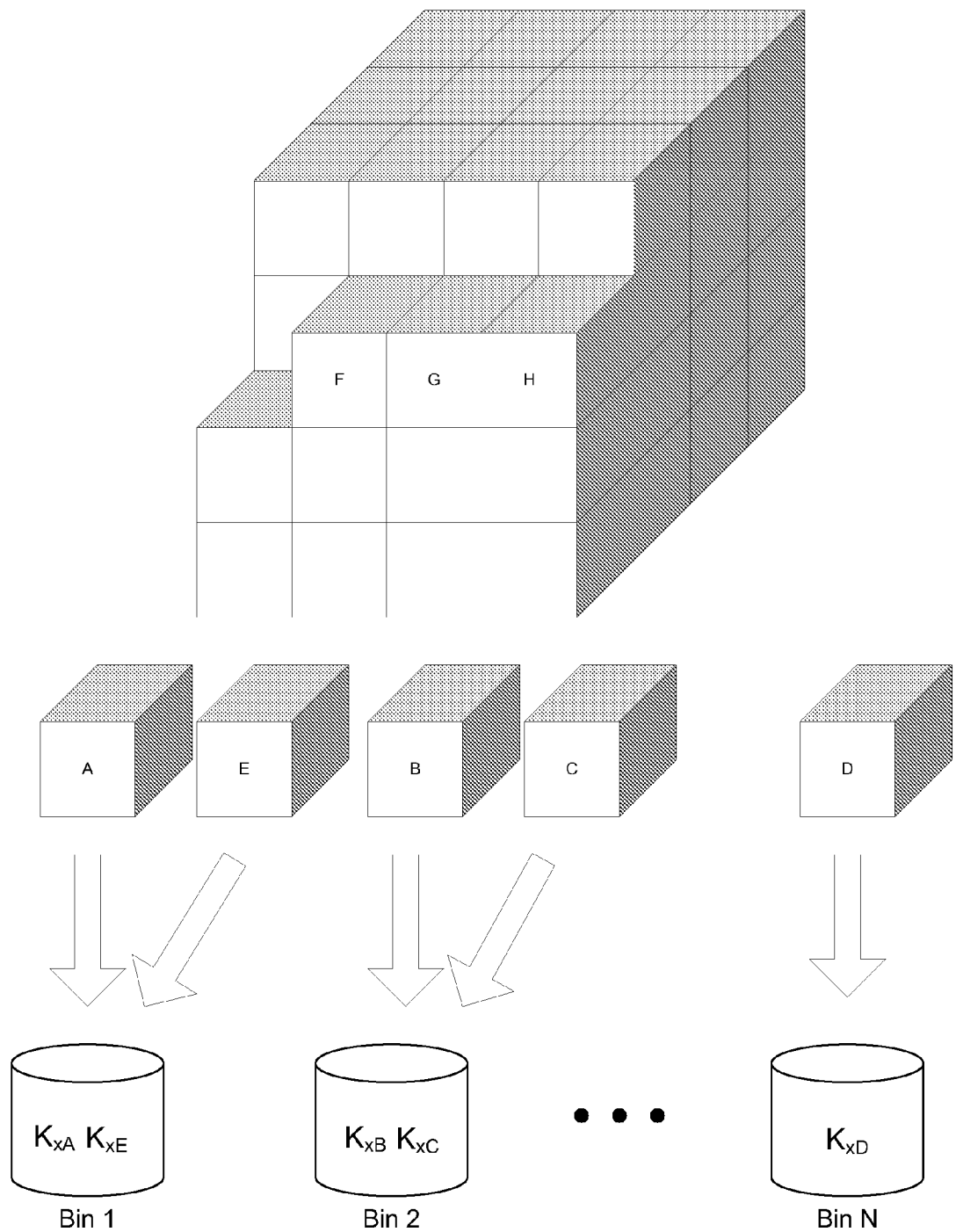
FIG. 19 illustrates a conceptual representation of binning thermal conductivity values.

FIG. 19 conceptually illustrates the process of FIG. 18 being implemented in some embodiments. As shown in FIG. 19, the equivalent thermal conductivity in the x-direction for each element is associated to a particular bin (e.g., group) from a set of bins (e.g., groups). Different embodiments may associate the equivalent thermal conductivity values differently. For example, different bins may be used for each particular direction. In addition, a group (e.g., bin) may include thermal conductivity values for different directions. In some embodiments, the entire range of possible equivalent thermal conductivity values in each spatial direction is divided into segments (e.g., bins with equal size). Some embodiments store the minimum equivalent thermal conductivity value as well as the bin size. In addition, each particular element is associated with a set of bin indices to specify which thermal conductivity bins each particular element falls into. The representative thermal conductivity can be computed on the fly based on those indices, the saved minimum equivalent thermal conductivity, and the bin size. Moreover, some embodiments store at least one thermal conductivity difference value relative to at least one of the minimum thermal conductivity values.

B. Computing an Element Group of Values that Accounts for Wiring

Figure 20:
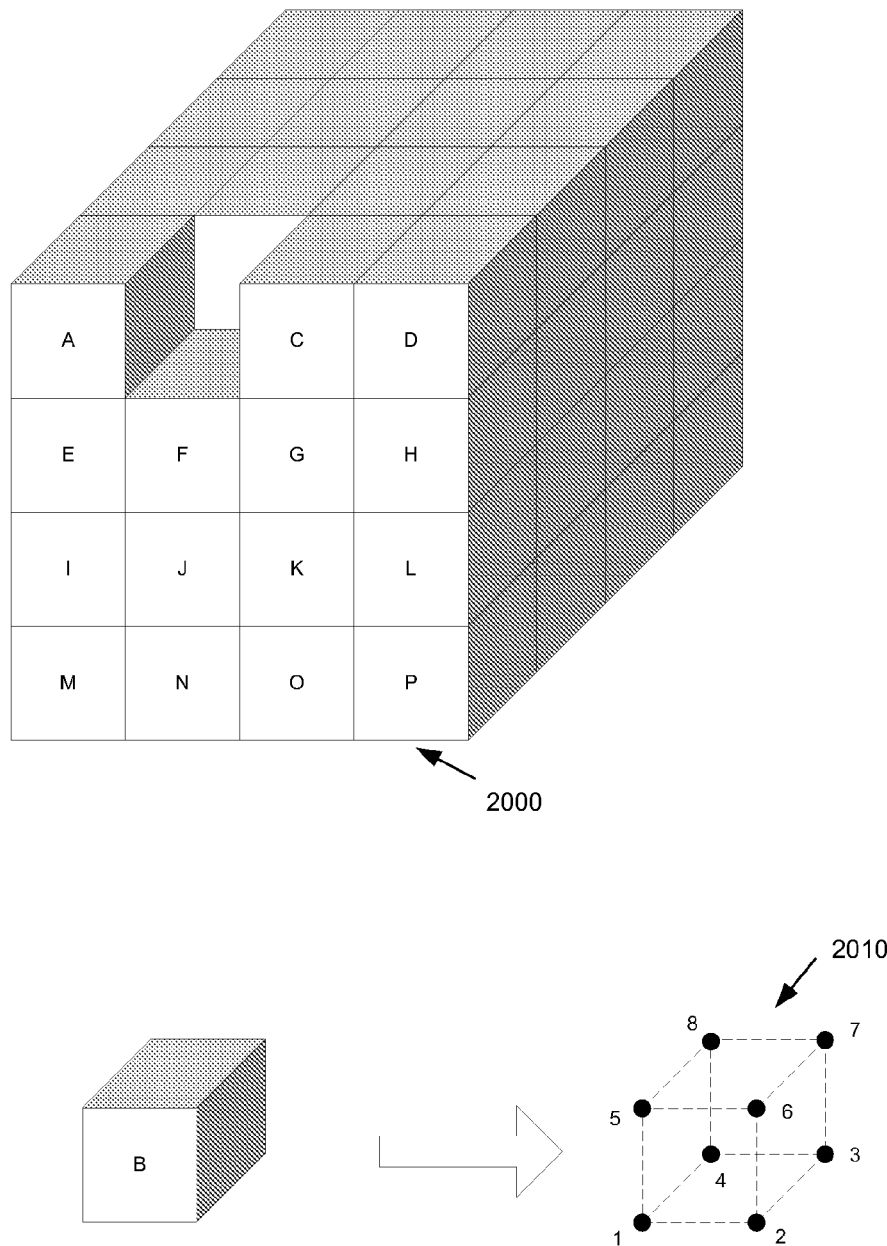
FIG. 20 illustrates a set of elements for an IC design layout, where each element includes eight nodes.

Some embodiments of the invention compute an element group of values that accounts for wiring by using parameterized functions obtained by carrying out a symbolic integration of a set of finite element equations for a set of wire location parameters. The set of finite element equations for heat transfer are well established and can be found for example in the book entitled "The Finite Element Method," 3rd ed. McGraw-Hill Book Company, New York, N.Y., 1977, by O. C. Zienkiewicz. The above book is hereinafter incorporated by reference. As mentioned above, the values of the element group of values are associated with entry values (e.g., $C_{ij}$). FIG. 20 illustrates an example of an IC design layout that is divided into several elements 2000. FIG. 20 further illustrates that each element includes eight nodes. In some embodiments, each element is associated with an n×n symmetric matrix (i.e., element matrix). For example, the element 2010 is associated with an 8×8 symmetric matrix, as shown below:

$$H = \begin{pmatrix} C_{11} & \ldots & C_{18} \\ \ldots & \ldots & \ldots \\ C_{81} & \ldots & C_{88} \end{pmatrix}$$

In some embodiments, the entry $C_{ij}$ describes how the heat flow at node i is affected when the temperature at node j changes. In addition, each node i in the element is associated with a shape function $N_i(x, y, z)$, as described above for Equation (6). In some embodiments, the shape functions associated with different nodes differ from each other. In some embodiments, the entry $C_{ij}$ in the matrix is calculated by using the following equation:

$$C_{ij} = \int_\omega \left[ k_x(x, y, z) \frac{\partial N_i(x, y, z)}{\partial x} \frac{\partial N_j(x, y, z)}{\partial x} + k_y(x, y, z) \frac{\partial N_i(x, y, z)}{\partial y} \frac{\partial N_j(x, y, z)}{\partial y} + k_z(x, y, z) \frac{\partial N_i(x, y, z)}{\partial z} \frac{\partial N_j(x, y, z)}{\partial z} \right] d\omega$$

where $\omega$ represents the volume of the element. To account for wiring, some embodiments consider the effects of metal wires as incremental additions of thermal conductivity to the element material. As a result, in some embodiments, the entry $C_{ij}$ is calculated by using the following equation:

$$C_{ij} = C_{ij\_dielectric} + \sum_{wires} \int_\omega \left[ \delta k_x(x, y, z) \frac{\partial N_i(x, y, z)}{\partial x} \frac{\partial N_j(x, y, z)}{\partial x} + \delta k_y(x, y, z) \frac{\partial N_i(x, y, z)}{\partial y} \frac{\partial N_j(x, y, z)}{\partial y} + \delta k_z(x, y, z) \frac{\partial N_i(x, y, z)}{\partial z} \frac{\partial N_j(x, y, z)}{\partial z} \right] d\omega$$

where $C_{ij\_dielectric}$ represents the value of $C_{ij}$ when the element is completely occupied by a dielectric. In some embodiments, the value $C_{ij\_dielectric}$ is computed once for each element. The summation in the above equation is a summation of the wires that are added to the particular element. In some embodiments, $\delta k_x(x, y, z)$, $\delta k_y(x, y, z)$, and $\delta k_z(x, y, z)$ represent the incremental conductivity when a wire segment is added to the particular element.

In some embodiments, performing a numerical integration of the above equation can be computationally extensive (i.e., it can take a long time). Accordingly, some embodiments parameterize the above equation to obtain the following parameterize function:

$$\int_\omega \delta k_x(x, y, z) \frac{\partial N_i(x, y, z)}{\partial x} \frac{\partial N_j(x, y, z)}{\partial x} d\omega = f_{i,j,x}(x_1, y_1, z_1, x_2, y_2, z_2, a, b, c, x_0, y_0, z_0)$$

where $x_1, y_1, z_1$ are the coordinates of the lower left corner of a wire in the element, $x_2, y_2, z_2$ are the coordinates of the upper right corner of the wire in the element, a, b, c are the width, depth, and height of the element, and $x_0$, $y_0$, $z_0$ are the coordinates of the lower left corner of the element, respectively. See e.g., FIG. 22. Note that the function name itself is indexed by i, j, and x, which signifies that this function describes the x relationship between nodes i and j. Similarly, functions $f_{i,j,y}(x_1, y_1, z_1, x_2, y_2, z_2, a, b, c, x_0, y_0, z_0)$ and $f_{i,j,z}(x_1, y_1, z_1, x_2, y_2, z_2, a, b, c, x_0, y_0, z_0)$ can be defined for the y and z direction. In some embodiments, these are all symbolic functions, and once the values of $x_1$, $y_1$, $z_1$, $x_2$, $y_2$, $z_2$ are known, the functions can easily be used to evaluate or compute the entry values of elements. The use of the functions is further described below in conjunction with computing an element group of values.

Figure 21:
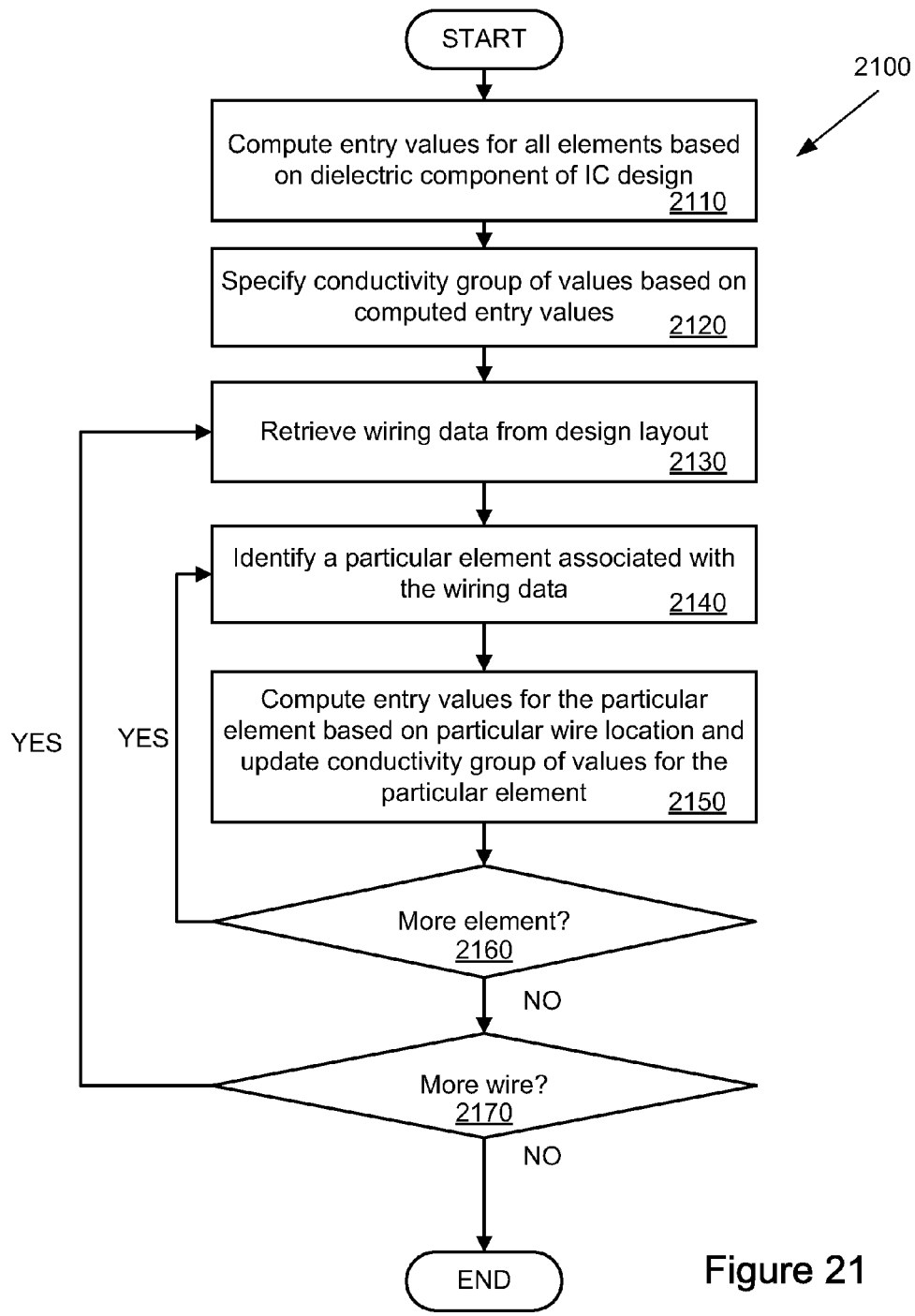
FIG. 21 illustrates a process for computing a conductivity group of values that take into account the wiring of the IC design layout.

FIG. 21 illustrates a process 2100 that is performed to compute an element group of values that accounts for wiring in some embodiments. In some embodiments, the process 2100 is performed after the IC design layout has been divided into a set of elements, as shown in FIG. 20.

The process 2100 computes (at 2110) node values for all the elements of the IC design based on the dielectric component of the IC design. The process 2100 specifies (at 2120) for each element, an element group of values based on the computed entry values. In some embodiments, the process 2100 uses Equation (6) to compute the entry values and specify the element group of values.

The process 2100 then retrieves (at 2130) wiring data from the IC design layout. In some embodiments retrieving wiring data includes retrieving one or more wire segments associated with a first net. The process 2100 identifies (at 2140) a particular element associated with the wiring data. The process 2100 computes (at 2150) entry values based on the retrieved wiring data and updates the element group of values for the particular element based on the computed entry values.

Figure 23:
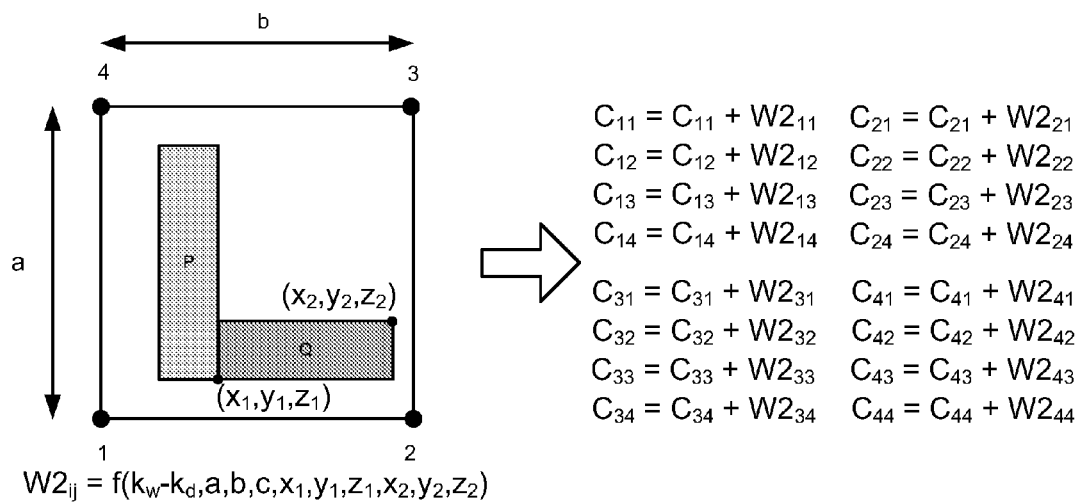
FIG. 23 illustrates the concept of computing another set of conductivity group of values.

In some embodiments, computing the entry value includes using the parameterized functions described above. FIG. 22 illustrates how entry values are computed based on wiring data in some embodiments. However, different embodiments may compute different numbers of entry values. The top portion of FIG. 22 conceptually illustrates the computation (at 2110) of entry values based on a dielectric value for the element. The bottom portion of FIG. 22 conceptually illustrates the computation (at 2150) of entry values based on a wiring in the element. FIG. 23 conceptually illustrates the computation (at 2150) of entry values based on another wire from the same net as the wire in FIG. 22. In some embodiments, once these entry values are computed, they are added (at 2150) to any previously computed entry values.

The process 2100 then determines (at 2160) whether there is another element that is associated with the retrieved wiring data. If so, then the process 2100 proceeds back to 2140 to identify another element. However, when the process 2100 determines (at 2160) there is no other element associated with the retrieved wiring data, the process 2100 determines (at 2170) whether there is more wiring data to be retrieved from the IC design layout (e.g., is there another net). If so, the process 2100 proceeds to retrieve (at 2130) another wiring data from the IC design layout. If not, the process 2100 ends.

The above sequence for computing entry values can be illustrated with the following example. FIG. 23 shows an element that includes two wires P and Q, characterized by $(xp_1, yp_1, zp_1, xp_2, yp_2, zp_2)$ and $(xq_1, yq_1, zq_1, xq_2, yq_2, zq_2)$ that are added consecutively in the element. In some embodiments, before any wire is added to the element, the value of entry $C_{12}$ in the element group of values is equal to the value associated with the dielectric of the element (i.e., $C_{12} = C_{12\_dielectric}$).

Once the first wire (P) is added to the element, the value of entry $C_{12}$ is equal to the entry value associated with the dielectric plus the values associated with the parameterized functions instantiated using values of wire P. In other words, $C_{12} = C_{12\_dielectric} + f_{1,2,x}(xp_1, yp_1, zp_1, xp_2, yp_2, zp_2, a, b, c, x_0, y_0, z_0)$ $+ f_{1,2,y}(xp_1, yp_1, zp_1, xp_2, yp_2, zp_2, a, b, c, x_0, y_0, z_0)$ $+ f_{1,2,z}(xp_1, yp_1, zp_1, xp_2, yp_2, zp_2, a, b, c, x_0, y_0, z_0)$ Similarly, after the second wire (Q) is added to the element, the value of entry $C_{12}$ is equal to $C_{12} = C_{12\_dielectric} + f_{1,2,x}(xp_1, yp_1, zp_1, xp_2, yp_2, zp_2, a, b, c, x_0, y_0, z_0)$ $+ f_{1,2,y}(xp_1, yp_1, zp_1, xp_2, yp_2, zp_2, a, b, c, x_0, y_0, z_0)$ $+ f_{1,2,z}(xp_1, yp_1, zp_1, xp_2, yp_2, zp_2, a, b, c, x_0, y_0, z_0)$ $+ f_{1,2,x}(xq_1, yq_1, zq_1, xq_2, yq_2, zq_2, a, b, c, x_0, y_0, z_0)$ $+ f_{1,2,y}(xq_1, yq_1, zq_1, xq_2, yq_2, zq_2, a, b, c, x_0, y_0, z_0)$ $+ f_{1,2,z}(xq_1, yq_1, zq_1, xq_2, yq_2, zq_2, a, b, c, x_0, y_0, z_0)$ As shown above, the computed values based on the parameterized functions are added to the previous entry values, in some embodiments.

Figure 24:
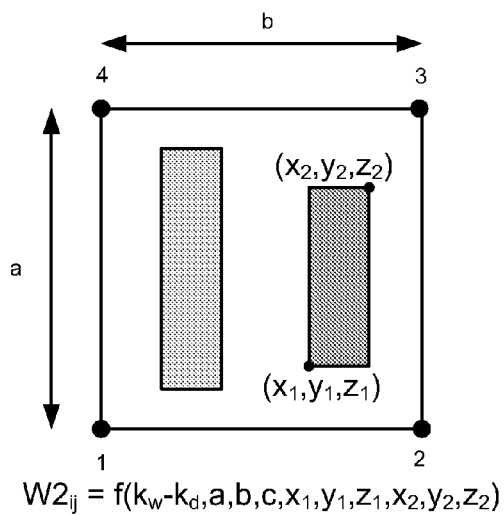
FIG. 24 illustrates the concept of computing another set of conductivity group of values for a wire of another net.
Figure 25:
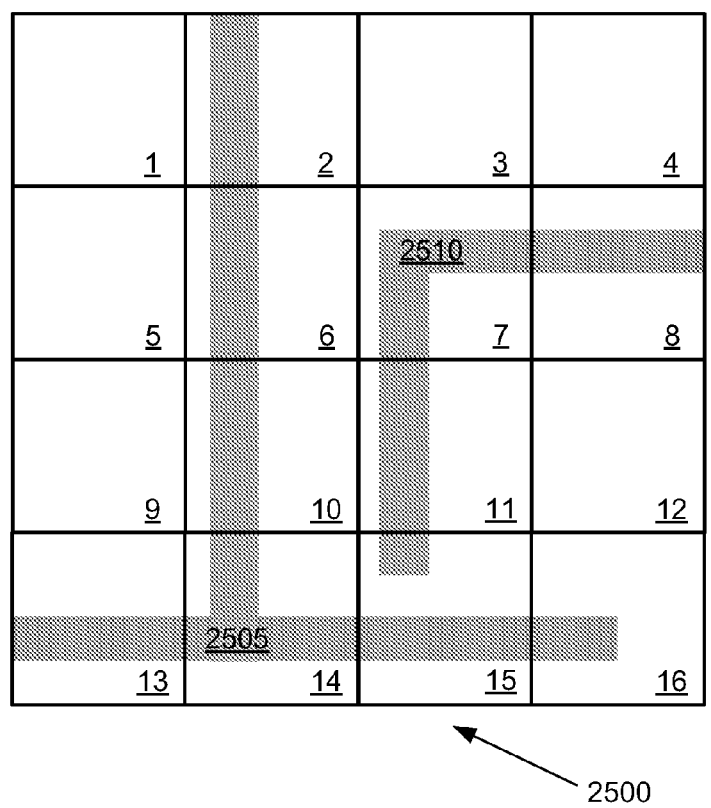
FIG. 25 illustrates several elements of an IC design layout that includes two nets.

Different embodiments may add wires in one or more elements differently. One implementation of a sequence for adding wires and computing entry values in the process 2100 will now be described with respect to FIGS. 24 and 25. FIG. 24 conceptually illustrates the computation (at 2150) of entry values based on another wire from a different net. As shown in this figure, the computation of this wire is similar to the wire in FIG. 23. FIG. 25 illustrates a subset 2500 of an IC design layout that is divided into sixteen (16) elements. As further shown in this figure, the IC design layout includes a first net 2505 and a second net 2510. In some embodiments, when the process 2100 is performed on the subset 2500, node values associated with elements 2, 6, 10, and 13-16 are first computed since these elements are associated with the first net 2505. Once the entry values have been computed for these elements, some embodiments then compute entry values associated with elements 7-8, 11 and 15, which are associated with the second net 2510. However, different embodiments may process these elements in a different sequence. For example, some embodiments may first process elements associated with the second net 2510 and then process elements associated with the first net 2505.

Once the element groups of values are computed, they can be used to solve the heat flow equation to compute the temperature distribution of the IC design layout, where the temperature distribution takes into account the wiring in the IC design layout. The solving of the heat flow equation will now be further described below in Section VI.

In some embodiments, the above processes are used to create elements for a substrate including through silicon vias (TSVs). Thus, in some embodiments, as part of analyzing the IC design layout, the above processes may also take into account the silicon component of the substrate (e.g., at 2110) and retrieve data on TSVs in the substrate (e.g., at 2130). The process of performing thermal analysis on an IC design layout that includes TSVs will now be further described below in Section V.

V. Through-Silicon Via ("TSV")

Integrated circuits are often connected and/or packaged with other ICs. Different ICs may be connected differently.

Some ICs are connected to each other through the substrate of at least one of the ICs. FIG. 26A illustrates an example of an IC/die 2600. As shown in this example, the IC 2600 includes a substrate 2610 and wiring layers 2620. As shown in FIG. 26A, the wiring layers 2620 include 4 wiring layers. As shown in this figure, the substrate 2610 includes vias 2630. In some embodiments, these vias 2630 are referred to as through-silicon vias ("TSVs").

FIG. 26A also illustrates solder balls 2640. In some embodiments, the solder balls 2640 are connected to the IC 2600. These solder balls 2640 are also connected to the TSVs 2630. In some embodiments, the substrate 2610 includes landing pads (not shown) that are contact points for the solder balls 2640. These landing pads act as an interface between the TSVs 2630 and the solder balls 2640. Thus, as shown in this figure, the solder balls 2640 and TSV 2610 create connections that allow the IC 2600 to communicatively connect to another IC.

FIG. 26B illustrates an enlarged portion 2650 of the substrate 2610 of FIG. 26A. The substrate portion 2650 is shown in FIG. 26A as the shaded area of the substrate 2610. As shown in FIG. 26B, the portion 2650 includes a portion of substrate 2610 and a TSV 2660.

TSVs can come in different shapes and sizes. FIG. 26C illustrates a cross-sectional view of the substrate portion 2650 that includes the substrate 2610 and the TSV 2660. As shown in this figure, the TSV 2660 has a circular cross-section. However, the TSV 2660 can have different cross-sections, such a square, rectangular, etc. For the purpose of clarity, the solder balls are not shown in FIGS. 26B and 26C.

In some embodiments, the substrate 2610 is divided into a set of elements when performing thermal analysis. Different embodiments may divide the portion differently. In some embodiments, the substrate is first divided horizontally to create horizontal layers. The horizontal layers are then divided vertically to define the elements. Although other embodiments may define the elements differently.

Once the elements have been defined, some embodiments perform thermal analysis by computing an equivalent thermal conductivity value, while some embodiments perform thermal analysis by using a parameterized function. The computation of equivalent thermal conductivity values for different element is further described below in conjunction with FIGS. 36, 37A, 37B, 37C, 38 and 39.

In some embodiments, TSVs are designed so that the TSVs' position aligns with the position of solder balls (e.g., solder ball grid array), as shown in FIG. 26A. The locations of where the solder balls meet with TSVs of a substrate are referred to as contact points. These contact points are landing pads that are connected to the TSVs.

In some embodiments, the TSVs may not align exactly with the solder balls. In such instances, an IC may be coupled to the solder balls through one or more redistribution layers. A redistribution layer (also referred to as a backplane wiring layer) allows a substrate which has already defined TSVs to connect with a ball grid array, even when the TSV don't exactly align with the ball grid array. Thus, instead of redesigning a substrate with a particular arrangement of TSVs from scratch to align the TSVs with the ball grid array, a redistribution layer may be used with an IC that includes a substrate with pre-defined TSVs. However, in some embodiments, even when an IC with a substrate that includes TSVs is designed from scratch, one or more redistribution layers may still be used.

Figure 27:
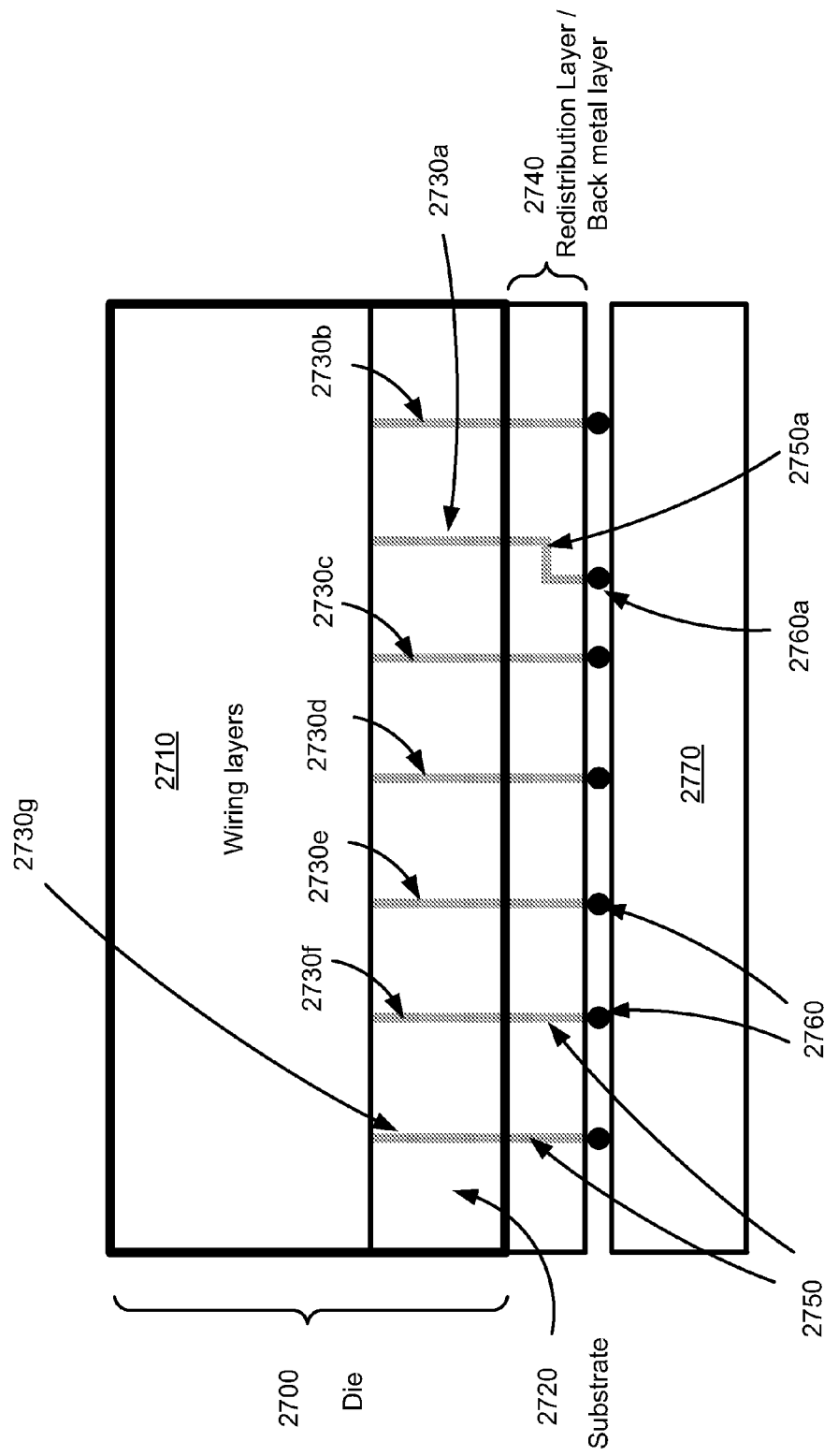
FIG. 27 illustrates an IC and a redistribution layer in some embodiments.

FIG. 27 illustrates an IC that is coupled to solder balls through a redistribution layer. This figure illustrates a die 2700 that includes wiring layers 2710 and a substrate 2720.

As shown in this figure, the substrate 2720 includes TSVs 2730. As further shown in this figure, the die 2700 is connected to solder balls 2760 through the redistribution layer 2740. As further shown in this figure, the redistribution layer 2740 includes connection components 2750 that redistributes the contact points (e.g., landing pads) from the TSVs 2730a-2730g.

Although one redistribution layer is shown in FIG. 27, several redistribution layers may be used. In some embodiments, the connection components 2750 are made of metal component, while the rest of the redistribution layer 2740 is a dielectric component. FIG. 27 further shows that one of the TSVs (i.e., TSV 2730a) is not vertically aligned with one of the solder balls (i.e., 2760a) that it is suppose to be connected to.

In order to facilitate the connection between TSV 2730a and solder ball 2760a, a connection component 2750a is used. In some embodiments, the connection component 2750 realigns the contact point of the TSV 2730a to the solder ball 2760a. As shown in this figure, the connection component 2750a traverses the redistribution layer 2740 vertically and horizontally. Although FIG. 27 illustrates one connection component 2750a that traverses the redistribution layer vertically and horizontally, some embodiments include more than one connection component that traverses vertically and horizontally the redistribution layer. As further shown in this figure, the solder balls 2760 are coupled to a substrate 2770. In other embodiments, the solder balls may be coupled to another IC.

In some embodiments, the redistribution layer is similar to a wiring layer. That is, the redistribution layer includes a metal component and a dielectric component. A redistribution layer may also be referred to as a back metal plane. FIG. 28 illustrates an IC with a redistribution layer that includes a metal component and a dielectric component. Specifically, FIG. 28 illustrates an IC 2800 with a substrate 2810, a redistribution layer 2820, solder balls 2830, and pads 2835. This figure also shows an area 2840 that includes a portion of the substrate 2810, the redistribution layer 2820, solder ball 2830, and pads 2835.

FIG. 29 illustrates the enlarged portion 2840 of FIG. 28. As shown in this figure, the enlarged portion 2840 includes a TSV 2900, the redistribution layer 2820, the solder ball 2830, and pads 2835. The redistribution layer 2820 includes a first metal component 2910, a second metal component 2920 and a dielectric component 2930. In some embodiments, the first metal component is a wiring component and the second metal component is a via. As shown in this figure, the first metal component 2910 and the second metal component 2920 allow the TSV 2900 to be connected to the solder ball 2830 and pads 2835.

Figure 30:
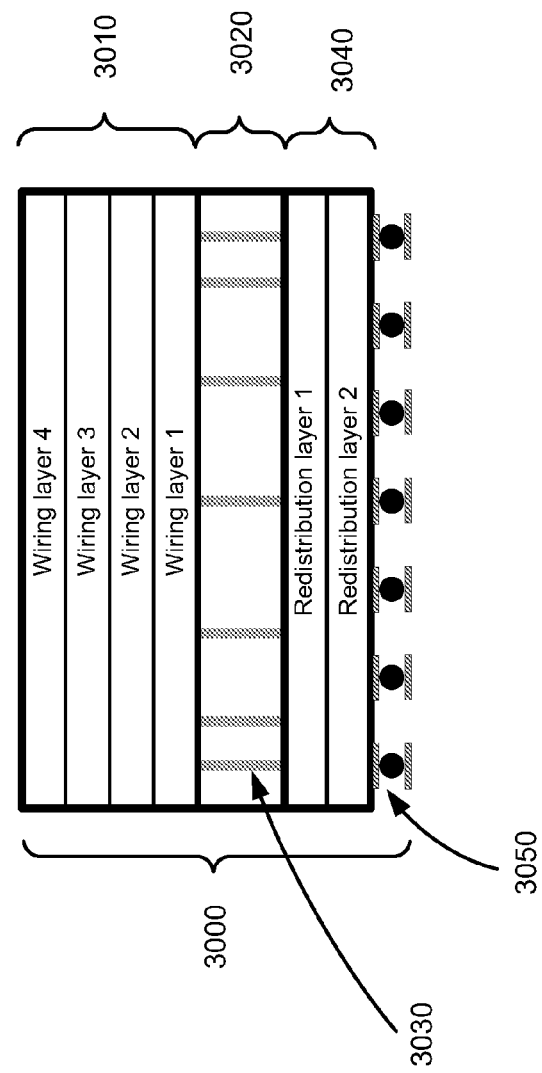
FIG. 30 illustrates an IC with several redistribution layers in some embodiments.

Although one redistribution layer is shown in FIGS. 28 and 29, some embodiments may use more than one redistribution layers. FIG. 30 illustrates such an example of the use of multiple redistribution layers with an IC in some embodiments. As shown in this figure, the IC 3000 includes four wiring layers 3010, a substrate 3020, TSVs 3030, two redistribution layers 3040 and several solder balls and pads 3050.

Figure 31:
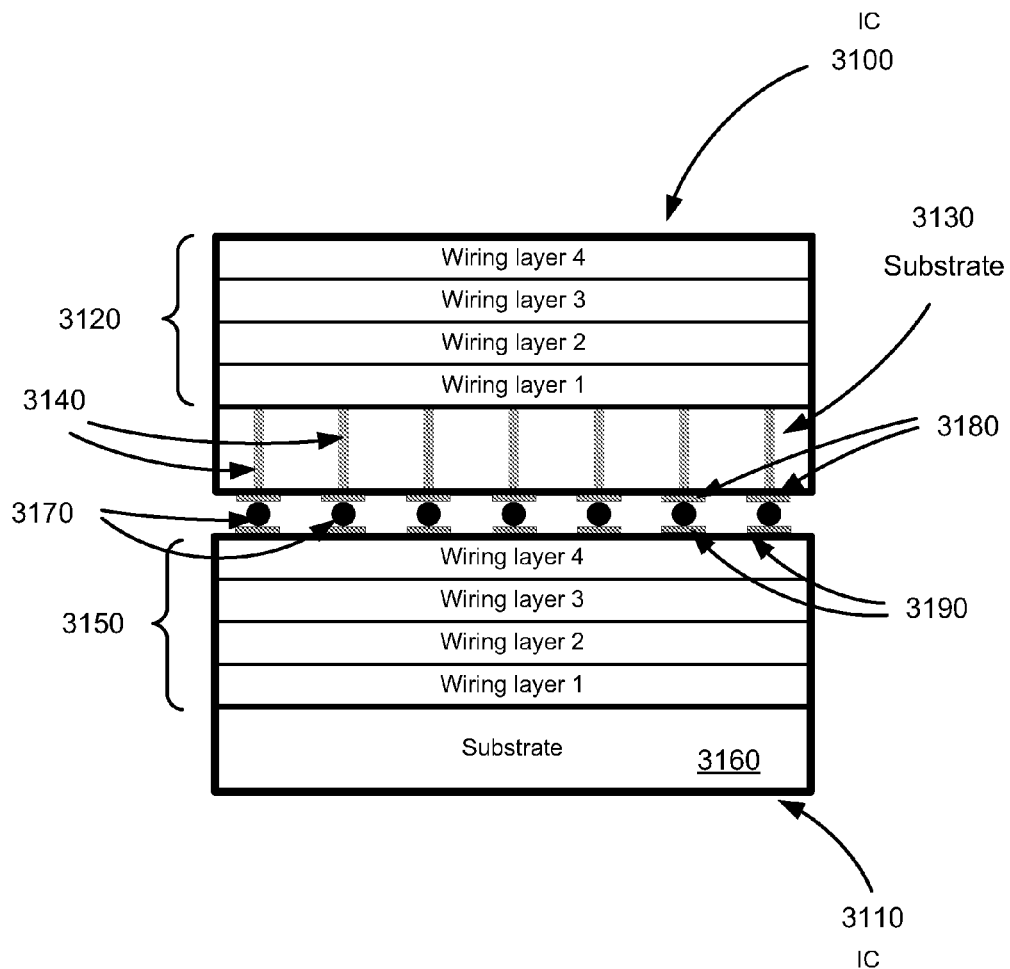
FIG. 31 illustrates two ICs coupled to each other, where one of the ICs has TSVs in some embodiments.

FIG. 31 illustrates an example of two ICs that are coupled to each other, where one of the ICs has TSVs. Specifically, FIG. 31 illustrates a first IC 3100 and a second IC 3110. The first IC 3100 includes wirings layers 3120 and a substrate 3130. The substrate 3130 includes a set of TSVs 3140. The second IC 3110 includes wiring layers 3150 and a substrate 3160. In some embodiments, the first and second ICs 3100-

3110 are connected to each other through a set of solder balls 3170, a first set of landing pads 3180, and a second set of landing pads 3190.

Thermal analysis can be performed on each IC (e.g., IC 3100 and IC 3110) separately in some embodiments. A method for performing thermal analysis on more than one IC is further described in U.S. patent application Ser. No. 12/180,490, filed Jul. 25, 2008, now issued as U.S. Pat. No. 8,201,113, entitled "Method and Apparatus for Multi-Die Thermal Analysis", which is incorporated herein by reference.

Figure 32:
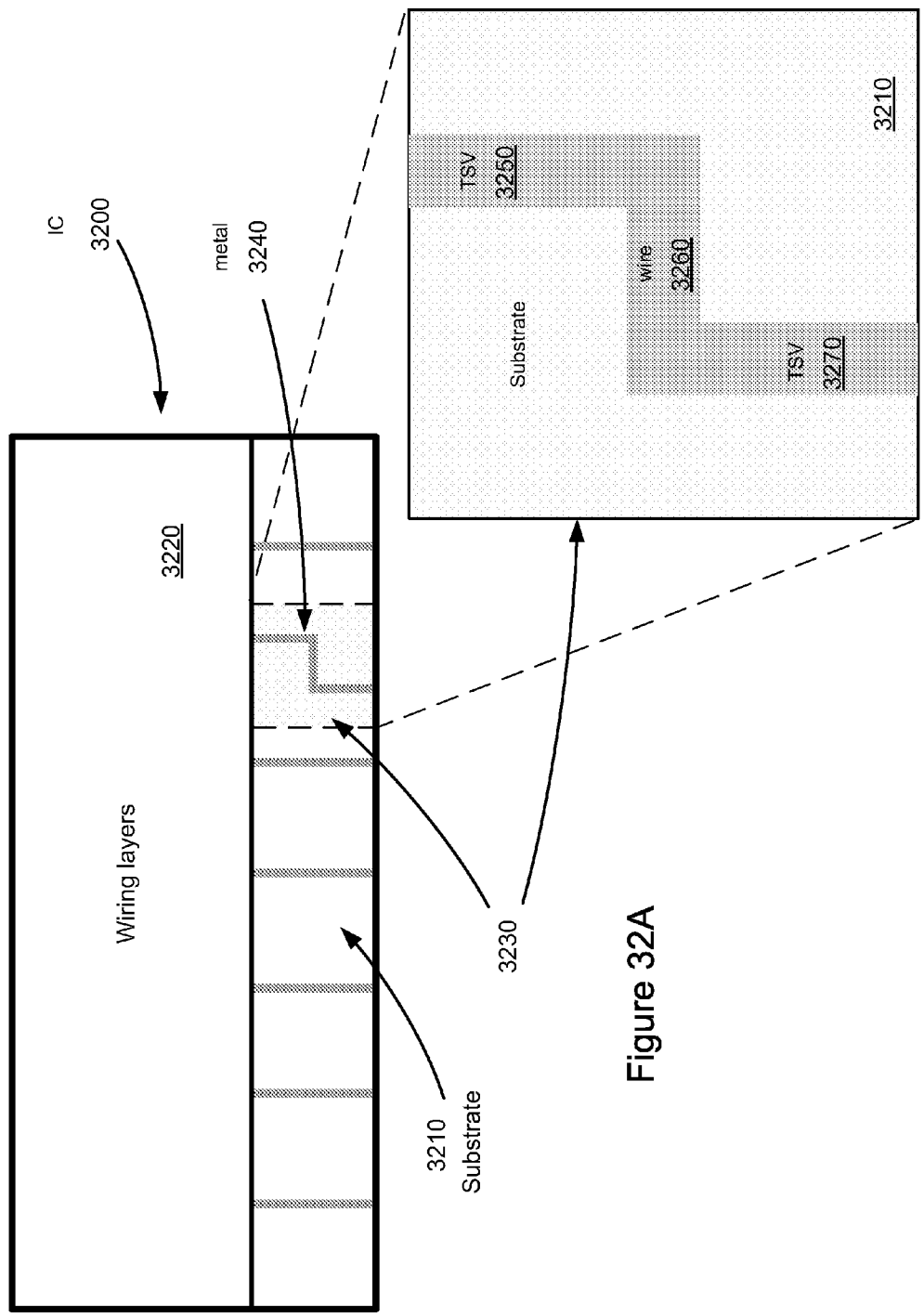
FIG. 32A illustrates an IC with a substrate and TSVs in some embodiments.
FIG. 32B illustrates an enlarged portion of the substrate of FIG. 32A that includes a TSV that vertically traverses a substrate, which is connected to a wire that traverses the substrate in some embodiments.

The above figures illustrate TSVs that traverse the substrate of the IC vertically. However, in the future, the interconnect wires may also traverse the substrate horizontally. FIG. 32A illustrates a TSV that traverses a substrate vertically and a metal wire that traverses the substrate horizontally in some embodiments that may be implemented in the future. This figure shows an IC 3200 that includes a substrate 3210 and wiring layers 3220. As shown in this figure, the substrate 3210 includes a metal component 3240.

FIG. 32B illustrates an enlarged portion 3230 of the substrate 3210 of FIG. 32A. As shown in FIG. 32B, the metal component includes a TSV 3250, a wire 3260 and another TSV 3270. The TSV 3250 traverses down the substrate 3210, then connects to a metal wire 3260 that is horizontally across the substrate 3210, which itself is connected to another TSV 3270 that traverses down the substrate 3210 again.

In some embodiments, a metal component may traverse a substrate vertically and/or horizontally when connection points or contact points between ICs do not perfectly align vertically. For example, a metal component may traverse the substrate horizontally when a contact point (not shown) in IC 3200 is not exactly above a contact point (not shown) in another IC. Since ICs may be different, the locations of TSVs and/or metal component may also be different. Accordingly, should metal wires be able to horizontally traverse a substrate in the future, some embodiments of the invention can take into account these horizontal wires in the substrate when performing thermal analysis.

As mentioned above, in some embodiments, the thermal analysis processes described above in Section IV analyzes both the wiring layers and the substrate of the IC. In some embodiments, the substrate includes TSVs. Thus, in addition to looking at wiring data, the above processes may also look at TSVs in the substrate. Therefore, when the above processes retrieve wiring data for the IC design layout, the processes also retrieve metal data for the TSVs of the substrate, which is part of the IC design layout. Moreover, retrieving the data may also include retrieving wiring data for one or more redistribution layers in some embodiments.

In some embodiments, when performing thermal analysis on the IC, the above processes may divide the IC design layout so that each element includes either a wiring layer or a substrate, but not both. As mentioned above, a redistribution layer is similar to a wiring layer. Accordingly, when performing thermal analysis on a redistribution layer, the processes described in Section IV for performing thermal analysis on a wiring layer are equally applicable to the redistribution layer. In some embodiments, the wiring layers, the substrate and the redistribution layer(s) are treated as separate pieces when performing thermal analysis. Having described substrate of an IC design layout that includes TSVs, the different processes for performing thermal analysis will now be described below.

A. Equivalent Thermal Conductivity

In some embodiments, a substrate portion of the IC design layout is divided into sets of elements before using the equivalent thermal conductivity process. When dividing the IC design layout, each element may include a silicon component, a metal component, or a combination of silicon and metal components. In some embodiments, the metal component includes a TSV.

Figure 33:
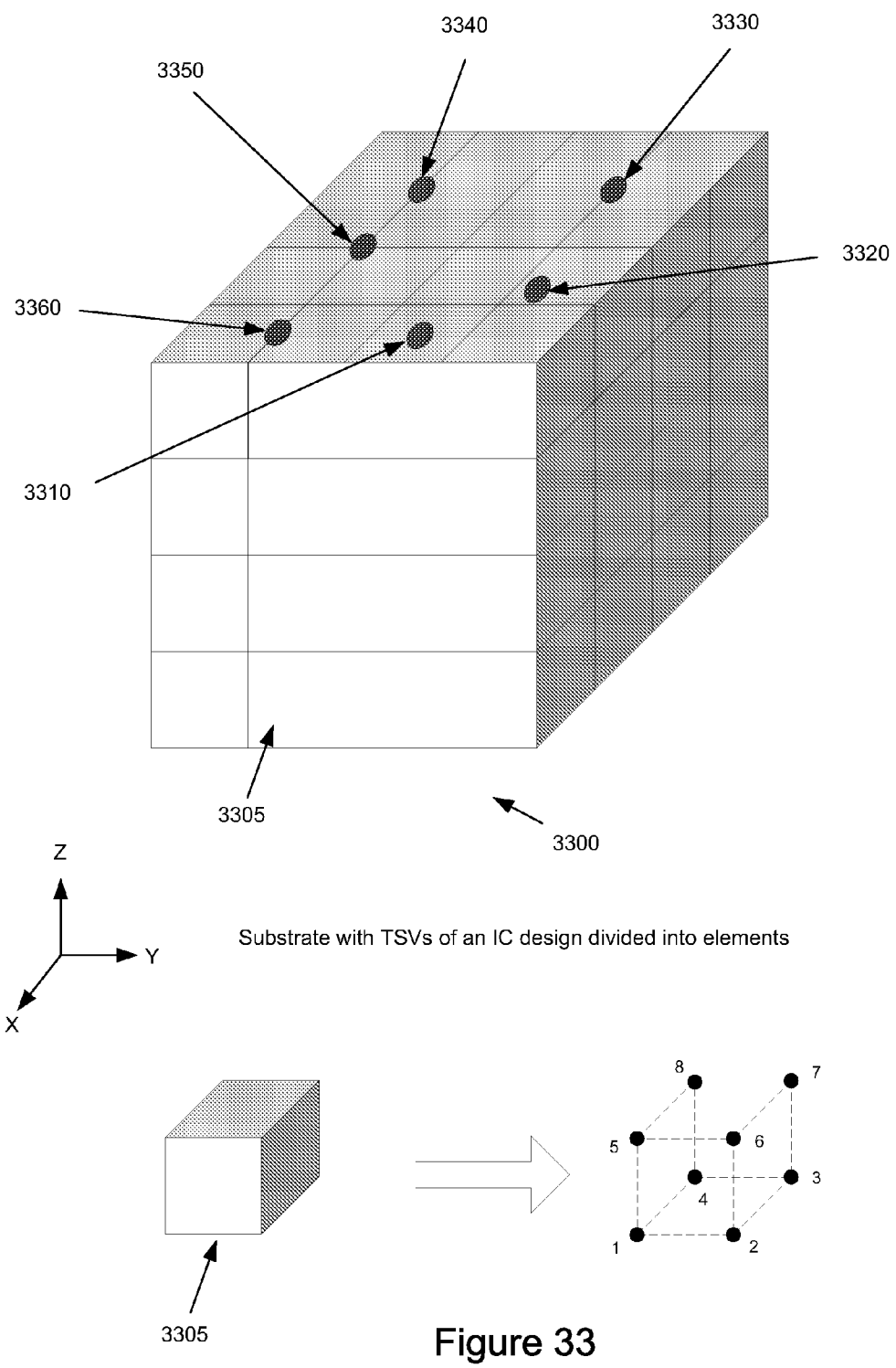
FIG. 33 illustrates a substrate with TSVs divided into a set of elements in some embodiments.

FIG. 33 illustrates a 3D view of a substrate 3300 with TSVs 3310-3360.

As shown in this figure, the substrate 3300 is divided into equal elements 3305. However, the substrate 3300 may be divided differently (e.g., non-uniformly in size). FIG. 33 also shows a coordinate axis that indicates the different planes (e.g., X-Y, X-Z, Y-Z) for the 3-D view of the substrate.

Figure 34:
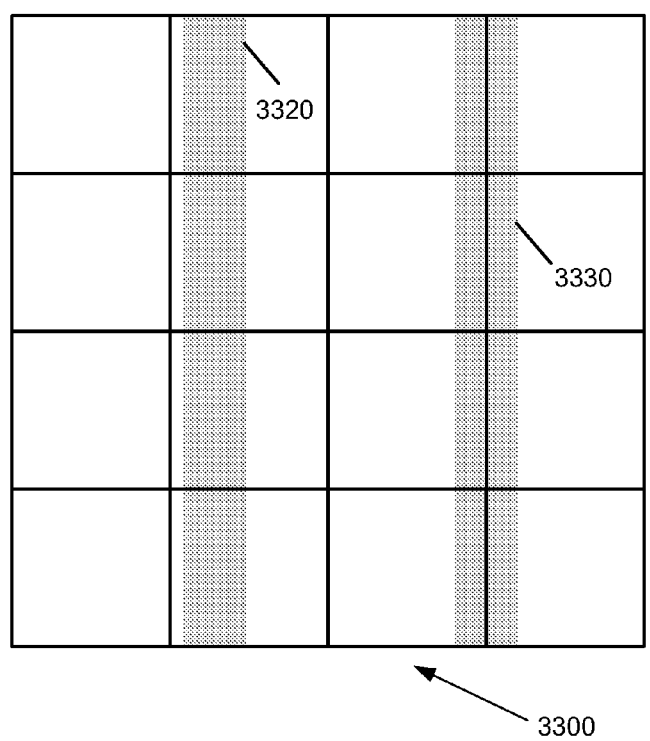
FIG. 34 illustrates a side view of a substrate with TSVs divided in a set of elements and several back end metal layers in some embodiments.

FIG. 34 illustrates a view of the substrate 3300 at a plane that is parallel to the X-Z plane of FIG. 33. As shown in this figure, the substrate 3300 includes the TSVs 3320-3330 that each traverses the substrate 3300 straight up and down (vertically).

Figure 35:
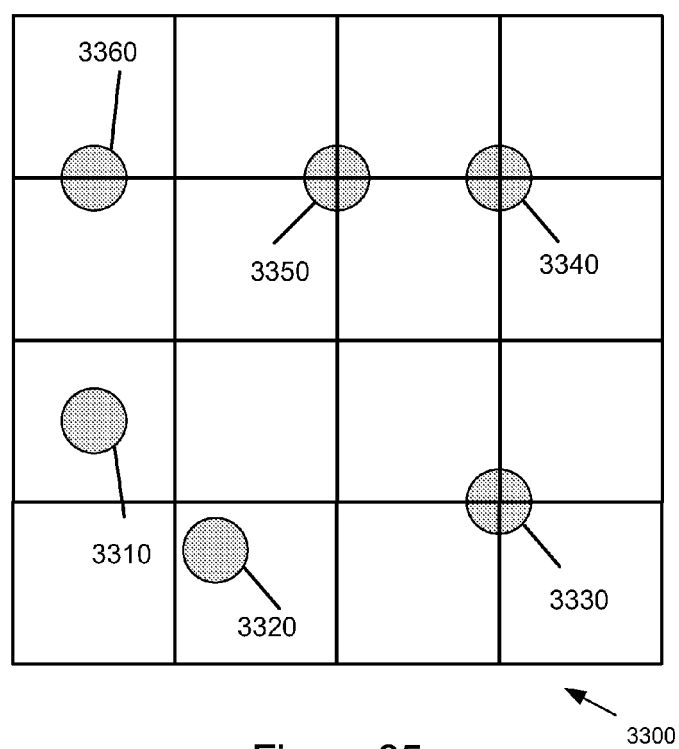
FIG. 35 illustrates a top view of a substrate with TSVs divided in a set of elements in some embodiments.

FIG. 35 illustrates a view of the substrate 3300 at a plane that is parallel to the X-Y plane (i.e., top view) of FIG. 33. FIG. 35 includes a substrate 3300 and TSVs 3310-3360. As shown in FIG. 35, an element of a substrate can include different portions of one or more TSVs. For example, an element can include an entire TSV (e.g., TSVs 3310-3320). In addition, an element may include portions of one or more TSVs (e.g., TSVs 3330-3360). In some embodiments, how the substrate portion of the IC design layout is divided may be based on how elements should include TSVs. Different embodiments may use different size elements to divide the substrate. For instance, the size of the element can be smaller, the same or larger than the cross-sectional size of a TSV in some embodiments. Once the substrate is divided, the thermal analysis process may be performed in some embodiments.

In some embodiments, the process for computing an equivalent thermal conductivity for elements of a substrate of an IC design layout is similar to the process 1100 described above for computing an equivalent thermal conductivity for elements of wiring layers.

Figure 36:
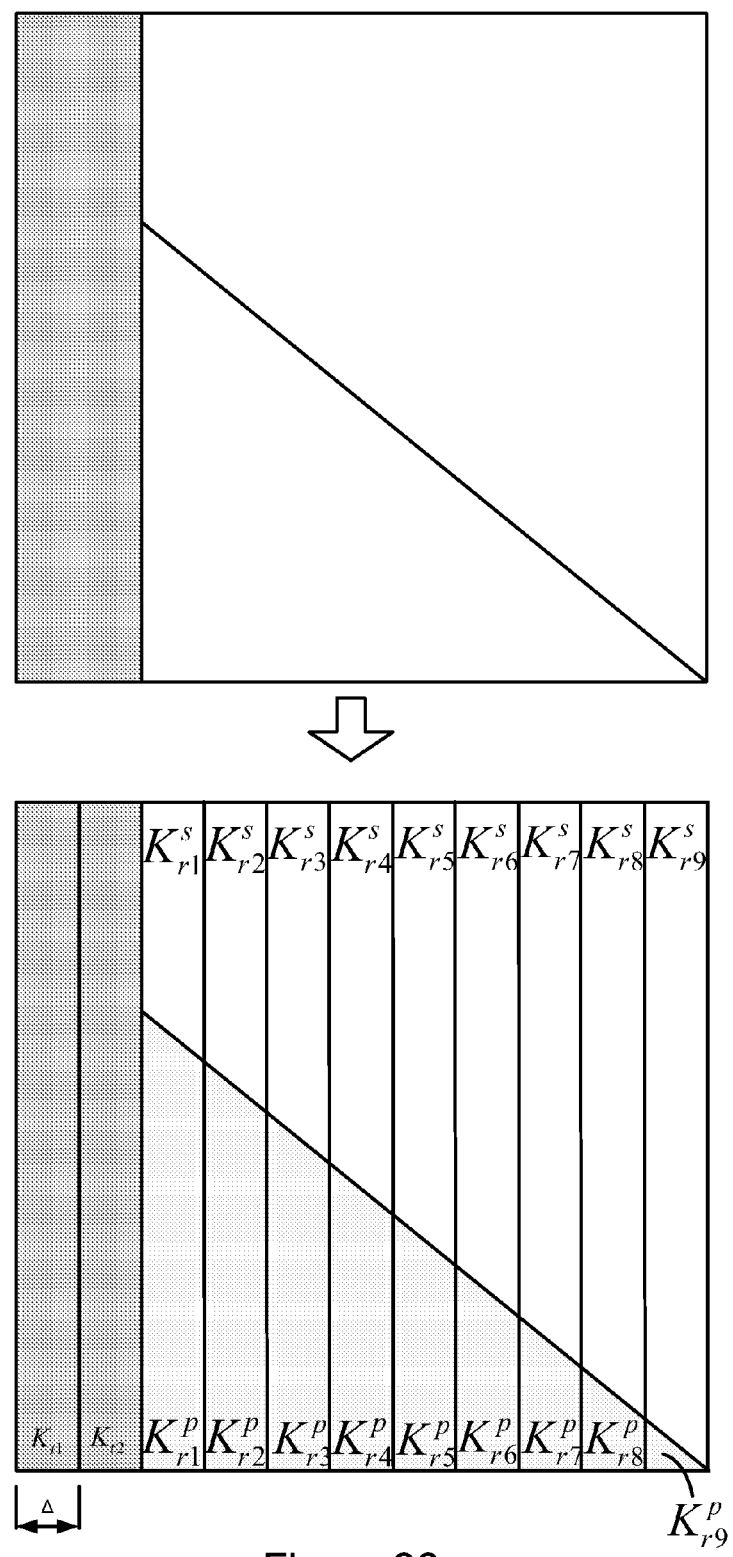
FIG. 36 illustrates the division of an element model for a substrate into delta sections in some embodiments.

As mentioned above in Section IV.A, some embodiments use a particular element model to compute an equivalent thermal conductivity value. The particular element model is then divided into several areas. FIG. 36 illustrates a particular element model that is divided into a set of areas. Each of these areas has a width of delta ($\Delta$). Each area has a corresponding thermal conductivity value. In some embodiments, the thermal conductivity of a particular area is based on the composition of the area. For example, the thermal conductivity of the second area from the left is based on the thermal conductivity $K_{t2}$, where $K_{t2}$ represents the thermal conductivity of a TSV in area t2. In another example, the thermal conductivity of the third area from the left is based on the thermal conductivities $K_{r1}^s$ and $K_{r1}^p$, where $K_{r1}^s$ represents the thermal conductivity of a substrate in area r1, and $K_{r1}^p$ represents the thermal conductivity of a partial TSV in area r2. A method for computing an equivalent thermal conductivity of an element based on the areas is further described below.

Figure 37A:
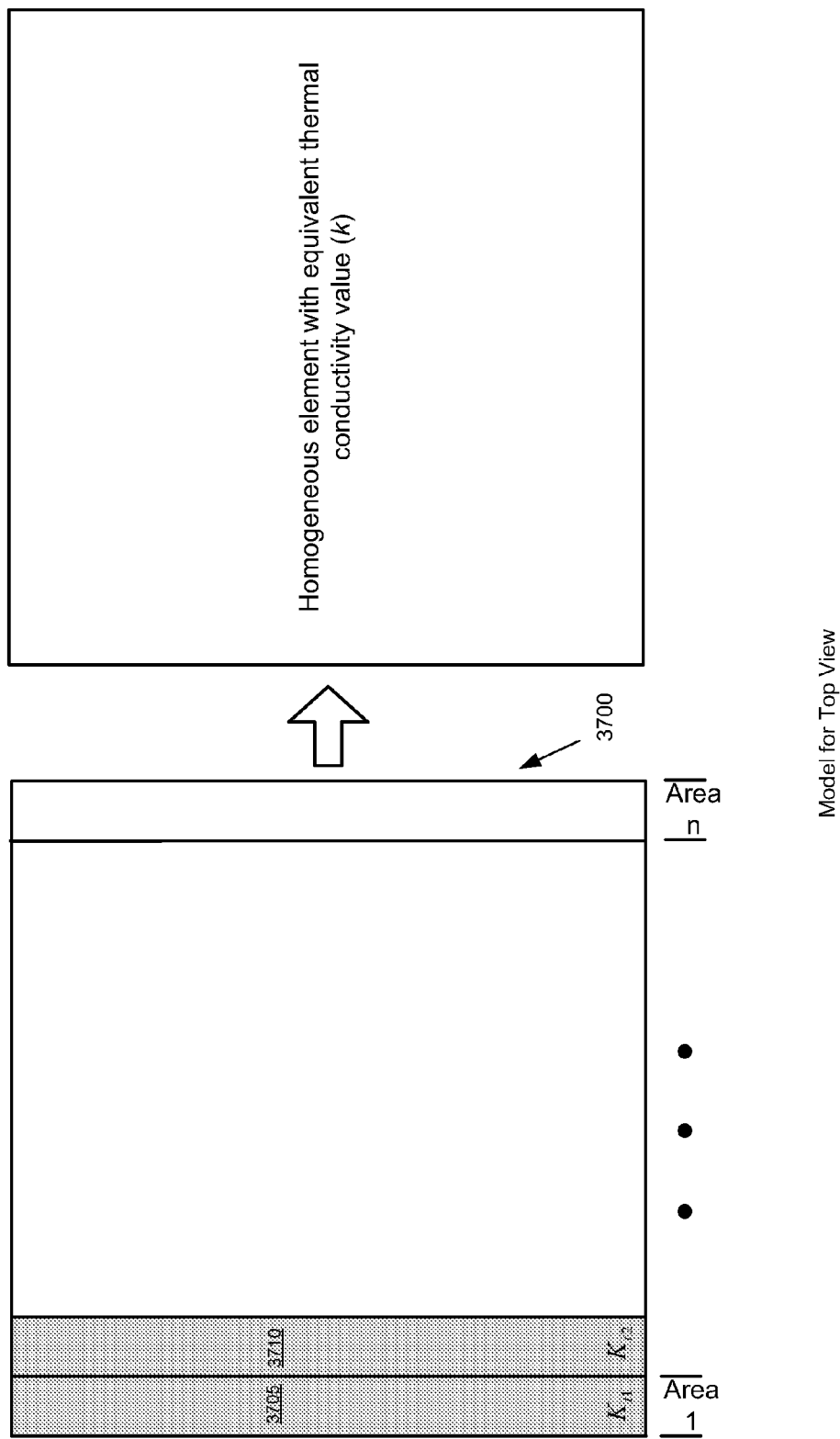
FIG. 37A illustrates the concept of computing an equivalent thermal conductivity value for a top view element in some embodiments.

FIG. 37A illustrates the notion of an equivalent homogenous element that is representative of a particular element that includes TSV. Specifically, this figure shows an element model 3700 that is divided into n areas, including areas 3705 and 3710. As further shown in this figure, areas 3705 and 3710 have a TSV. Therefore, the thermal conductivity value of each of these two areas is the thermal conductivity value of the TSV material (i.e., $K_{t1}$ and $K_{t2}$).

Figure 37B:
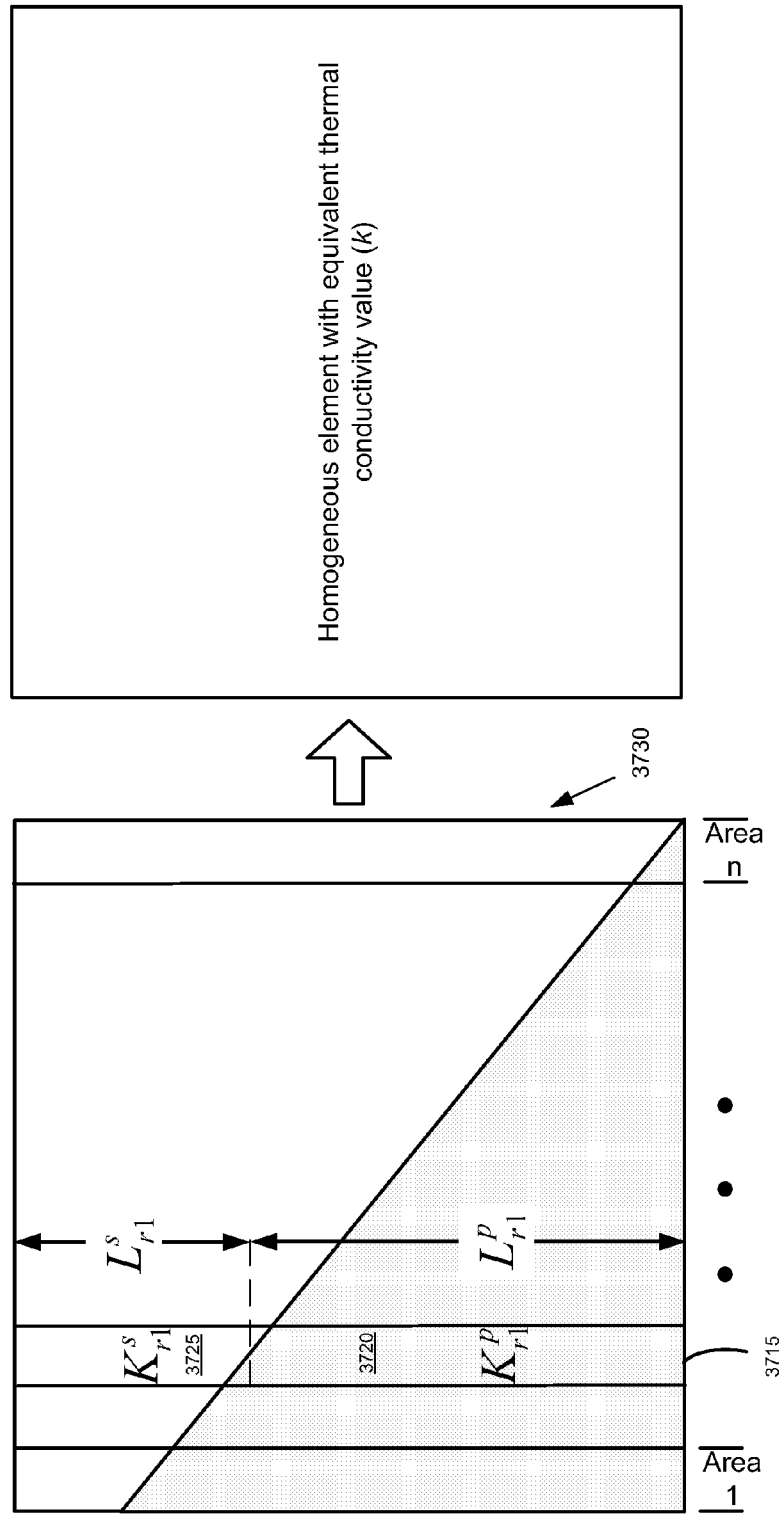
FIG. 37B illustrates the concept of computing an equivalent thermal conductivity value for a top view element in some embodiments.

FIG. 37B illustrates another equivalent homogenous element that is representative of a particular element that includes TSV. In particular, this figure shows an element model 3730 that is divided into n areas, including area 3715.

As shown in this figure, area 3715 includes metal component 3720 and non-metal component 3725 (e.g., silicon component) that each have their own respective thermal conductivity values $K_{r1}^P$ and $K_{r1}^s$, respectively. In some embodiments, the corresponding thermal conductivity value of an area that includes a metal component and a non-metal component can be computed by using the following equation, since the metal component and the non-metal component can be considered as connected in series:

$$K_{r1} = \frac{(L_{r1}^s + L_{r1}^p) \times K_{r1}^P \times K_{r1}^s}{(L_{r1}^p \times K_{r1}^s) + (L_{r1}^s \times K_{r1}^p)} \quad (12)$$

where $K_{r1}$ is the thermal conductivity of the area that includes metal and non-metal components, $K_{r1}^P$ is the thermal conductivity of the metal component, $K_{r1}^s$ is the thermal conductivity of the non-metal component, $L_{r1}^P$ is the length of the metal component in the area, $L_{r1}^s$ is the length of the non-metal component in the area.

To compute the equivalent thermal conductivity value of a particular element, some embodiments use an average value of the thermal conductivity value of all areas of the particular element. The average value can be computed by using the equation below.

$$K_{Equivalent} = \frac{1}{n} \sum K_i \quad (13)$$

where $K_i$ is the thermal conductivity value of a particular area i. However, different embodiments may compute an equivalent thermal conductivity value differently. Examples of using a top view element are further described below with reference to FIG. 37C.

FIG. 37C conceptually illustrates the computation of equivalent thermal conductivity values for different elements in some embodiments. These figures are for illustrative purposes and other embodiments may use other types of representative elements when computing equivalent thermal conductivity values. FIG. 37C illustrates a top view (a) of an element that includes a complete TSV that has a circular cross-section. For this particular element, the element model of FIG. 37B is used in some embodiments. FIG. 37C illustrates a top view (b) of an element that includes a complete TSV that has a circular cross-section. The top view (b) element is similar to the top view (a) element, except that the TSV in the top view (b) is not at the center of the element. In some embodiments, as shown in this figure, the computation of the equivalent thermal conductivity values is the same for both scenarios.

FIG. 37C also illustrates a top view (c) of an element that includes portions of two separate TSVs. As mentioned above, in some embodiments, the element model of FIG. 37B is used when computing an equivalent thermal conductivity value in the top view of an element. FIG. 37C further illustrates a top view (d) of an element that includes a portion of TSV that passes through the element.

Figure 38:
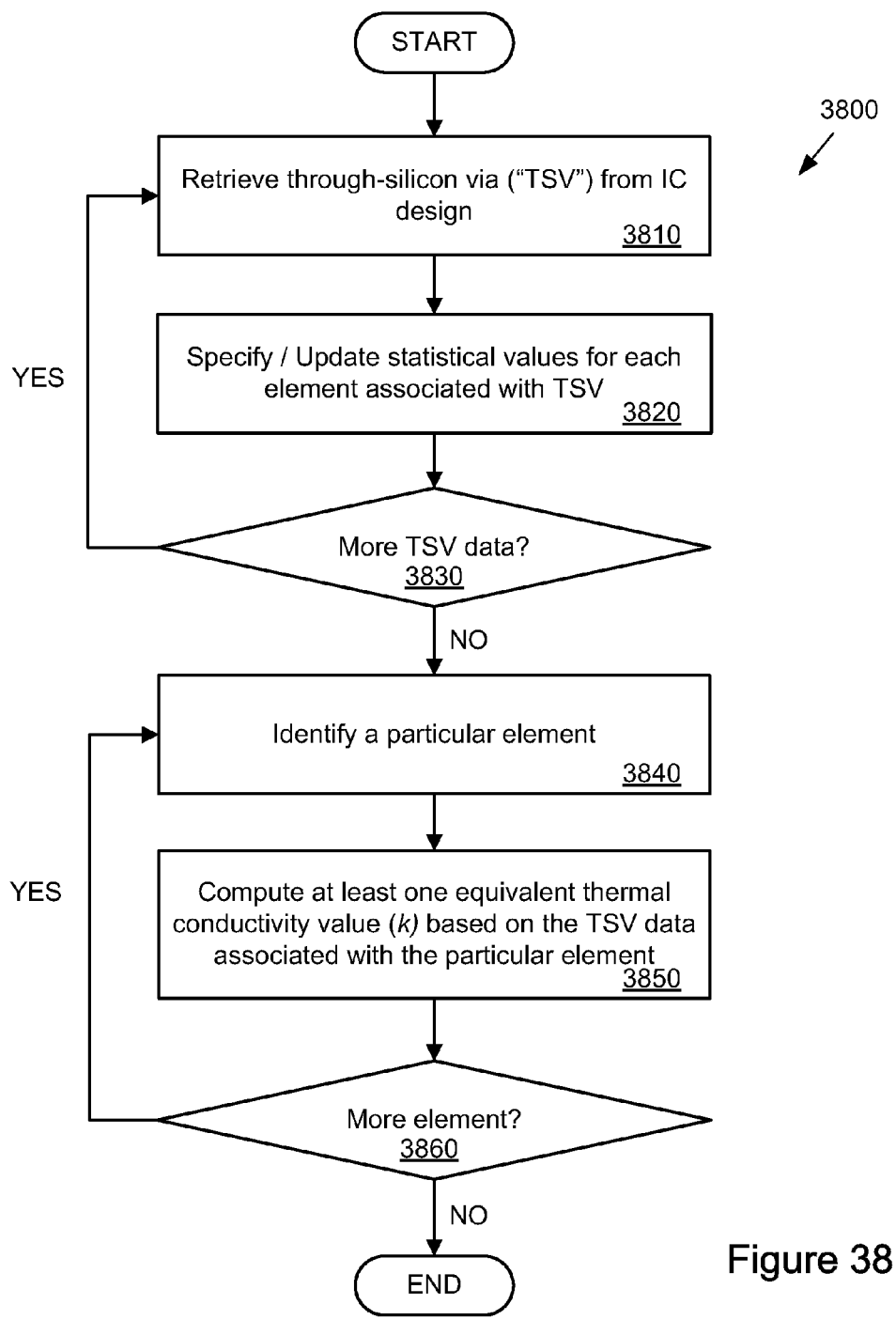
FIG. 38 illustrates a process for computing an equivalent thermal conductivity value in some embodiments.

Having described how an equivalent thermal conductivity value is computed, a process for performing thermal analysis based on equivalent thermal conductivity values will now be described. FIG. 38 illustrates a process 3800 of some embodiments for computing an equivalent thermal conductivity value (k) for an IC design layout that includes a substrate with TSVs.

As shown in FIG. 38, the process retrieves (at 3810) TSV data (e.g., position, dimension) from the IC design layout. The process then computes (at 3820) for each element, statistical values associated with the TSV data that is retrieved.

Next, the process determines (at 3830) whether there is more TSV data. If so, the process proceeds to 3810 to retrieve another set of TSV data and then updates (at 3820) the statistical values for each element based on the other set of TSV data. In some embodiments, updating the statistical values includes adding the values of the width of the full length TSVs and the residual area to a previous total width and total residual area. In addition, much like the processes described above in Section IV, the same piece of metal (e.g., TSV, wiring) never gets added more than once (i.e., the data is not added more than once) in some embodiments.

When the process determines (at 3830) that there are no more TSV data to retrieve, the process proceeds to identify (at 3840) a particular element from the set of elements. The process computes (at 3850) at least one equivalent thermal conductivity value for the particular element. The process for computing the equivalent thermal conductivity value will be further described below in detail with respect with FIG. 39.

After computing (at 3850) the equivalent thermal conductivity value, the process determines (at 3860) whether there is another element. If so, the process proceeds to 3840 to identify another element and then computes (at 3850) an equivalent thermal conductivity value for this identified element. The process ends when there are no more elements to be identified.

Figure 39:
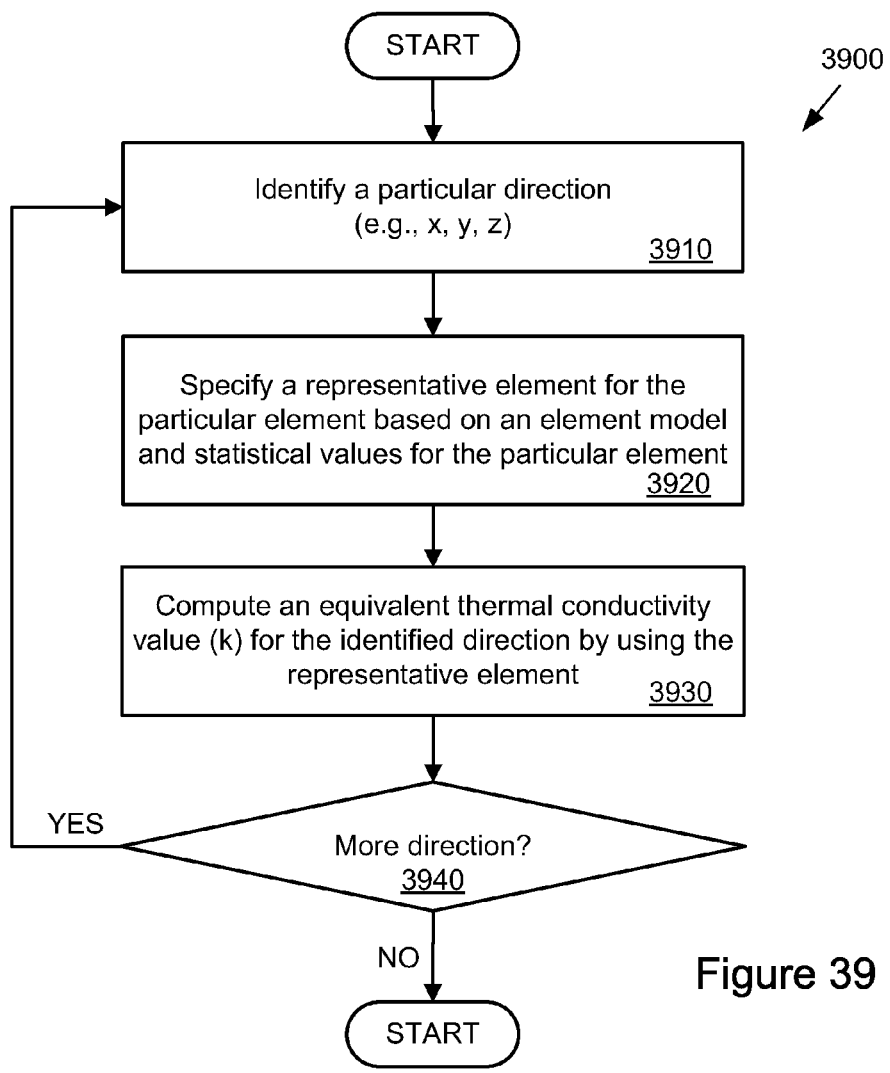
FIG. 39 illustrates a process for computing several equivalent thermal conductivity values along different directions in some embodiments.

FIG. 39 illustrates a process 3900 that some embodiments use to compute the equivalent thermal conductivity value during step 3850 of process 3800. In some embodiments, an equivalent thermal conductivity value is computed for several directions in an element (e.g., x, y, z). As shown in this figure, process 3900 identifies (at 3910) a particular direction for an element. In some embodiments, this includes selecting a direction from a set of directions.

The process then specifies (at 3920) a representative element for the particular element based on an element model and statistical values computed for the particular element, as shown in FIG. 9 and discussed in Section IV.A. In some embodiments, the element model for the TSV is similar to the element model for an IC design layout, as shown in FIG. 10 and described in Section IV.A. The difference being that instead of wires and circuit modules in the wiring layers, the element model considers TSVs in the substrate of the IC design layout, in some embodiments.

Next, the process computes (at 3930) an equivalent thermal conductivity value based on the representative element. An example for computing an equivalent thermal conductivity value was shown in FIGS. 37A and 37B. Referring back to FIG. 37C, this figure illustrates several examples of the computation of an equivalent thermal conductivity value for an element.

Next, the process 3900 determines (at 3940) whether there is another direction for the element. If so, the process proceeds back to 3910 to identify another direction. If not, the process 3900 ends.

In some embodiments, once the equivalent thermal conductivity values have been computed for each element, these equivalent thermal conductivity values may be used in Equation (6) above to compute the element group of values. The above process can also be applied to a redistribution layer in a similar manner.

B. Parameterized Function

As mentioned above in Section IV.B, some embodiments of the invention compute an element group of values that accounts for wiring by using parameterized functions. Similarly, some embodiments of the invention compute an element group of values that accounts for TSV by using parameterized functions obtained by carrying out a symbolic integration of a set of finite element equations for a set of TSV location parameters.

The values of the element group of values are associated with entry values (e.g., $C_{ij}$). FIG. 33 illustrates an example of a substrate portion of an IC design layout that is divided into several elements 3300. FIG. 33 further illustrates that each element (e.g., 3305) includes eight nodes. In some embodiments, each element is associated with an n×n symmetric matrix (i.e., element matrix). For example, the element 3305 is associated with an 8×8 symmetric matrix, as shown below:

$$H = \begin{pmatrix} C_{11} & \ldots & C_{18} \\ \ldots & \ldots & \ldots \\ C_{81} & \ldots & C_{88} \end{pmatrix}$$

In some embodiments, the entry $C_{ij}$ describes how the heat flow at node i is affected when the temperature at node j changes. In addition, each node i in the element is associated with a shape function $N_i(x, y, z)$, as described above for Equation (6). In some embodiments, the shape functions associated with different nodes differ from each other. In some embodiments, the entry $C_{ij}$ in the matrix is calculated by using the following equation:

$$C_{ij} = \int_\omega \left[ k_x(x, y, z) \frac{\partial N_i(x, y, z)}{\partial x} \frac{\partial N_j(x, y, z)}{\partial x} + k_y(x, y, z) \frac{\partial N_i(x, y, z)}{\partial y} \frac{\partial N_j(x, y, z)}{\partial y} + k_z(x, y, z) \frac{\partial N_i(x, y, z)}{\partial z} \frac{\partial N_j(x, y, z)}{\partial z} \right] d\omega$$

where ω represents the volume of the element. To account for TSVs, some embodiments consider the effects of TSVs as incremental additions of thermal conductivity to the element material. As a result, in some embodiments, the entry $C_{ij}$ is calculated by using the following equation:

$$C_{ij} = C_{ij\_silicon} + \sum_{wires} \int_\omega \left[ \delta k_x(x, y, z) \frac{\partial N_i(x, y, z)}{\partial x} \frac{\partial N_j(x, y, z)}{\partial x} + \delta k_y(x, y, z) \frac{\partial N_i(x, y, z)}{\partial y} \frac{\partial N_j(x, y, z)}{\partial y} + \delta k_z(x, y, z) \frac{\partial N_i(x, y, z)}{\partial z} \frac{\partial N_j(x, y, z)}{\partial z} \right] d\omega$$

where $C_{ij\_silicon}$ represents the value of $C_{ij}$ when the element is completely occupied by a non-metal component (e.g., silicon). In some embodiments, the value $C_{ij\_silicon}$ is computed once for each element. The summation in the above equation is a summation of the TSVs that are added to the particular element. In some embodiments, $\delta k_x(x, y, z)$, $\delta k_y(x, y, z)$, and $\delta k_z(x, y, z)$ represent the incremental conductivity when a TSV portion is added to the particular element.

In some embodiments, performing a numerical integration of the above equation can be computationally extensive (i.e., it can take a long time). Accordingly, some embodiments parameterize the above equation to obtain the following parameterize function:

$$\int_\omega \delta k_x(x, y, z) \frac{\partial N_i(x, y, z)}{\partial x} \frac{\partial N_j(x, y, z)}{\partial x} d\omega = f_{i,j,x}(x_1, y_1, z_1, x_2, y_2, z_2, a, b, c, x_0, y_0, z_0)$$

where $x_1$, $y_1$, $z_1$ are the coordinates of the lower left corner of a TSV in the element, $x_2$, $y_2$, $z_2$ are the coordinates of the upper right corner of the TSV in the element, a, b, c are the width, depth, and height of the element, and $x_0$, $y_0$, $z_0$ are the coordinates of the lower left corner of the element, respectively. Note that the function name itself is indexed by i, j, and x, which signifies that this function describes the x relationship between nodes i and j. Similarly, functions $f_{i,j,y}(x_1, y_1, z_1, x_2, y_2, z_2, a, b, c, x_0, y_0, z_0)$ and $f_{i,j,z}(x_1, y_1, z_1, x_2, y_2, z_2, a, b, c, x_0, y_0, z_0)$ can be defined for the y and z direction. In some embodiments, these are all symbolic functions, and once the values of $x_1$, $y_1$, $z_1$, $x_2$, $y_2$, $z_2$ are known, the functions can easily be used to evaluate or compute the entry values of elements. The use of the functions is further described below in conjunction with computing an element group of values.

Figure 40:
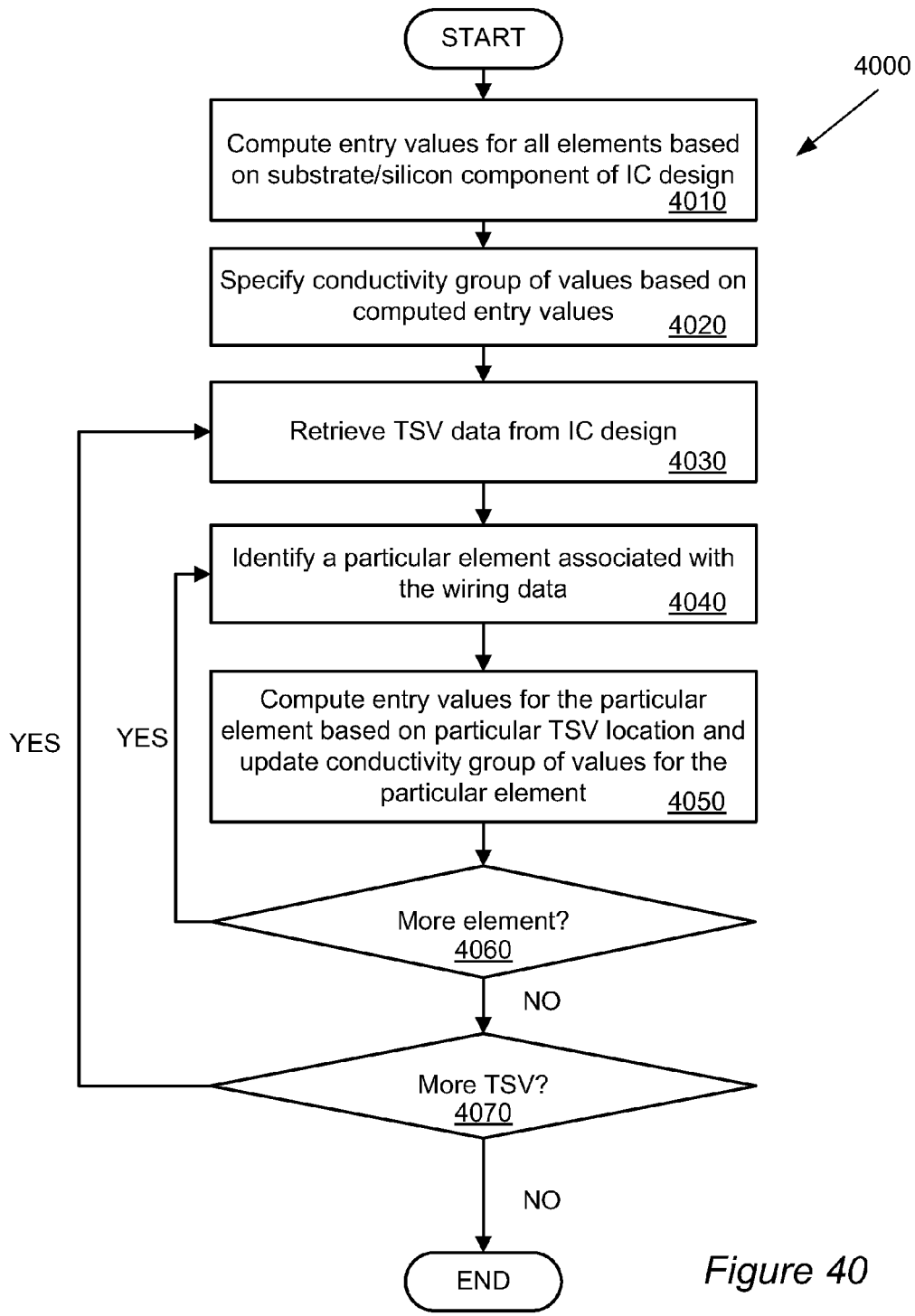
FIG. 40 illustrates a process for computing a conductivity group of values that take into account the TSVs in a substrate design in some embodiments.
Figure 41:
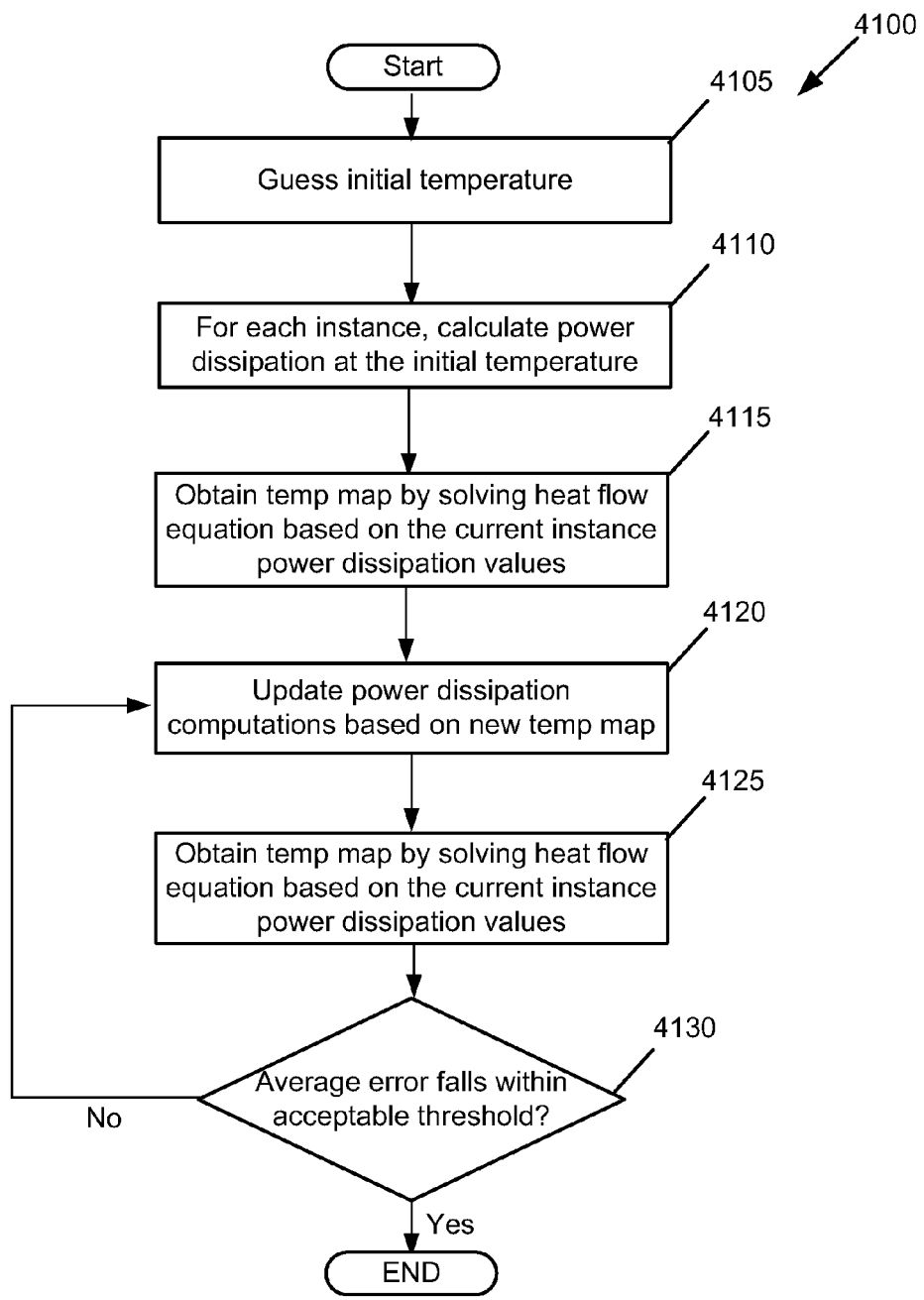
FIG. 41 illustrates a solving process that some embodiments use to solve the heat flow equation.

FIG. 40 illustrates a process 4000 that is performed to compute an element group of values that accounts for TSVs by using one or more parameterized functions in some embodiments. In some embodiments, process 4000 is performed after the substrate portion of the IC design layout has been divided into a set of elements, as shown in FIG. 33.

As shown, process 4000 computes (at 4010) entry values for all the elements of the substrate portion of the IC design layout based on the silicon component of the substrate of the IC design layout. Next, the process specifies (e.g., computes) (at 4020) for each element, an element group of values based on the computed entry values. In some embodiments, the process uses Equation (6) to compute the entry values and specify the element group of values.

The process then retrieves (at 4030) TSV data from the IC design layout. Next, the process identifies (at 4040) a particular element associated with the TSV data. The process then computes (at 4050) entry values based on the retrieved TSV data and updates the element group of values for the particular element based on the computed entry values.

In some embodiments, computing the entry value includes using the parameterized functions described above. FIGS. 22-24 illustrate examples of how entry values are computed based on wiring data. In some embodiments, entry values for TSVs are computed in a similar way as shown in FIGS. 22-24. The difference being that in some embodiments, the thermal conductivity of the dielectric ($k_d$) is replaced with the thermal conductivity of the substrate ($k_s$) and the thermal conductivity of the wire ($k_w$) is replaced with the thermal conductivity of the TSV ($k_t$). Similarly, the coordinates ($x_1$, $y_1$, $z_1$, $x_2$, $y_2$, $z_2$) of the wire are replaced with coordinates ($x_1$, $y_1$, $z_1$, $x_2$, $y_2$, $z_2$) of the TSV.

The process then determines (at 4060) whether there is another element that is associated with the retrieved TSV data. When the process determines there is another element, the process 4000 proceeds back to 4040 to identify another element. However, when the process 4000 determines (at 4060) there is no other element associated with the retrieved TSV data, the process determines (at 4070) whether there is more TSV data to be retrieved from the IC design layout.

When the process 4000 determines there is more TSV data to be retrieved, the process 4000 proceeds to retrieve (at 4030) another TSV data from the IC design layout. When the process 4000 determined there is no more TSV data to be retrieved, the process 4000 ends. Like the processes described above, the same piece of metal (e.g., TSV, wiring) never gets added more than once (i.e., the data is not added more than once) in some embodiments.

The above process can also be applied to a redistribution layer in a similar manner. Once the element groups of values are computed, they can be used to solve the heat flow equation to compute the temperature distribution of the IC design layout, where the temperature distribution takes into account the TSV in the IC design layout. The solving of the heat flow equation will now be further described below in Section VI.

VI. Solving the Heat Flow Equation

As mentioned above, the process 400 computes (at 415) two coefficients $\alpha$ and $\beta$ for each circuit module in the design, and uses these two coefficients to specify (at 420) a heat flow equation that is expressed partly in terms of exponential leakage power consumption models of the circuit modules. After defining the heat flow equation, the process 400 uses (at 425) a matrix solver to iteratively solve the heat flow equation.

FIG. 4100 illustrates a solving process 4100 that some embodiments use (at 425) to solve the heat flow equation. As shown in this figure, the process initially selects (at 4105) an initial estimate for the temperature several nodes in the design. As mentioned above, some embodiments divide the IC design layout into a number of bricks (also called elements) whose vertices are the nodes for which the temperatures are computed.

Next, the process calculates (at 4110) the power dissipation of each circuit module based on the current temperature of the particular circuit module and its non-linear temperature-dependent power consumption model. As mentioned above, the process 400 identifies (at 415) an exponential power consumption model for each circuit module.

The process 4100 then uses (at 4115) these power dissipation values to solve the heat flow equation to produce a new temperature distribution. In some embodiments, the process uses a numerical matrix solver to produce the new temperature distribution. The matrix solver first factorizes the conductivity group of values C using LU or Cholesky factorization and then solves the equations via forward/backward substitution.

The solution to the heat flow equation is a vector of temperature values that correspond to the temperatures of the nodes of the elements that divide the IC design. This vector provides an initial temperature distribution for the IC. The distribution gives the steady-state temperature on the IC as a function of spatial coordinates x, y, and z given the power dissipation values that were calculated (at 4110) based on the initial temperature guessed at 4105.

The process next updates (at 4120) the power dissipation values using the temperature values produced at 4115. The process calculates (at 4120) the power dissipation of each circuit module again based on the interpolated temperature of the particular circuit module (i.e., the temperature interpolated from the current temperature of its nearby nodes) and its non-linear temperature-dependent power consumption model (e.g., its exponential power consumption model). These new power dissipation values are based on the calculated temperature distribution as opposed to the initial estimated temperature distribution.

After 4120, the process uses (at 4125) the power dissipation values calculated at 4120 to solve the heat flow equation to produce a new temperature distribution. As before, the process uses a numerical matrix solver to produce the new temperature distribution. The solution to the heat flow equation is again a vector of temperature values that correspond to the temperatures of the different nodes of the elements that divide the IC design layout. This vector provides a calculated temperature distribution for the IC. This distribution again provides the steady-state temperature on the IC as a function of spatial coordinates x, y, and z given the power dissipation values that were calculated (at 4120).

Next, the process compares (at 4130) the last two temperature distributions that it obtained by solving the heat flow equation. In the first iteration through 4130, the process compares the temperature distribution computed at 4115 with the temperature distribution computed in the first iteration through 4125. In subsequent iterations through 4130, the process compares the last two temperature distributions that were computed in the last two iterations through 4125.

In some embodiments, the comparison of the two temperature distributions (at 4130) entails a computation of the average difference between the temperature values at each node in the design layout in the two maps divided by the average temperature value on the new map. When the average error is within a particular threshold (e.g., less than a predefined threshold), the process ends and outputs the new temperature distribution.

However, when the average error computed at 4130 is not within the threshold, the process 4100 repeats operations 4120, 4125, and 4130. Specifically, the process uses (at 4120) the new temperature distribution to update the power dissipation values again, uses (at 4125) the new power dissipation values to obtain a new temperature distribution, and then compares (at 4130) the new temperature distribution with the prior temperature distribution to determine whether the average error falls within the predefined threshold.

As mentioned above, the process 4100 continues until the difference between two subsequently calculated temperature distributions is small enough that, when compared at 4130, the average error falls below the specified threshold. The solution computed in the final iteration through 4125 is the temperature vector T that represents the temperature distribution across the IC design layout (i.e., the temperature of various nodes).

Figure 42:
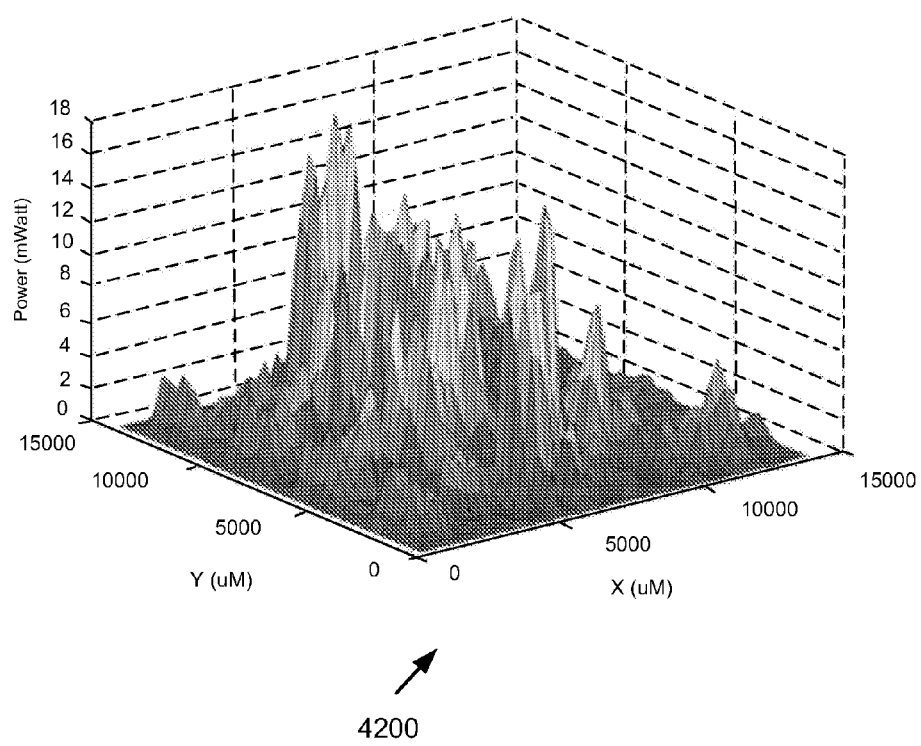
FIG. 42 illustrates a power distribution map.

The IC design's estimated power consumption can be computed by using this temperature distribution and the equations (6)-(8) that are described above. In addition, some embodiments use the temperature map obtained at 425 to obtain a power distribution map such as that illustrated in FIG. 42. Similar to the temperature map, the power distribution 4200 plots total power consumption in milliwatts as a function of spatial coordinates x, y, z on the IC.

In addition to monitoring power consumption, the thermal analysis provided by processes 400 and 4100 can be used to select the best packaging for a chip. For instance, the analysis allows a designer to select from several packages a cost effective package that prevents any section from overheating, avoids problematic temperature gradients, etc. Proper packaging can help keep a chip from overheating by conducting heat away from the chip. Sometimes better, but more expensive, packaging may be needed in order to prevent thermal runaway.

This analysis can also be used to perform better timing analysis, which is often dependent on the power consumption analysis. Temperature gradients on an IC can affect signal delays. Therefore, it is necessary to know the temperature distribution throughout the IC in order to compute accurate timing analysis.

The advantage of the above-described processes 400 and 4100 is that they can be performed much more quickly than prior solutions, which separated out the thermal analysis and power analysis into separate programs that required numerous power-dissipation and thermal-analysis iterations.

Another advantage of these processes is that it is easy to detect thermal run-away. For instance, some embodiments quickly identify a thermal run-away when the average error computed by process 4100 at 4130 in one iteration is greater than the average error computed by process 4100 at 4130 in a prior iteration.

VII. Computer System

Figure 43:
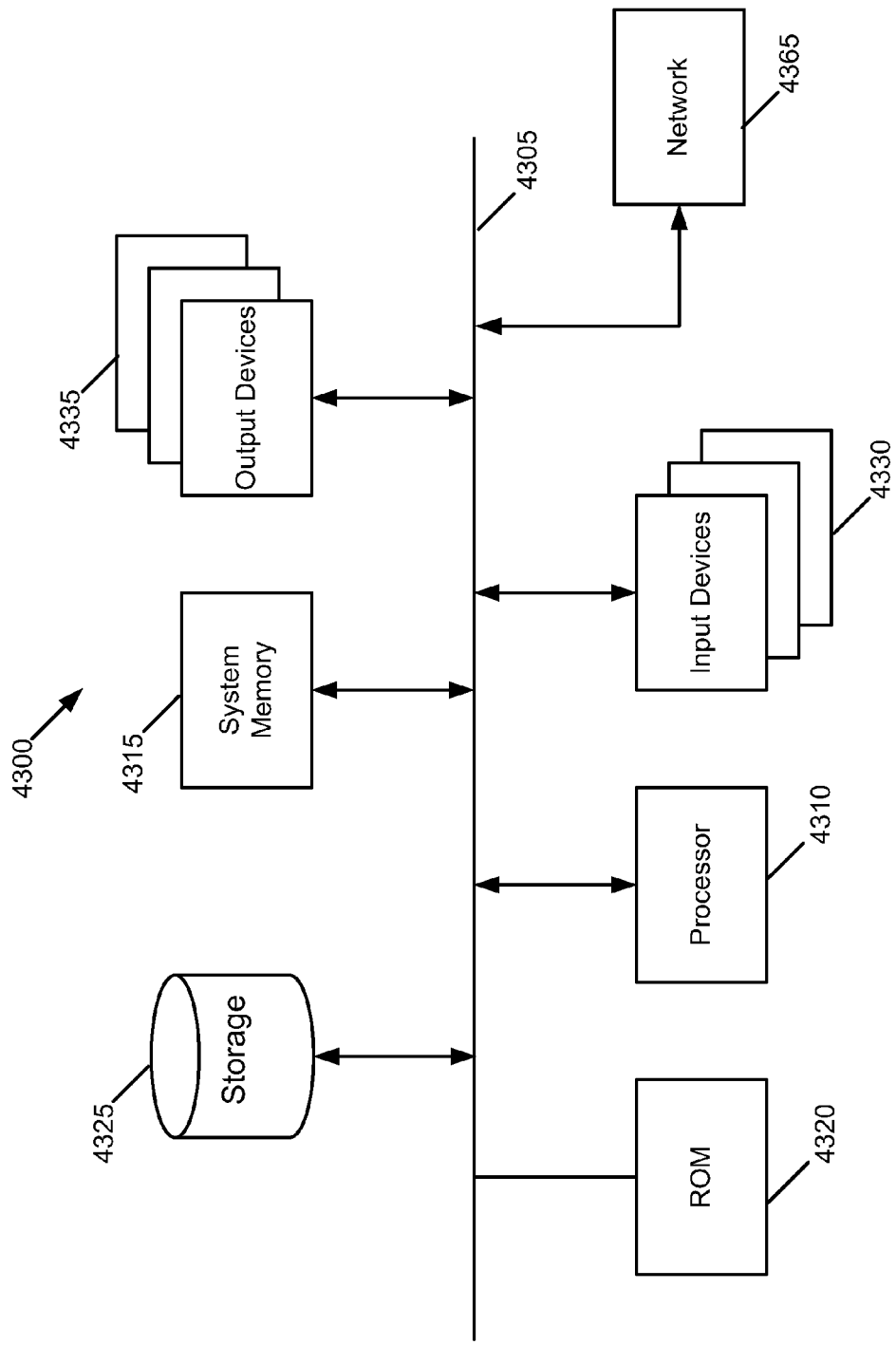
FIG. 43 conceptually illustrates a computer system with which some embodiments of the present invention are implemented.

FIG. 43 conceptually illustrates a computer system with which some embodiments of the present invention are implemented. Computer system 4300 includes a bus 4305, a processor 4310, a system memory 4315, a read-only memory 4320, a permanent storage device 4325, input devices 4330, and output devices 4335.

The bus 4305 collectively represents all system, peripheral, and chipset buses that communicatively connect the numerous internal devices of the computer system 4300. For instance, the bus 4305 communicatively connects the processor 4310 with the read-only memory 4320, the system memory 4315, and the permanent storage device 4325.

From these various memory units, the processor 4310 retrieves instructions to execute and data to process in order to execute the processes of the invention. The read-only memory 4320 stores static data and instructions that are needed by the processor 4310 and other modules of the computer system. The permanent storage device 4325, on the other hand, is a read-and-write memory device. This device is a non-volatile memory unit that stores instructions and data even when the computer system 4300 is off. Some embodiments of the invention use a mass-storage device (such as magnetic or optical disk and its corresponding disk drive) as the permanent storage device 4325. Other embodiments use a removable storage device (such as a floppy disk, and its corresponding disk drive) as the permanent storage device.

Like the permanent storage device 4325, the system memory 4315 is a read-and-write memory device. However, unlike storage device 4325, the system memory 4315 is a volatile read-and-write memory, such as a random access memory. The system memory stores some of the instructions and data that the processor needs at runtime. In some embodiments, the invention's processes are stored in the system memory 4315, the permanent storage device 4325, and/or the read-only memory 4320.

The bus 4305 also connects to the input and output devices 4330 and 4335. The input devices enable the user to communicate information and select commands to the computer system. The input devices 4330 include alphanumeric keyboards and cursor-controllers.

The output devices 4335 display images generated by the computer system. For instance, these devices might display a three-dimensional temperature map. The output devices include printers and display devices such as cathode-ray tubes or liquid crystal displays.

Finally, as illustrated in FIG. 43, the bus 4305 also couples computer 4300 to a network 4340 through a network adapter (not shown). In this manner, the computer can be part of a network of computers (such as a local area network, a wide area network, or an intranet) or a network of network (such as the Internet).

Any or all of the components of computer system 4300 may be used in conjunction with the invention. However, one of ordinary skill in the art would appreciate that any other system configuration may also be used in conjunction with the present invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, the process 400 computes two power dissipation values of each circuit module at two temperatures and then derives coefficients for the non-linear heat source model from these two values. In other embodiments, the process 400 might receive the coefficients of the non-linear leakage power model for a circuit module from a manufacturer or a developer of a circuit library. In such a situation, the process 400 might then only need one to compute one power dissipation value for a circuit module to formulate its heat flow equation.

Also, several embodiments described above treat only leakage power as the power dissipation component that is dependent on the temperature. As mentioned above, the total power dissipation in an IC is made up of leakage power, switching power, and internal power of the various circuit modules. Other embodiments may treat other components of the power dissipation (e.g., switching power and internal power) as temperature-dependent components. The temperature dependence of these other components might be specified through an exponential model or some other model.

The above thermal analysis is described in view of taking into account the dielectric and wiring component of an IC design layout. However, the thermal analysis may take into account other types of components. In addition, the wiring and TSV are described as metal components. A metal component can be copper, aluminum or tungsten in some embodiments. Although various metal components and their positions are described in the present application, one of ordinary skill in the art will understand that the types of metal components and their positions in the IC design layout, including the wiring layer and the substrate are not limited to what is described in the present application.

As mentioned above, the IC design layout can be divided into uniform size elements. However, some embodiments may divide the IC design into non-uniform size elements. In addition, some embodiments may divide the IC design layout based on other criteria. For example, some embodiments may divide the IC design layout so that each element only includes one type of component. Moreover, the above process is described for computing a conductivity group of values that takes into account wiring. However, the above process can also be used to compute a power group of values that takes into account wiring and TSVs.

Thus, the implementation of some embodiments of the invention allows a thermal analysis of an IC design layout to be efficiently performed when the wiring component of the IC design layout and the TSV component of the substrate are taken into account. Accordingly, one of ordinary skill in the art would understand that the invention is not to be limited by the foregoing illustrative details, but rather is to be defined by the appended claims.

What is claimed is:

1. A non-transitory computer readable medium storing a computer program for performing thermal analysis of an integrated circuit ("IC") design layout, the computer program executable by at least one processor, the computer program comprising sets of instructions for:
   dividing the IC design layout into a set of elements, said IC design layout comprising a wiring layer and a substrate, said substrate comprising a non-metal component and a metal component, said metal component comprising a set of through-silicon vias ("TSVs"), each TSV extending through the substrate and conducting an electrical current, wherein at least one element comprises a combination of a portion of a TSV and a portion of the non-metal component;
   computing an effective thermal conductivity value for each element based on an amount of metal component in each element; and
   identifying a temperature distribution for the IC design layout based on the computed effective thermal conductivity values.

2. The non-transitory computer readable medium of claim 1, wherein the non-metal component is a silicon component.

3. The non-transitory computer readable medium of claim 1, wherein at least one element comprises a combination of at least two separate portions of the metal component and the portion of the non-metal component.

4. The non-transitory computer readable medium of claim 1, wherein the sets of instructions for computing the effective thermal conductivity value comprises sets of instructions for using an element model to define a representative element for each element.

5. A non-transitory computer readable medium storing a computer program for performing thermal analysis of an integrated circuit ("IC") design layout, the computer program executable by at least one processor, the computer program comprising sets of instructions for:
   dividing the IC design layout into a set of elements, said IC design layout comprising a wiring layer and a substrate, said substrate comprising a set of through-silicon vias ("TSVs"), each TSV extending through the substrate and conducting an electrical current from the wiring layer to circuits outside of the IC;
   computing conductivity values for each element by using parameterized functions; and
   identifying a temperature distribution for the IC design layout based on the computed conductivity values.

6. The non-transitory computer readable medium of claim 5, wherein least one element comprises a combination of a metal component and a non-metal component of the substrate.

7. The non-transitory computer readable medium of claim 5, wherein at least one element comprises a combination of at least two metal components and a non-metal component of the substrate.

8. The non-transitory computer readable medium of claim 5, wherein the parameterized functions are obtained by carrying out a symbolic integration of a set of finite element equations for a set of metal location parameters.

9. The non-transitory computer readable medium of claim 5, wherein the parameterized functions use coordinates of the TSV to describe how heat flow at a first node of the element is affected by a temperature change at a second node of the element, each node representing a different vertex of the element.

10. The non-transitory computer readable medium of claim 9, wherein at least one element comprises a combination of at least two metal components and a non-metal component of the substrate.

11. A system comprising:
    a processor for executing sets of instructions; and
    a memory for storing a computer program for performing thermal analysis of an integrated circuit ("IC") design layout, the computer program comprising sets of instructions for:
      dividing the IC design layout into a set of elements, said IC design layout comprising a wiring layer and a substrate, said substrate comprising a non-metal component and a metal component, said metal component comprising a set of through-silicon vias ("TSVs"), each TSV extending through the substrate and conducting an electrical current, wherein at least one element comprises a combination of a portion of a TSV and a portion of the non-metal component;
      computing an effective thermal conductivity value for each element based on an amount of metal component in each element; and
      identifying a temperature distribution for the IC design layout based on the computed effective thermal conductivity values.

12. The system of claim 11, wherein a portion of the metal component is a particular TSV.

13. The system of claim 11, wherein a portion of the metal component is a portion of a particular TSV.

14. The system of claim 11, wherein at least one element comprises a combination of at least two separate portions of the metal component and the portion of the non-metal component.

15. The system of claim 11, wherein the sets of instructions for computing the effective thermal conductivity value comprises sets of instructions for using an element model to define a representative element for each element.

16. A system comprising:
    a processor for executing sets of instructions; and
    a memory for storing a computer program for performing thermal analysis of an integrated circuit ("IC") design layout, the computer program comprising sets of instructions for:
      dividing the IC design layout into a set of elements, said IC design layout comprising a wiring layer and a substrate, said substrate comprising a set of through-silicon vias ("TSVs"), each TSV extending through the substrate and conducting an electrical current from the wiring layer to circuits outside of the IC;

computing conductivity values for each element by using parameterized functions; and identifying a temperature distribution for the IC design layout based on the computed conductivity values.

17. The system of claim 16, wherein least one element comprises a combination of a metal component and a non-metal component of the substrate.

18. The system of claim 16, wherein the parameterized functions are obtained by carrying out a symbolic integration of a set of finite element equations for a set of metal location parameters.

19. The system of claim 16, wherein the parameterized functions use coordinates of the TSV to describe how heat flow at a first node of the element is affected by a temperature change at a second node of the element, each node representing a different vertex of the element.

20. The system of claim 19, wherein at least one element comprises a combination of at least two metal components and a non-metal component of the substrate.

* * * * *